(12) United States Patent
Kobayashi et al.

(10) Patent No.: US 6,430,588 B1
(45) Date of Patent: Aug. 6, 2002

(54) APPARATUS AND METHOD FOR ELLIPTIC-CURVE MULTIPLICATION AND RECORDING MEDIUM HAVING RECORDED THEREON A PROGRAM FOR IMPLEMENTING THE METHOD

(75) Inventors: Tetsutaro Kobayashi; Hikaru Morita; Kunio Kobayashi; Fumitaka Hoshino, all of Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/389,233

(22) Filed: Sep. 3, 1999

(30) Foreign Application Priority Data

| Sep. 3, 1998 | (JP) | .......................................... | 10-249500 |
| Sep. 9, 1998 | (JP) | .......................................... | 10-255526 |
| Jan. 21, 1999 | (JP) | .......................................... | 11-012981 |
| Jan. 21, 1999 | (JP) | .......................................... | 11-013187 |

(51) Int. Cl.$^7$ ................................. G06F 7/72
(52) U.S. Cl. ..................................... 708/492
(58) Field of Search .......................... 708/492; 380/28, 380/30

(56) References Cited

U.S. PATENT DOCUMENTS

| 5,999,626 | A | * | 12/1999 | Mullin et al. ................. 380/25 |
| 6,014,445 | A | * | 1/2000 | Kohda et al. ................. 380/28 |
| 6,038,581 | A | * | 3/2000 | Aoki et al. ................... 708/492 |
| 6,141,420 | A | * | 10/2000 | Vanstone et al. ........... 708/492 |
| 6,199,086 | B1 | * | 3/2001 | Dworkin et al. ............ 708/492 |
| 6,202,076 | B1 | * | 3/2001 | Aoki et al. ................... 708/492 |
| 6,263,081 | B1 | * | 7/2001 | Miyaji et al. ................ 708/492 |
| 6,266,688 | B1 | * | 7/2001 | Aoki et al. ................... 708/492 |

FOREIGN PATENT DOCUMENTS

EP    0 807 908 A2    11/1997    ............. G07F/7/10

OTHER PUBLICATIONS

Kobayashi, Tetsutaro, et al., "Elliptic–Curve Arithmetic Methods on OEF using Frobenius Map," Technical Report of IEICE, the Institute of Electronics, Information and Communication Engineers.

Kobayashi, Tetsutaro, et al., "Elliptic Curve Algorithm on OEF with Frobenius Map," SCIS '99, The 1999 Symposium on Cryptography and Information Security, Kobe, Japan, Jan. 26–29, 1999, the Institute of Electronics, Information and Communication Engineers.

Saito, Taiichi, et al., "Optimal Extension Field Frobenius," SCIS '99, The 1999 Symposium on Cryptography and Information Security, Kobe, Japan, Jan. 26–29, 1999, the Institute of Electronics, Information and Communication Engineers.

(List continued on next page.)

*Primary Examiner*—David H. Malzahn
(74) *Attorney, Agent, or Firm*—Connolly Bove Lodge & Hutz LLP

(57) ABSTRACT

In an apparatus for calculating m-multiplication of a rational point over an elliptic curve defined over a finite field, a base-φ expansion part calculates $c_0, c_1, \ldots, c_{r-1}$ such that $$m = \sum_{i=0}^{r-1} c_i \phi^i (\mathrm{mod}\, \phi^k - 1)$$

for the input thereinto of integers k and m, a definition field size q, a $GF(q^k)$-rational point P and a Frobenius map φ, and a $P_i$ generation part generates $P_0, P_1, \ldots, P_{r-1}$ from $P_i = \phi^i$, and a table reference addition part obtains mP by $$mP = \sum_{i=0}^{r-1} c_i P_i.$$

69 Claims, 34 Drawing Sheets

OTHER PUBLICATIONS

Kobayashi, Tetsutaro, et al., Fast Elliptic Curve Algorithm Combining Frobenius Map and Table Reference to Adapt to Higher Characteristic, NTT Laboratories, Kanagawa–ken, Japan.

Kobayashi, Tetsutaro, et al., "Exponentiation Table Method for Complex Multiplication Method," NTT Information and Communication Systems Laboratories.

Cheon, J.H., et al., "Two Efficient Algorithms for Arithmetic of Elliptic Curves Using Frobenius Map," Elec. & Telec. Res. Inst., ROK, pp. 195–202.

Muller, V., "Fast Multiplication on Elliptic Curves over Small Fields of Characteristic Two," 1997, 19 pages.

* cited by examiner $S_{19} = c_{0,19}P + c_{1,19}\phi P + c_{2,19}\phi^2 P$
$S = S_{19}$ $S_{18} = c_{0,18}P + c_{1,18}\phi P + c_{2,18}\phi^2 P$
$S = 2S + S_{18}$ $S_0 = c_{0,0}P + c_{1,0}\phi P + c_{2,0}\phi^2 P$
$S = 2S + S_0$

APPARATUS AND METHOD FOR ELLIPTIC-CURVE MULTIPLICATION AND RECORDING MEDIUM HAVING RECORDED THEREON A PROGRAM FOR IMPLEMENTING THE METHOD

BACKGROUND OF THE INVENTION

The present invention relates to an elliptic-curve arithmetic method and an apparatus therefor and, more particularly, to an apparatus and method for implementing information security techniques (elliptic-curve cryptosystem/signature, factoring) and a recording medium having recorded thereon a program for implementing the method.

Elliptic-curve cryptosystems are now receiving attention as next-generation cryptosystems that will assume a key role in an era of electronic commerce, because they achieve the same level of security as do presently dominating cryptosystems but with a far shorter key length. However, conventional elliptic-curve cryptosystems have some problems in the processing speed for encryption and decryption and in the security level, and much study has been made for higher processing speed and for a higher level of security all over the world.

In the implementation of a public key cryptography or digital signature scheme over an elliptic curve, the processing time is mostly spent on m-multiplications over the elliptic curve. In general, the cryptography or signature scheme uses an elliptic curve defined over a finite field $GF(q)$. Let the defined elliptic curve be represented by $E/GF(q)$, where q is a prime or any power of a prime. In many of conventional mounting methods a prime or $2^n$ (n is one or greater integer) is used as q.

It is possible to define an addition and a doubling for a point P over the elliptic curve. These addition and doubling will hereinafter be referred to as "elliptic curve addition" and "elliptic curve doubling" in distinction from ordinary additions and doublings. Of points over the elliptic curve, the identity element of addition will be represented by O. It is customary in the art to construct the m-multiplications (m is 2 or greater integer) by the combined use of the "elliptic curve addition" and the "elliptic curve doubling." In this specification, the $GF(q)$-rational point refers to that one of points defined over an elliptic curve whose coordinates are expressed by the element of $GF(q)$.

In some cases, a "Frobenius map" may also be used to compute the m-multiplications. This scheme will hereinafter be called a "base-$\phi$ expansion method. Goblitz et al. have proposed a method for m-multiplying a $GF(2^k)$-rational point (k is 2 or greater integer) over the elliptic curve $E/GF(2)$ defined over the finite field $GF(2)$. As described below, however, this method accelerates the multiplication only when q is very small.

Next, a description will be given of the elliptic curve and the Frobenius map.

Let $F/GF(q)$ denote an elliptic curve defined over the finite field $GF(q)$. For a group $E(GF(q^k))$ of $GF(q^k)$-rational points over $E/GF(q)$, it is possible to define the multiplication using such a Frobenius map p as mentioned below.

Definition 1 (Frobenius Map)

The Frobenius map is defined by an endomorphism as $$\phi: (x, y) \to (x^q, y^q)$$

for a point $P=(x, y)$, where x, $y \in GF(q)'$, on the elliptic curve. $GF(q)'$ is an algebraic closure of $GF(q)$.

The Frobenius map $\phi$ is an endomorphism over the elliptic curve. Letting m-multiplied map $P \to mP$ be represented by $[[m]]$, it satisfies the following equation:

$$\phi^2 - [[t]]\phi + [[q]] = [[0]], \quad -2\sqrt{q} < t < 2\sqrt{q} \tag{1}$$

Equation (1) has an imaginary root and permits a multiplication different from $[[m]]$ with $\phi$. $\phi$ is a value that is determined uniquely to a given elliptic curve, and it can be calculated by known methods.

The calculation of the Frobenius map can usually be conducted faster than the elliptic curve addition. For example, in the case of representing an element of $GF(q^k)$ by using a normal basis, the Frobenius map can be computed only by the element replacement and the computing time is negligible.

Let $\alpha$ denote a generator of the normal basis. In the normal basis representation, an element $a \in EGF(q^k)$ is represented by $a=[a_0, a_1, \ldots, a_{k-1}]$ using $a_i \in EGF(q)$ which provides $$a = \sum_{i=0}^{k-1} a_i \alpha^{q^i} \tag{2}$$

At this time, $a^q = [a_{k-1}, a_0, a_1, \ldots, a_{k-2}]$, and the map $\phi$ can be applied by the element replacement.

In the base-$\phi$ expansion method, the first step is to transform mP using $\phi$ as follows:

$$mP = \sum_{i=0}^{r} c_i \phi^i P \tag{3}$$

where $-q < c_i < q$ and $r \leq k$.

Koblitz presented an m-multiplication algorithm for $GF(2^k)$-rational points over $E/GF(2)$ through utilization of the base-$\phi$ expansion method (N. Koblitz. "CM-Curves with Good Cryptographic Properties," CRYPTO' 91, pp.279–287 (1991)). And, Solinas proposed an improved version of the algorithm (J. A. Solinas, "An Improved Algorithm for Arithmetic on a Family of Elliptic Curves," CRYPTO' 97, pp.357–371 (1997)). With these algorithms, $-1 \leq c_i 1$ and the m-multiplication can be computed by a maximum of r Frobenius map calculations and elliptic curve additions.

For example, on the elliptic curve $E/GF(2): y^2 + xy = x^3 + 1$, it can be regarded that $\phi = [[(-1+\sqrt{-7})/2]]$. In the case of obtaining 9P without using the base-$\phi$ expansion method, the following equation is used:

$$9P = (2 \times 2 \times 2 + 1)P \tag{4}$$

The calculation of Equation (4) requires three "elliptic curve doublings" and one "elliptic curve addition" (a total of four computations).

On the other hand, the use of $\phi$ provides the following equation:

$$9P = (\phi^5 - \phi^3 + 1)P \tag{5}$$

The calculation of Equation (5) can be conducted by two "elliptic curve additions" since the calculation of $\phi^5 P$ and $\phi^3 P$ takes negligible time. Hence, the computational time can be made shorter than in the case of using Equation (3).

Conventionally, a fast algorithm by the base-$\phi$ expansion method is applied mainly to elliptic curves defined over $GF(q^k)$ for a small integer q, but theoretically, it can be applied in more general cases. In such an instance, however, since the coefficient $c_i$ in Equation (3) becomes $0 \leq |c_i| < q$, the operating time for the $c_i$-multiplication is not negligible when q in $GF(q^k)$ is large. For instance, in Equation (5) in the prior art example, $|c_i|$ is 0 or 1 and the operating time for the $c_i$-multiplication is negligible.

In this instance, the conventional method, if used intact, is not always faster than the method which does not use φ. That is why the base-φ expansion method has been applied only when q is small.

SUMMARY OF THE INVENTION

It is an object of the present invention to provide an arithmetic method which permits m-multiplication over an elliptic curve defined over a finite field $GF(q^k)$ by the base-φ expansion method irrespective of the magnitude of a prime q, and apparatus for implementing the arithmetic method and a recording medium having recorded thereon a program for implementing the method, According to the present invention, there is provided an elliptic-curve arithmetic method for m-multiplying a rational point P over an elliptic curve E/GF(q) defined over a finite field, the method comprising the steps of:

inputting a rational point P, a Frobenius map φ defined over the elliptic curve E/GF(q), an integer k and a prime q equal to or greater than 3 by input means;

calculating integers r and $c_i$ which satisfy the following equation, by using the Frobenius map φ

$$m = \sum_{i=0}^{r-1} c_i \phi^i$$

where $0 \leq i < r$, $0 \leq r \leq k$ and $-q \leq c_i \leq q$;

calculating the following r points $P_0$ to $P_{r-1}$:
$P_0 = P$
$P_1 = \phi P$
$P_2 = \phi^2 P$
:
$P_{r-1} = \phi^{r-1} P$ by generating means supplied with the rational point P and the integers r and $c_i$;

calculating the following equation:

$$mP = \sum_{i=0}^{r-1} c_i \phi^i P$$

by table reference addition means supplied with the r points $P_0$ to $P_{r-1}$; and outputting the calculated mP by outputting means.

DETAILED DESCRIPTION OF THE PREFERRED EMBODIMENTS

Principle of the Invention

Figure 1:
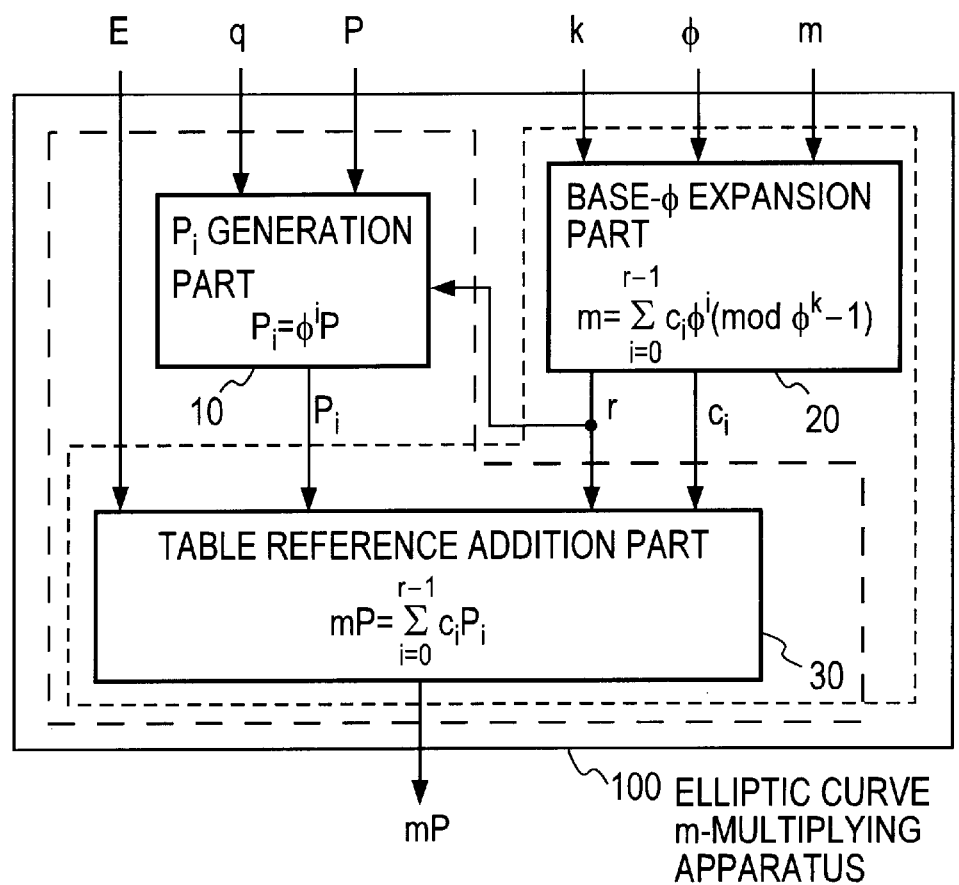
FIG. 1 is a block diagram illustrating an elliptic-curve m-multiplying apparatus according to the present invention.

Provided that the Frobenius map can be computed fast, the computation of Equation (8) can be performed by the same processing as that of a power operation method using a table with pre-computed data (hereinafter referred to as a "table reference method").

The table reference method is one that accelerates the m-multiplication by prestoring pre-computed data. This is intended primarily for fast power operation but can be used equally for elliptic-curve m-multiplication (m is 2 or greater integer). However, the pre-computation takes an enormous amount of time and, hence it has a narrow range of application.

In contrast to the above, the present invention performs arithmetic operations through utilization of the fact that data equivalent to the reference table can be obtained in a very short time by the use of the Frobenius map. That is, the following values are regarded as pre-computed values:

$$P_0=P, P_1=\phi P, \ldots, P_{k-1}=\phi^{k-1}P \quad (6)$$

where k is 2 or greater integer, and $P_i$ is used to perform the m-multiplication by the same method as that of Equation (7) as described later on.

The pre-computation can be done in several ways. The methods are selectively used according to the ratio between q and k. The pre-computation scheme permits application of the base-φ expansion method to fields with large q's as well, which has been impossible in the past. With this scheme, the operation for fields with small q's can also be conducted faster than with the prior art.

Table Reference Method

In the case of computing mP (which will hereinafter be referred to as an m-multiplication) using a certain elliptic curve point P and m which varies each time, the computation can be conducted fast using the table reference method.

Various schemes have been proposed on the table reference method as described below.

A (Pre-computation): Pre-compute some $P_i$'s such that $P_i=a_iP$, and store them.

B (m-multiplication): Compute $c_i$ such that $m=\Sigma_i a_i c_i$ and then compute mP using the pre-computed $P_i$ by $$mP = \sum_i c_i P_i \quad (7)$$

The table reference method is classified into a "BGMW method", a "comb method", a "box method" and a "window method" according to the method of constructing Equation (7). Some table reference methods will be described below in brief. In practice, other table reference methods and combinations thereof are also available. Any table reference methods can be used in the present invention.

A description will be given of a method of computing mP for m that satisfies $0<m<b^k$ where b and k are 2 or greater integers.

In the following description, let log use base 2 and let [x] denote a maximum integer equal to or smaller than x. Let b and k be 2 or greater integers, $m_i$ denote a base-b expanded value of m and $m_{ij}$ a binary-expanded value (0 or 1) of $m_i$ (an integer satisfying $0 \leq m_i \leq b-1$). That is, $$m = \sum_{i=0}^{k-1} m_i b^i \quad (8)$$

$$m_i = \sum_{j=0}^{[\log b]} m_{ij} 2^j \quad (9)$$

BGMW Method

A (Pre-computation):

$$P_0=P, P_1=bP, \ldots, P_{k-1}=b^{k-1}P$$

B (m-multiplication):

Step 1: $S_d=\Sigma P_i$, (d and k are integers satisfying $0 \leq d<b$, $1 \leq i \leq k$), where Σ means the addition of $P_i$ for those i's that satisfy $m_i \leq d$.

Step 2: Output $$S = \sum_{d=0}^{b} S_d \quad (10)$$

Comb Method

A (Pre-computation):

$$P_0=P, P_1=bP, \ldots, P_{k-1}=b^{k-1}P$$

B (m-multiplication)
Step 1:

$$S_j = \sum_{i=0}^{k-1} m_{ij} P_i \quad (0 < j < [\log b] + 1) \quad (11)$$

Step 2:

$$S = \sum_{j=0}^{[\log b]} 2^j S_j \quad (12)$$

Box Method
A (Pre-computation):

$$P_0 P, P_1 = bP, \ldots, P_{k-1} = b^{k-1} P$$

B (m-multiplication)
Step 1:

$$S_j = \sum_{i=0}^{k-1} \delta_{ij} P_i \quad (13)$$

where $\delta_{ij}=1$ for m=j and $\delta_{ij}=0$ otherwise.
Step 2:

$$S = \sum_{j=0}^{b-1} j S_j \quad (14)$$

Window Method
A (Pre-computation):

$$P_1 = P, P_2 = 2P, \ldots, P_{b-1} = (b-1)P$$

B (m-multiplication): Output $$S = \sum_i b_i P_i.$$

In the case of using any one of the BGMW, comb and box methods, the results obtained using the Frobenius map φ (Equation (6)) are regarded as pre-computed values. In the case of using the Window method, the Frobenius map is applied to the b-multiplying part in the m-multiplying part.

The table reference method that minimizes the operating time differs with q and k. By choosing $q^k$ to be a fixed value $2^n$ and introducing the average operating time of each system, a multiplying apparatus can be obtained which minimizes the operating time for q and n.

EMBODIMENT 1

FIG. 1 is a block diagram illustrating an elliptic-curve m-multiplying apparatus according to a first embodiment of the present invention. Elliptic-Curve m-Multiplying Apparatus (FIG. 1)

FIG. 1 depicts an example of the configuration of an apparatus which outputs mP for the inputs thereto of an elliptic curve E, a finite field size q, a positive integer k equal to or greater than 2, a $GF(q^k)$-rational point P over the elliptic curve E, the Frobenius map γ and a positive integer m equal to or greater than 2. The m-multiplying apparatus, indicated generally by 100, comprises a $P_i$ generation part 10, a base-φ expansion part 20 and a power table addition part 30.

Figure 3:
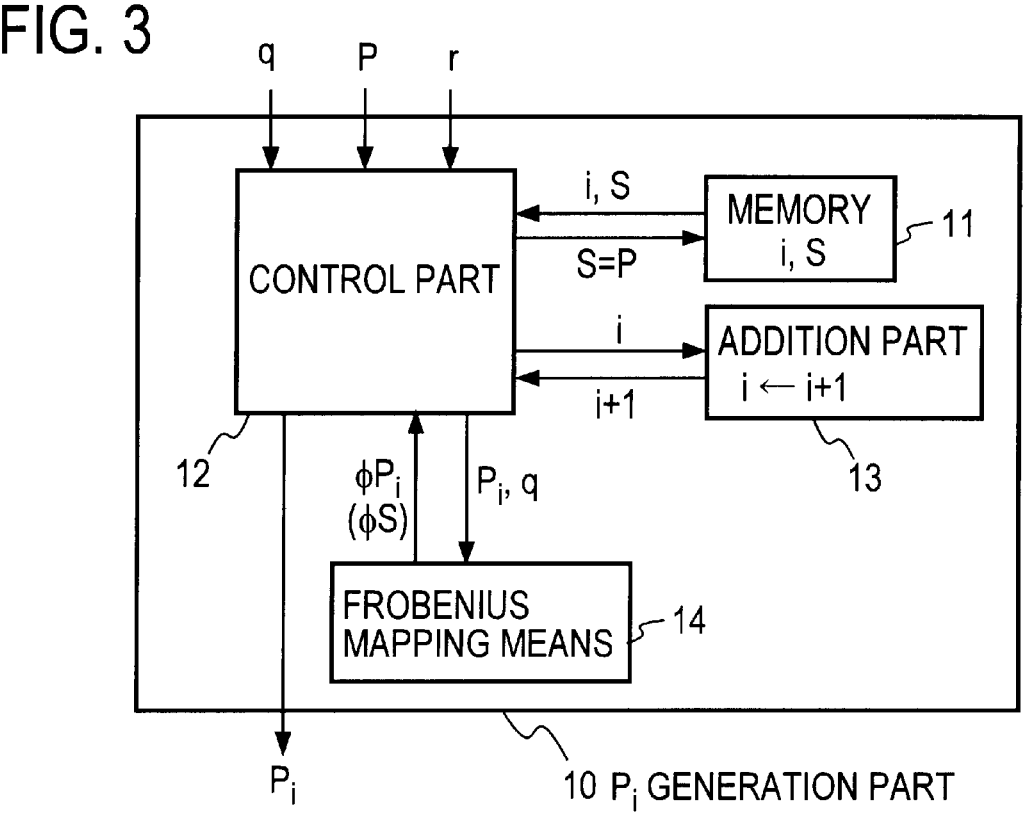
FIG. 3 is a block diagram depicting the configuration of a $P_i$ generation part 10 in FIG. 1.
Figure 7:
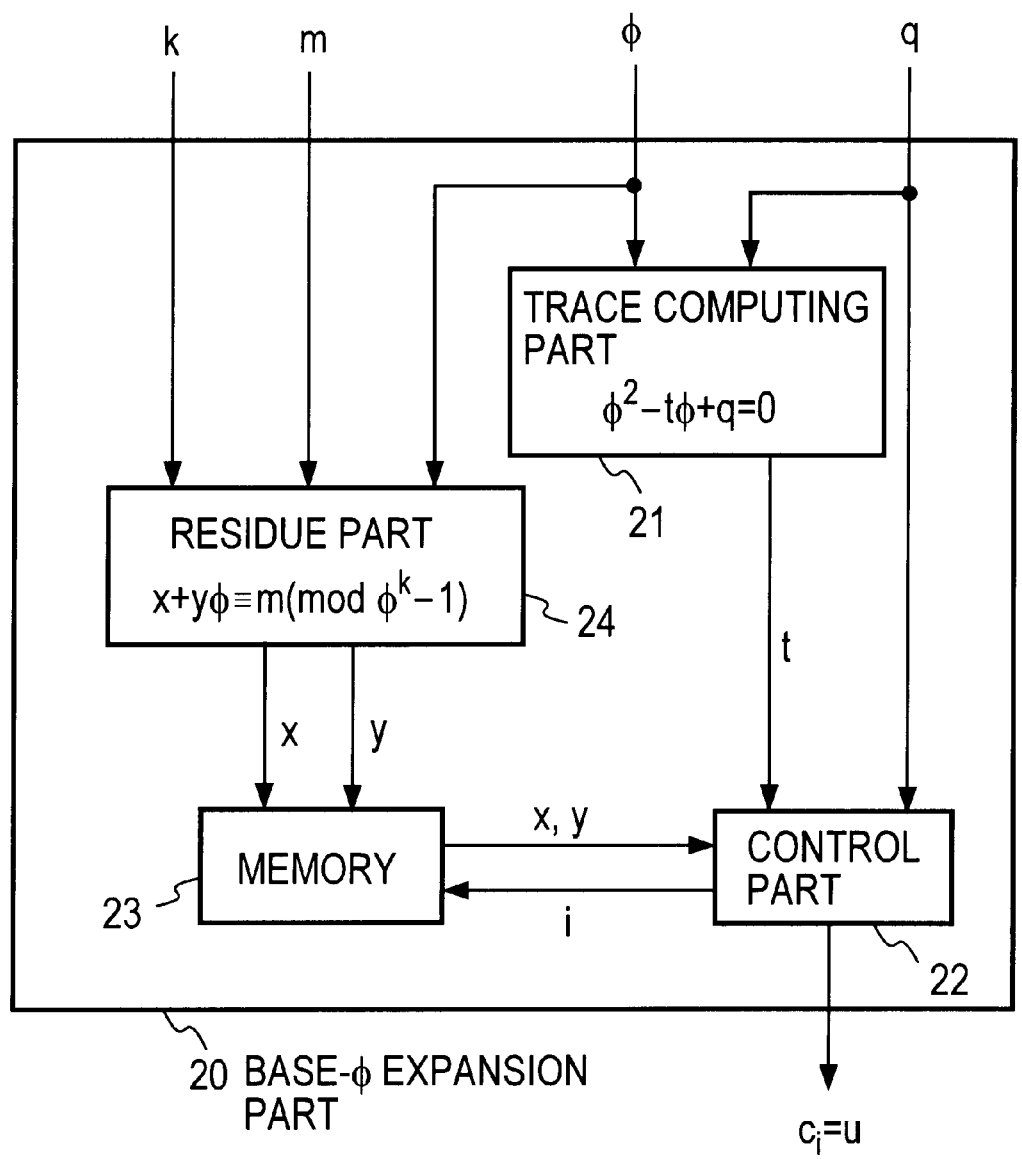
FIG. 7 is a block diagram depicting the configuration of a base-φ expansion part 20 in FIG. 1.

The $P_i$ generation part 10 has such a configuration as depicted in FIG. 3 and the base-φ expansion part 20 such a configuration as depicted in FIG. 7. The table reference addition part 30 has any one of the configurations shown in FIGS. 9, 10 and 11. The configurations of these parts will be described in detail later on.

Figure 2:
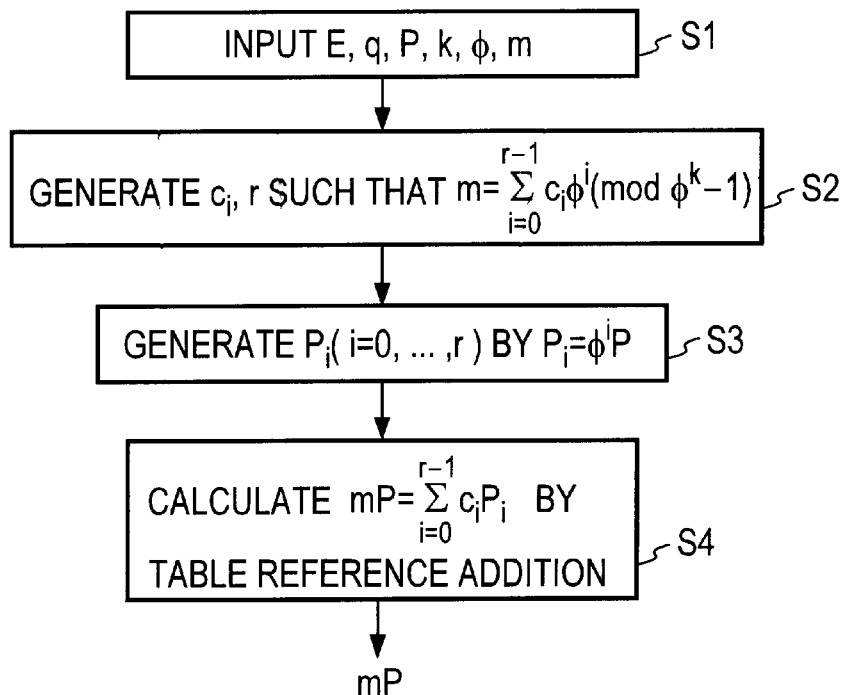
FIG. 2 is a flowchart depicting a procedure for elliptic-curve m-multiplication.

The multiplication of the m-multiplying apparatus of FIG. 1 is implemented by a computer following the procedure of FIG. 2 as described below:

Step S1: Input E, q, P, k, φ, and m.

Step S2: For the inputs thereto k, φ, and m, the base-φ expansion part 20 calculates and outputs $C_0, c_1, \ldots, c_{r-1}$ and r that satisfy the following equation:

$$m = \sum_{i=0}^{r-1} c_i \phi^i (mod \phi^k - 1) \quad (15)$$

Step S3: For the inputs thereto q, P, k, and r, the $P_i$ generation part 10 calculates and outputs $P_0, P_1, \ldots, P_{r-1}$ that satisfy the following equation:

$$P_i = \phi^i P$$

Step S4: For the inputs thereto E, $P_i$ and $c_i$, the table reference addition part 30 calculates the following equation:

$$mP = \sum_{i=0}^{r-1} c_i P_i \quad (16)$$

and outputs mP.

$P_i$ Generation Part (FIG. 3)

FIG. 3 illustrates by way of example, the configuration of the $P_i$ generation part 10 which outputs $\phi^0 P, \phi^1 P, \ldots, \phi^{r-1} P$ for the inputs thereto of the definition field size q, the $GF(q^k)$-rational point P and the integer r. The $P_i$ generation part 10 is mad up of a memory 11, a control part 12, an addition part 13 and a Frobenius mapping means 14.

The Frobenius mapping means 14 has such a configuration as described later with reference to FIG. 5 or 6.

Figure 4:
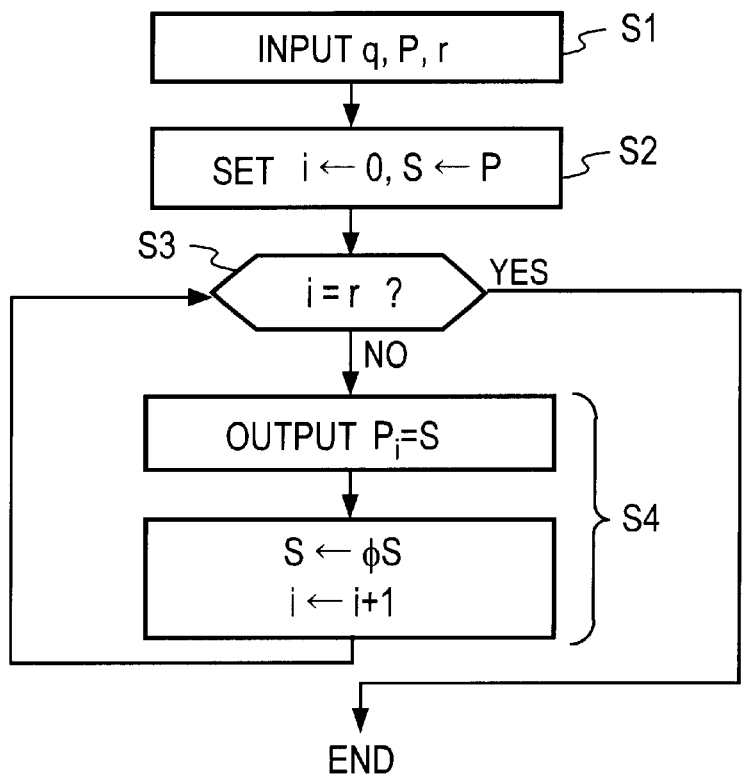
FIG. 4 is a flowchart showing the procedure of the $P_i$ generation part 10.

The operation of the $P_i$ generation part 10 is implemented by a computer following the procedure of FIG. 4 as described below.

Step S1: Input q, P and r.

Step S2: For the input values thereto q, P and r, the control part 12 passes P as an initial value of S to the memory 11, which holds a counter value i and an elliptic-curve point S. The initial values of i and S are 0 and P, respectively.

Step S3: For the input values thereto q, P, r and i, S, the control part 12 makes a check to see if i=r, and if so, the control part 12 terminates the operation.

Step S4: If i≠r, then the control part 12 inputs S into the Frobenius mapping means 14 to calculate φS, then outputs it as $P_i$, an holds φS and i+1 as new S and i in the memory 11, followed by a return to step S3.

Figure 5:
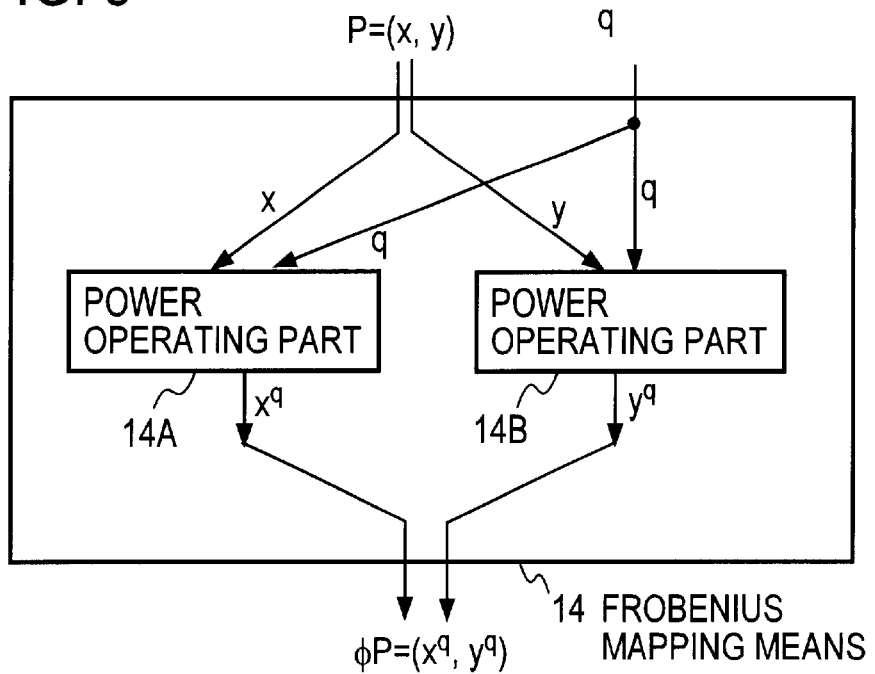
FIG. 5 is a block diagram depicting the configuration of a Frobenius mapping means 14 in FIG. 3.

Frobenius Mapping Means (FIG. 5)

FIG. 5 shows an example of the configuration of the Frobenius mapping means 14 which outputs φP for inputs thereto of the $GF(q^k)$-rational point P=(x, y) and the integer q.

The mapping means 14 can be used for an elliptic-curve point P=(x, y) where x, y∈$GF(q^k)$. The mapping means 14 is composed of power operating parts 14A and 14B.

Figure 18:
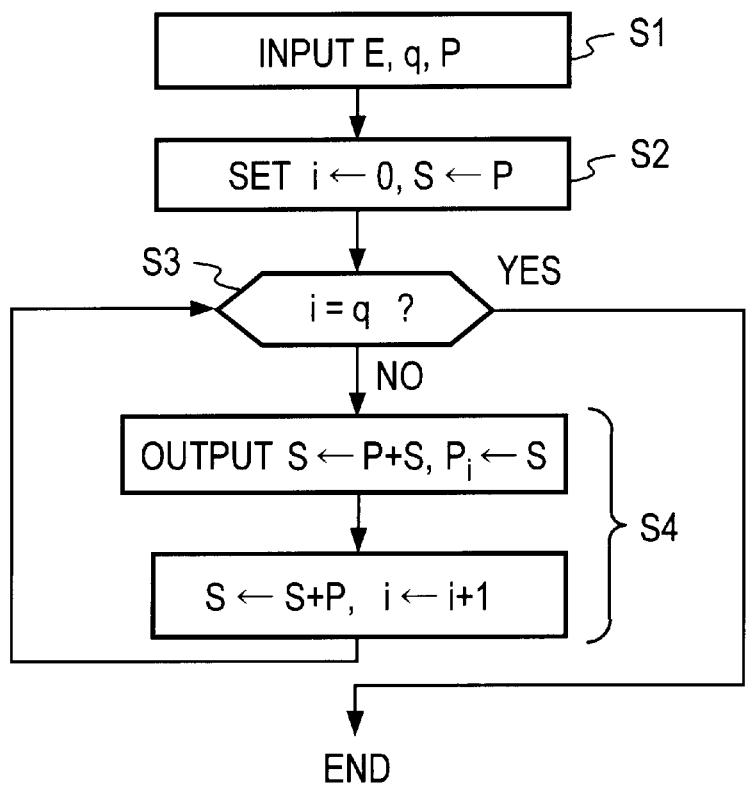
FIG. 18 is a flowchart showing the procedure of a $P_i$ generation part (WINDOW)

The operation of the $P_i$ generation part 10 is implemented by a computer following the procedure of FIG. 18 as described below.

Step S1: Input $P=(x, y)$ and q.

Step S2: The power operating part 14A calculates $x^q$ for the input values x and q, and the power operating part 14B $y^q$ for the input values y and q.

Step S3: The Frobenius mapping means 14 outputs $(x^q, y^q)$ as $\phi P$.

Figure 6:
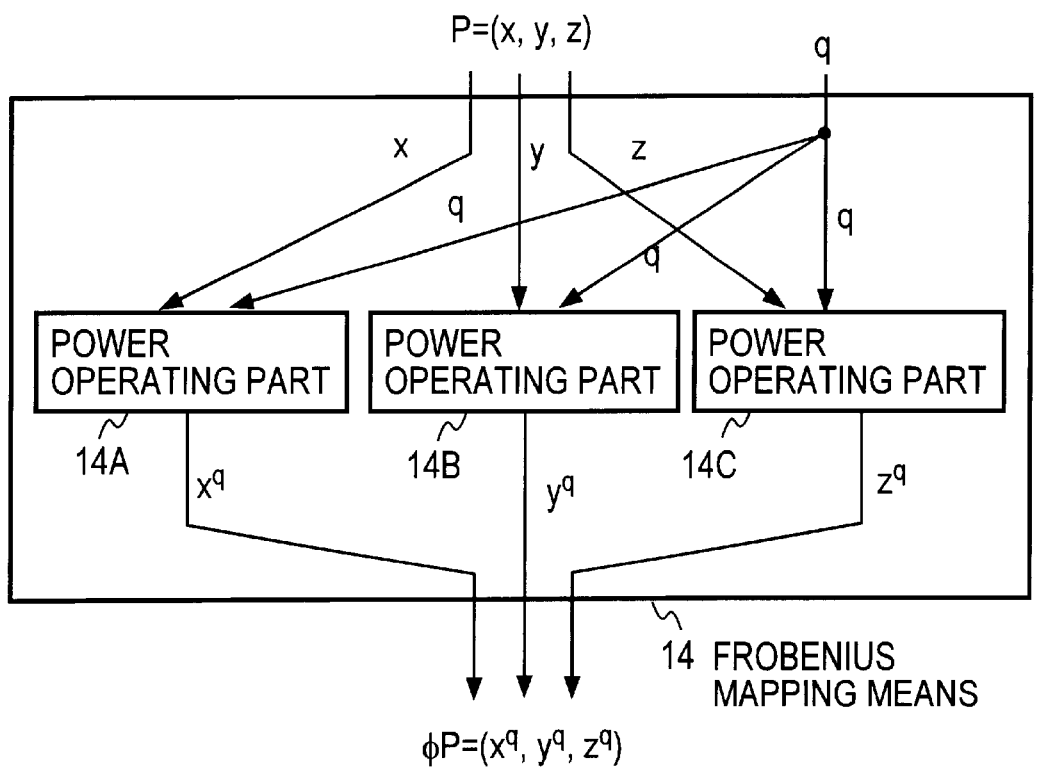
FIG. 6 is a block diagram depicting another configuration of the Frobenius mapping means 14.

Frobenius mapping means (FIG. 6)

FIG. 6 illustrates an example of the configuration of the Frobenius mapping means 14 which outputs $\phi P$ for the inputs thereto of the $GF(q^k)$ rational point P and the integer q.

The mapping means 14 can be used for an elliptic-curve point $P=(x, y, z)$ where x, y, z∈$GF(q^k)$. The Frobenius mapping means 14 comprises power operating parts 14A, 14B and 14C.

The operation of this mapping means 14 is implemented by a computer following the procedure of FIG. 19 as described below.

Step S1: Input $P=(x, y, z)$ and q.

Step S2: The power operating part 14A calculates $x^q$ for the input values x and q, the power operating part 14B $y^q$ for the input values y and q, and the power operating part 14C $z^q$ for the input values z and q.

Step S3: The Frobenius mapping means 14 outputs $(x^q, y^q, z^q)$ as $\phi P$.

Base-$\phi$ Expansion Part (FIG. 7)

FIG. 7 illustrates an example of the configuration of the base-$\phi$ expansion part 20 which calculates, for the inputs thereto of the definition field size q, the extension order k, the integer m and the Frobenius map $\phi$, and outputs $c_0$, $c_1, \ldots, c_{r-i}$ and r which satisfy the following equation:

$$m = \sum_{i=0}^{r-1} c_i \phi^i \quad (17)$$

The base-$\phi$ expansion part 20 comprises a trace computing part 21, a control part 22, a memory 23 and a residue part 24.

Figure 8:
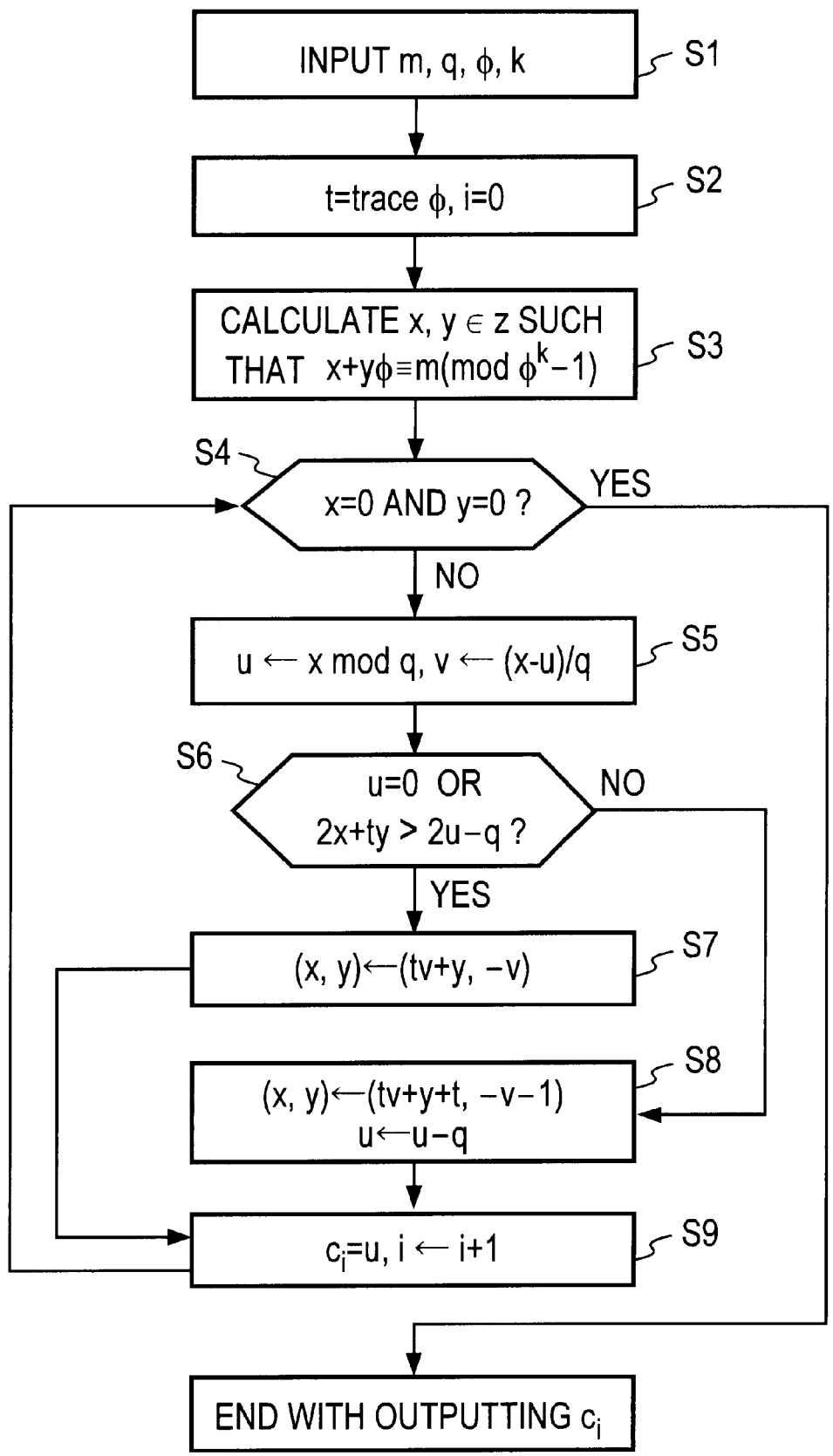
FIG. 8 is a flowchart showing the procedure of the base-φ expansion part 20.

The operation of the base-$\phi$ expansion part 20 is performed following the procedure depicted in FIG. 8.

Since the trace is a value that is fixed by $\phi$ and q, it may be precalculated and provided from the outside, in which case, the trace computing part 21 is unnecessary.

In the base-$\phi$ expansion part 20, the arithmetic operation is conducted as described below.

Step S1: Input m, q, $\phi$ and k.

Step S2: The trace computing part 21 computes from the input values $\phi$ and q a value t which satisfies the following equation and passes it to the control part 22.

$$\phi^2 - t\phi + q = 0 \quad (18)$$

Step S3: The residue part 24 computes for the inputs thereto m, $\phi$ and k, values x and y which satisfy the following equation and stores them in the memory 23.

$$x + y\phi \equiv m \pmod{\phi^k - 1} \quad (19)$$

It is also possible to input pre-computed values x and y from an external source. In such an instance, the input values are x and y in place of the integer m. When this arithmetic operation is not performed, the residue part 24 is unnecessary.

The memory 23 retains the counter value i and integers x, y, u and v. The initial value of i is 0.

Step S4: The control part 22 determines whether x=0 and y=0 hold for input values x, y, t and q, and if so, terminate the procedure.

Step S5: The control part 22 sets, for the input values thereto x, y, t and q, $$u \leftarrow x \bmod q \text{ and}$$
$$v \leftarrow (x-u)/q \quad (20)$$

Step S6: Check whether u=0 or $2x+ty>2u-q$.

Step S7: If so, set $(x, y) \leftarrow (ty+y, -v)$.

Step S8: If not, set $(x, y) \leftarrow (tv+y+t, -v-1)$, $u \leftarrow u-q$. Write these values in the memory 23.

Step S9: The control part 22 outputs u as $c_i$, then adds 1 to i, and writes it in the memory 23, followed by a return to step S4.

Table Reference Addition Part (Comb-Type)

Figure 9:
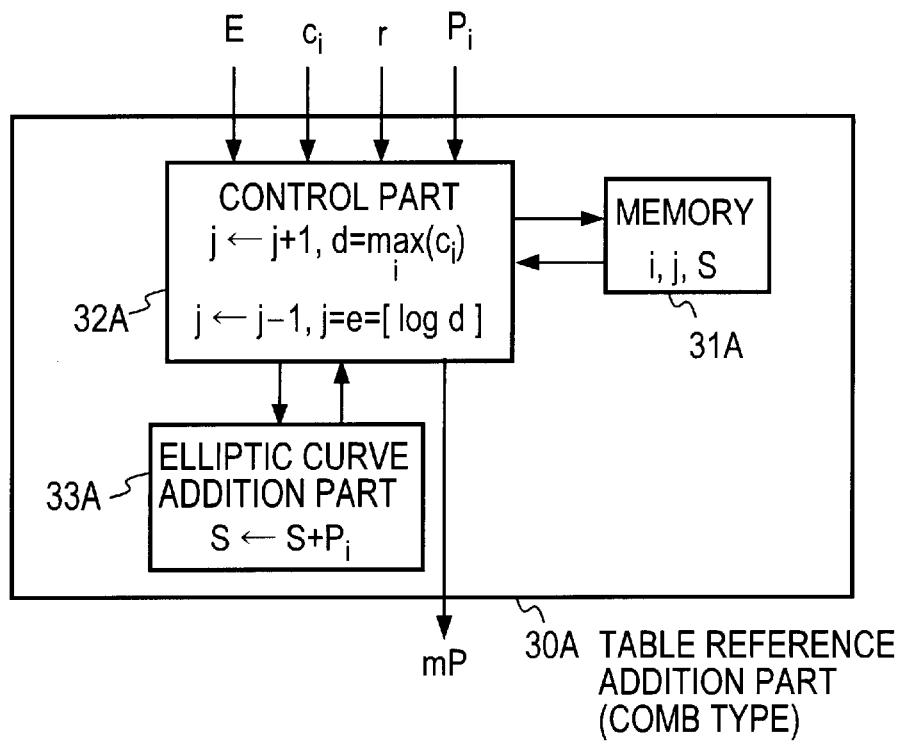
FIG. 9 is a block diagram depicting the configuration of a table reference addition part (comb-type)

FIG. 9 depicts a table reference addition part (comb-type) 30A, which calculates Equation (16) for the inputs thereto of elliptic-curve points $P_0, P_1, \ldots, P_{r-1}$ and integers $c_0, c_1, \ldots, c_{r-1}$ and outputs mP. The table reference addition part 30A is made up of a memory 31A, a control part 32A and an elliptic-curve addition part 33A.

Figure 12:
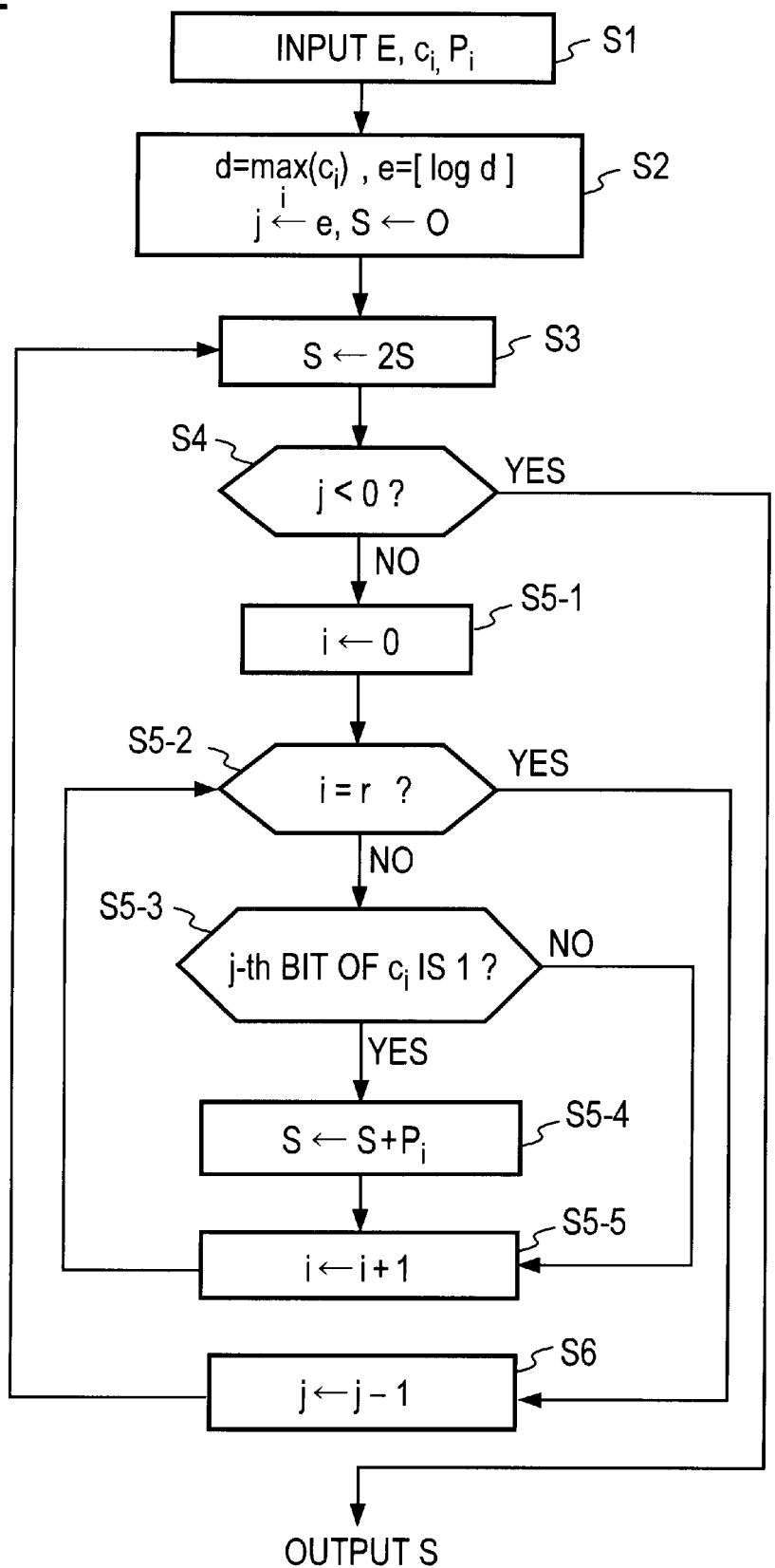
FIG. 12 is a flowchart showing the procedure for table reference addition (comb-type)

The operation of the addition part 30 is implemented by a computer following the procedure depicted in FIG. 12.

The table reference addition part 30A performs the arithmetic operation as described below.

Step S1: Input E, $c_1$ and $P_i$.

Step S2: The control part 32A calculates a maximum value d and e=[log d] from the input values E, $c_i$ and $P_i$, then sets j←e and S←O and stores j and S in the memory 31A. Assume here that [log d] represents a maximum integer not exceeding d. The memory 31A retains i, j, r and S, and passes them to the control part 32A.

Step S3: The control part 32A doubles the input value S and stores it in the memory 31A.

Step S4: If j<0, then the control part 32A outputs S and terminates the procedure.

Step S5: If j≧0, then the control part 32A determines whether a j-th bit of each $c_i$ (steps S5-1, S5-2, S5-5) is 1 for i=0, ..., r−1 (step S5-3). If so, add $P_i$ to S in the elliptic-curve addition part 33A (step S5-4).

Step S6: The control part 32A subtracts 1 from j, followed by a return to step S3.

Figure 10:
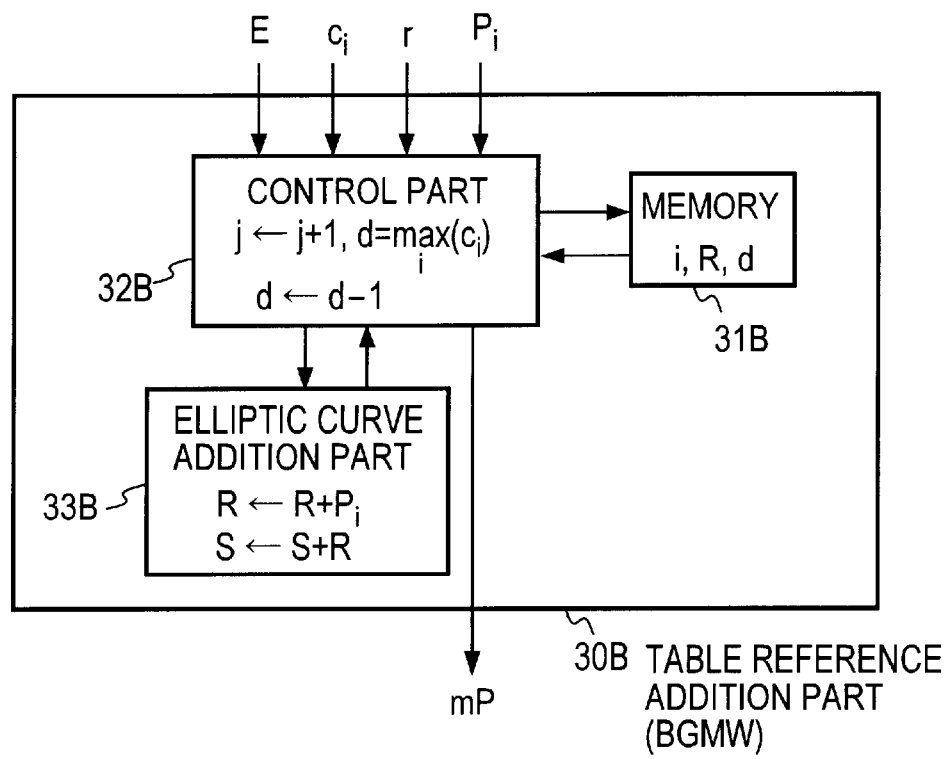
FIG. 10 is a block diagram depicting the configuration of a table reference addition part (BGMW)

Table Reference Addition Part (BGMW) (FIG. 10)

FIG. 10 depicts a table reference addition part (BGMW) 30B, which calculates Equation (16) for the inputs thereto of an elliptic curve E, elliptic-curve points $P_0, P_1, \ldots, P_{r-1}$ and integers $c_0, c_1, \ldots, c_{r-1}$ and outputs mP. The reference table addition part 30B comprises a memory 31B, a control part 32B and an elliptic-curve addition part 33B.

Figure 13:
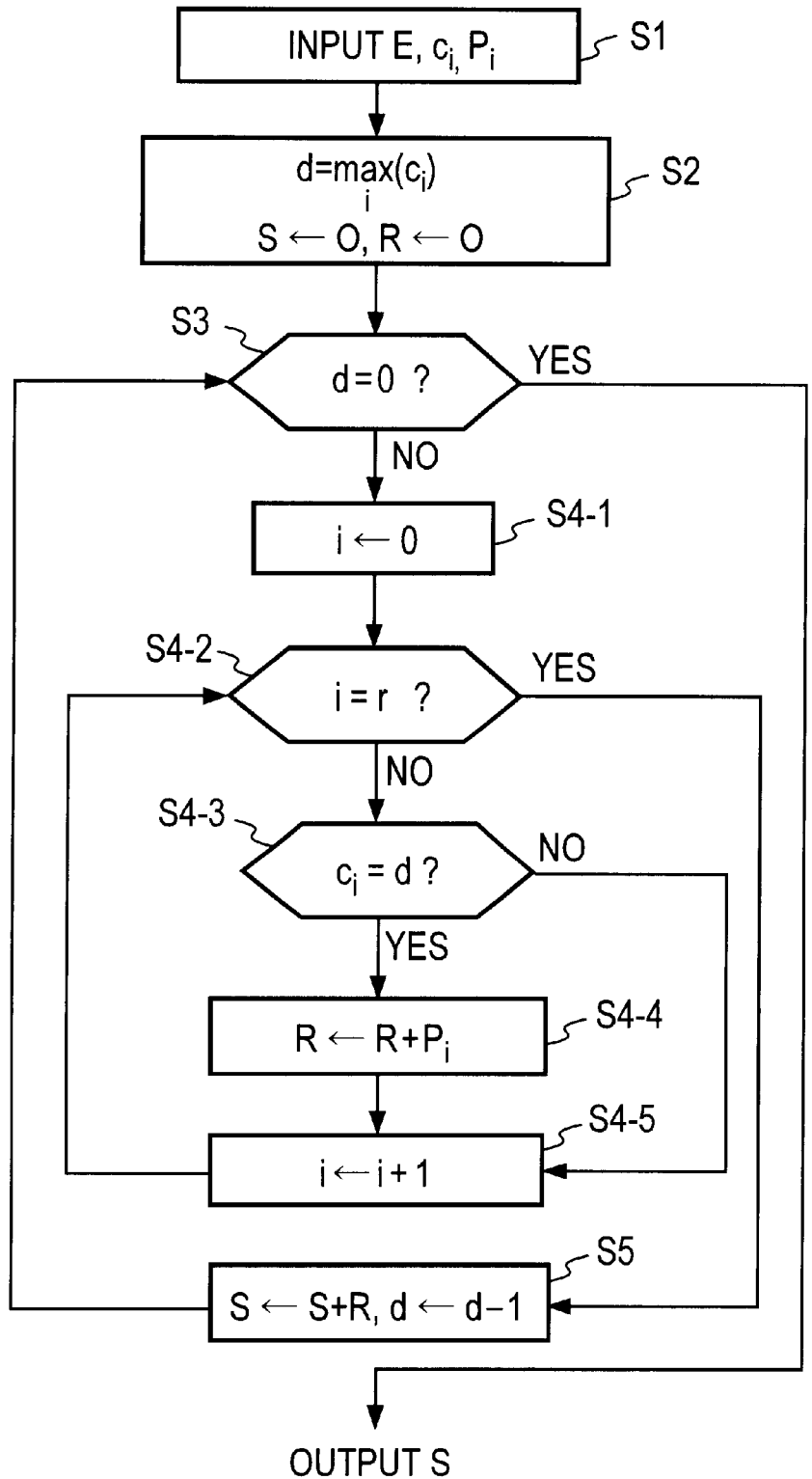
FIG. 13 is a flowchart showing the procedure for table reference addition (BGMW)

The operation of this apparatus is implemented by a computer following the procedure shown in FIG. 13.

Step S1: Input E, $c_i$, $P_i$.

Step S2: The control part 32B calculates a maximum value d from the input values E, $c_i$ and $P_i$, then sets S←O and R←O and stores R and S in the memory 31B. The memory 31A retains S, r, d and i, and passes them to the control part 32B.

Step S3: The control part 32B makes a check to see if the input value d equals zero, and if d=0, then it outputs S and terminates the procedure.

Step S4: If d≠0, then set i=0 in step S4-3, and determine in step S4-2 whether i=r. If not, then determine in step S4-3 whether $c_i$=d, and if not, go to step S4-5 to increment i, followed by a return to step S4-2. If $c_i$=d, then update R←R+$P_i$ in step S4-4 and increment i in step S4-5, followed by a return to step S4-2.

Step S5: If i=r in step S4-2, then go to step S5 to add R to S in the elliptic-curve addition part 33B (S←S+R), subtract 1 from d (d←d−1), and store S, R and d in the memory 31B, followed by a return to step S3.

Figure 11:
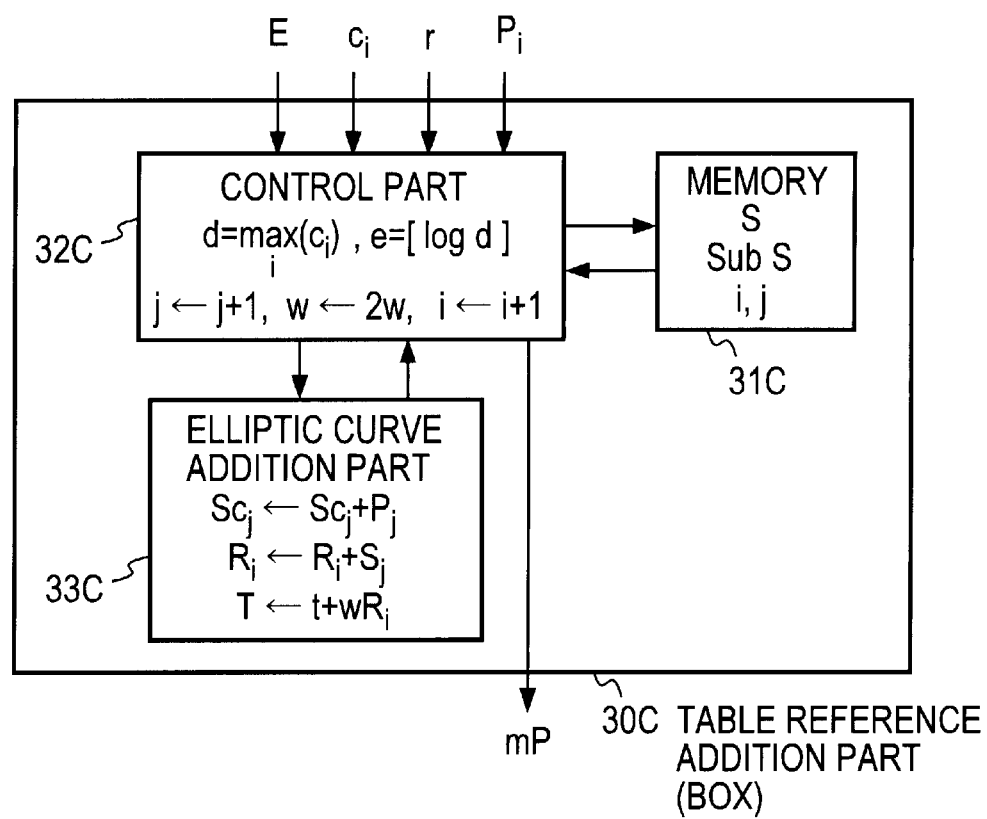
FIG. 11 is a block diagram depicting the configuration of a table reference addition part (box-type)

Table Reference Addition Part (Box-Type) (FIG. 11)

FIG. 11 depicts a table reference addition part 30C (box-type), which calculates Equation (16) for the inputs thereto of an elliptic curve E, elliptic-curve points $P_0$, $P_1, \ldots, P_{r-1}$ and integers $c_0, c_1, \ldots, c_{r-1}$ and outputs mP. The table reference addition part 30C comprises a memory 31C, a control part 32C and an elliptic-curve addition part 33C.

Figure 14:
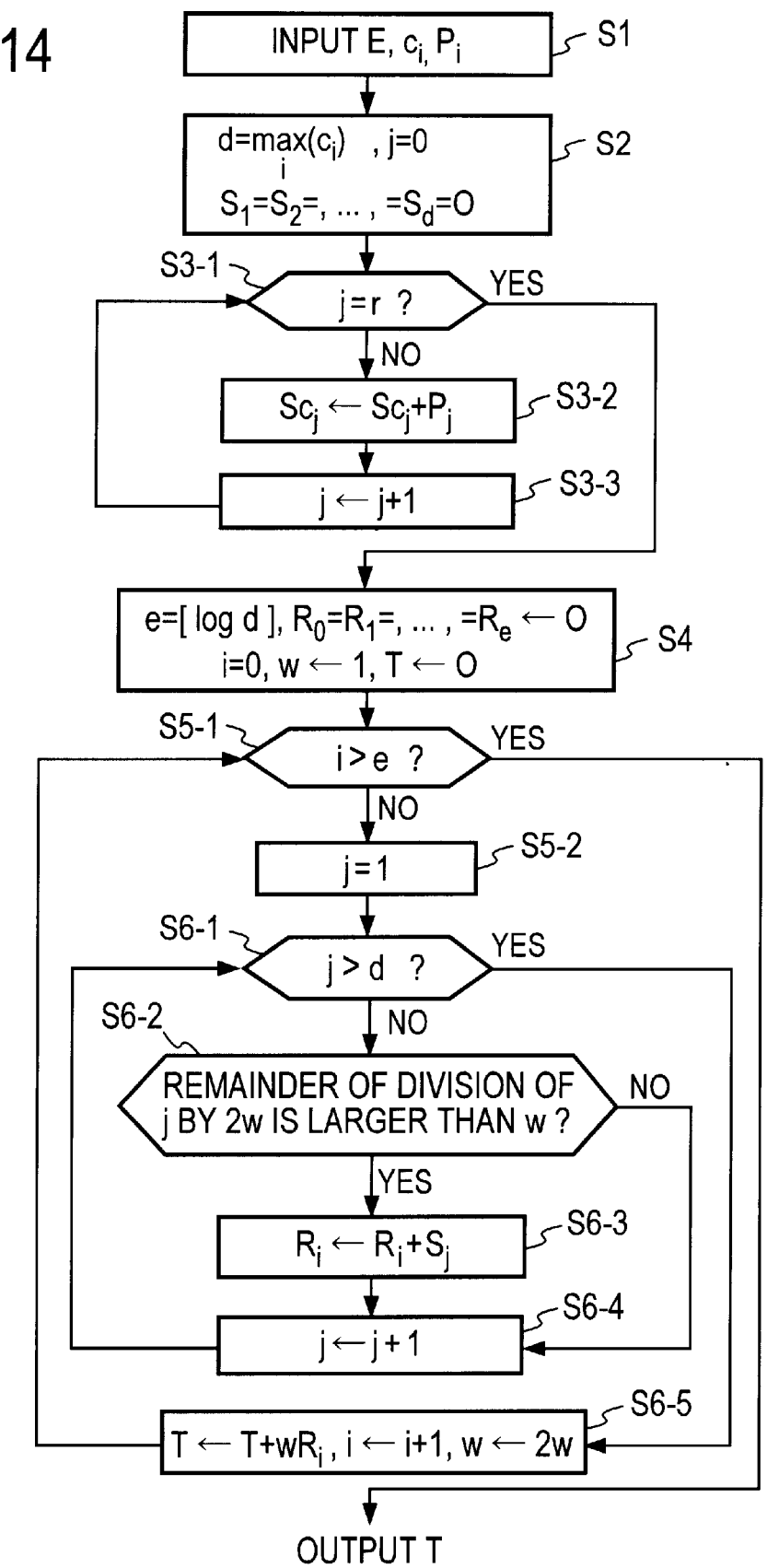
FIG. 14 is a flowchart showing the procedure for table reference addition (box-type)

The operation of this apparatus is implemented by a computer following the procedure of FIG. 14 as described below.

Step S1: Input E, $c_i$, $P_i$.

Step S2: The control part 32C calculates a maximum value d and e=[log d] (which is assumed to represent a maximum integer equal to or smaller than log d) from the input values E, $c_i$ and $P_i$, then sets j←0, w←1, $S_0, S_1, \ldots, S_d$←O, $R^0, R_1, \ldots, R_e$←O, T←O and stores j, $S_0, \ldots, S_d$, $R_0, \ldots, R_e$ and T in the memory 31C.

Step S3: The control part 32C adds $P_j$ to $S_{c_j}$ (step S3-2) for j=0, ..., r−1 (steps S3-1, S3-3) and stores it in the memory 31C.

Step S4: The control part 32C calculates e=[log d] (a maximum integer equal to or smaller than log d), then sets i←0, w←1, $R_0, R_1, \ldots, R_e$←O, T←O and stores them in the memory 31C.

Step S5: The control part 32C performs the following step S6 for i=0, ..., e (steps S5-1, S6-1).

Step S6: The control part 32C determines whether (step S6-2) the remainder of division of j by 2w is larger than w for j=1, ..., d (step S6-1). If so, add $S_j$ to $R_j$ (step S6-3), and if not, go back to step S6-1. If j>d in step S6-1, then add $wR_i$ to T and 1 to i and double w (step S6-5).

Step S7: The control part 32C outputs T as mP and terminates the procedure.

EMBODIMENT 2

Figure 15:
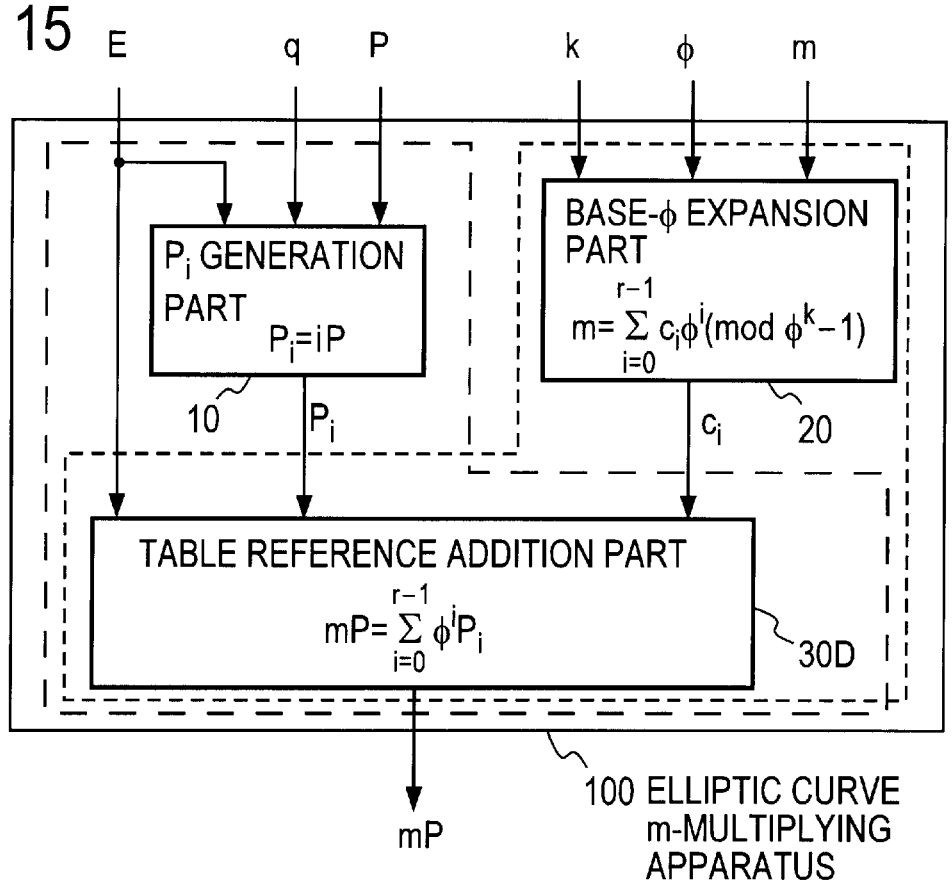
FIG. 15 is a block diagram illustrating another example of the elliptic-curve m-multiplying apparatus according to the present invention.

Elliptic-Curve m-Multiplying Apparatus (FIG. 15)

FIG. 15 illustrates in block form an example of the configuration of an elliptic-curve m-multiplication apparatus, which outputs mP for the inputs thereto of elliptic curve E, definition field size q, integer k, $GF(q^k)$-rational point P, Frobenius map φ and integer m. The apparatus, indicated generally by 100, comprises a $P_i$ generation part 10, a base-φ expansion part 20 and a table reference addition part 30.

Figure 17:
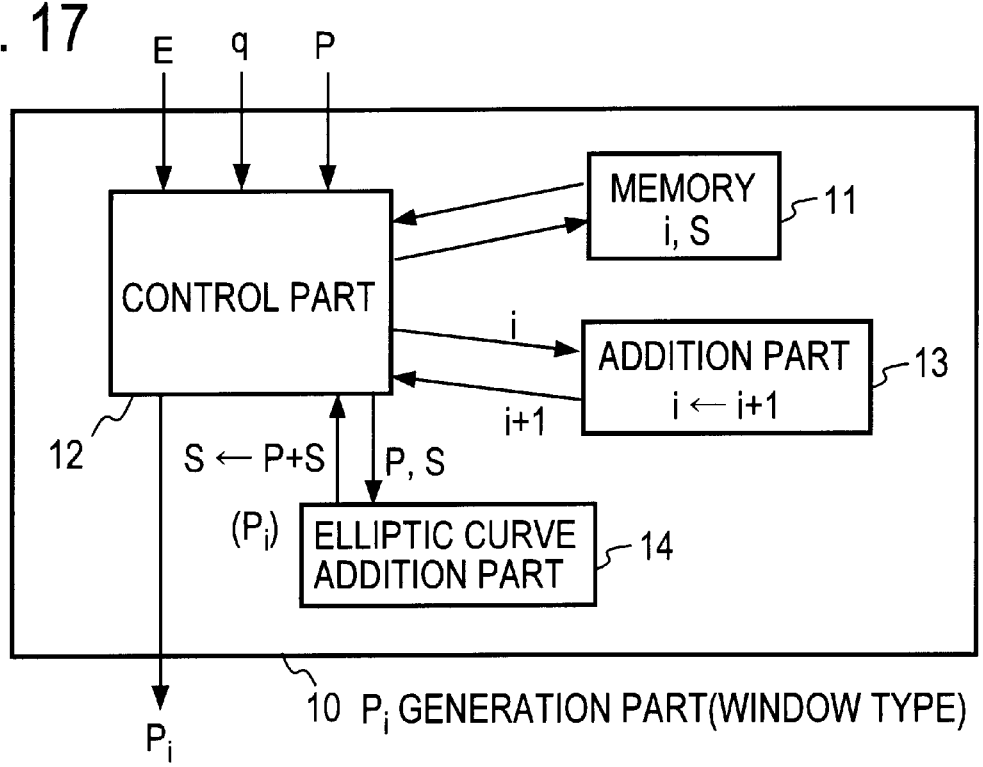
FIG. 17 is a block diagram depicting the configuration of a $P_i$ generation part 10 in FIG. 15.
Figure 19:
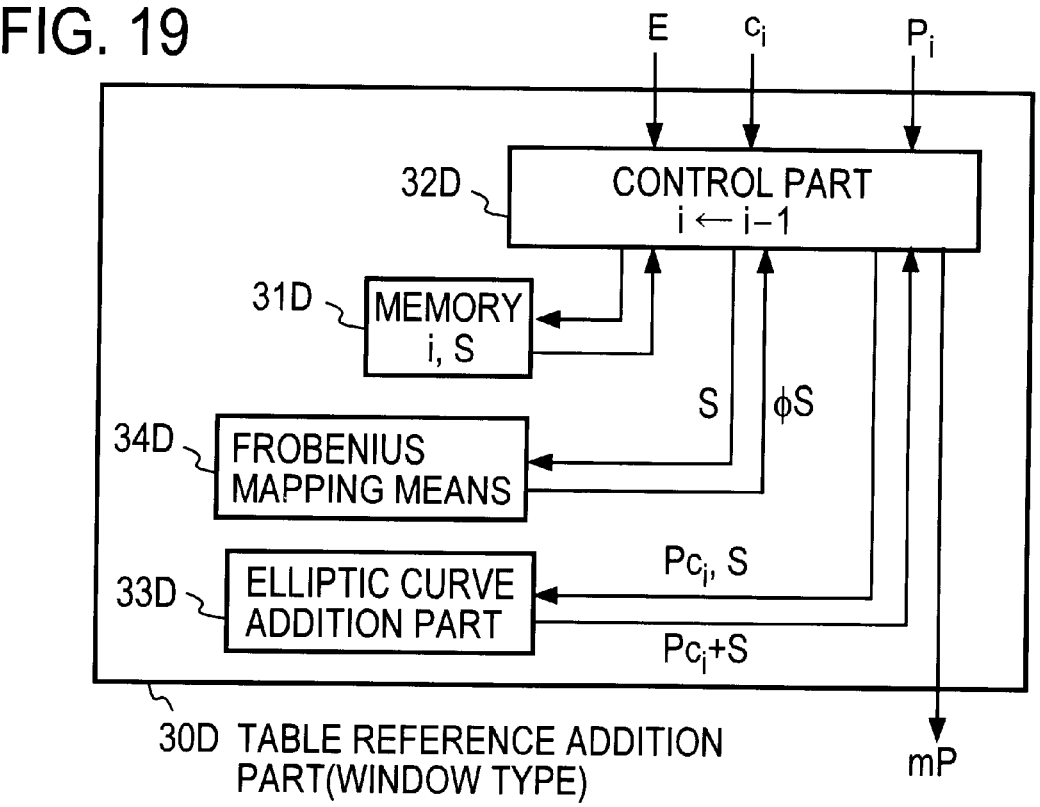
FIG. 19 is a block diagram depicting the configuration of a table reference addition part (WINDOW)

The $P_i$ generation part 10 has such a configuration as depicted in FIG. 17, the base-φ expansion part 20 has the same configuration as depicted in FIG. 5, and the table reference addition part 30 has such a configuration as depicted in FIG. 19.

Figure 16:
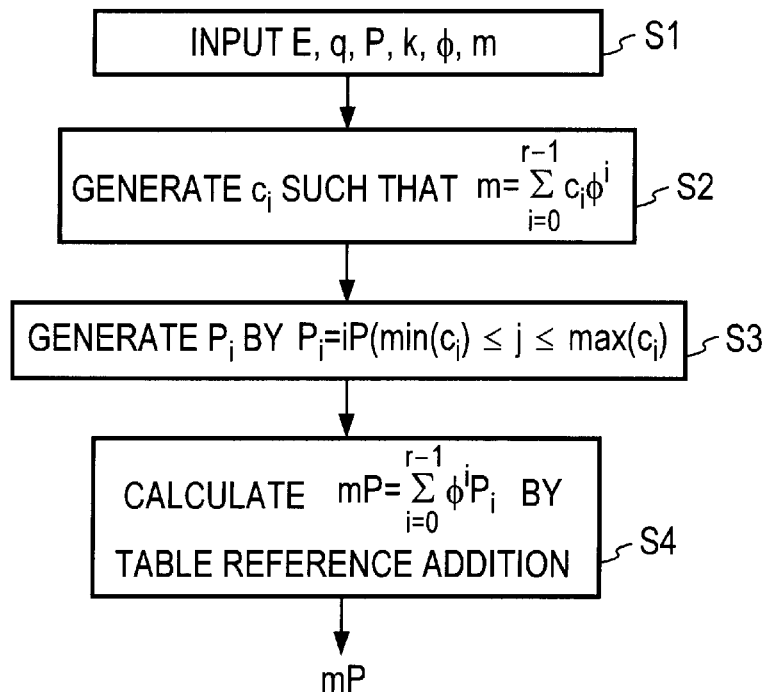
FIG. 16 is a flowchart showing the procedure for the elliptic-curve m-multiplication by the apparatus of FIG. 15.

The operation of the apparatus 100 is implemented by a computer following the procedure of FIG. 16 as described below.

Step S1: Input E, q, k, P, φ and m.

Step S2: For the inputs k, φ, and m, the base-φ expansion part 20 calculates and outputs $c_0, c_1, \ldots, c_{r-1}$ and r that satisfy the equation (15).

Step S3: For the inputs E, q and P, the $P_i$ generation part 10 calculates $P_0, P_1, \ldots, P_{r-1}$1 by $P_i$=iP and outputs them.

Step S4: For the inputs E, $P_i$ and $c_i$ the power table addition part 30 calculates the following equation:

$$mP = \sum_{i=0}^{r-1} \phi^i P_i \qquad (21)$$

and outputs mP.

$P_i$ Generation Part (FIG. 17)

FIG. 17 illustrates an example of the configuration of the $P_i$ generation part 10, which outputs P, 2P, ..., (q−1)P for the inputs thereto of elliptic curve E, definition field size q and $GF(q^k)$-rational point P. The $P_i$ generation part 10 comprises a memory 11, a control part 12, an addition part 13 and an elliptic-curve addition part 14.

The operation of the Pi generation part 10 is implemented by a computer following the procedure of FIG. 18 as described below.

Step S1: Input E, q and P.

Step S2; The memory 11 retains a counter value i and an elliptic-curve point S. Their initial values are 0 and O, respectively, which are passed to the control part 12.

Step S3: The control part 12 checks whether i=q for the input values q, P and i and S. If so, then terminate the arithmetic operation.

Step S4: If i≠q, the control part 12 inputs P and S into the elliptic-curve addition part 14 to calculate P+S, then outputs P+S as $P_i$, and stores P+S and i+1 as new S and i in the memory 11, followed by a return to step S3.

Table Reference Addition Part (Window) (FIG. 19)

FIG. 19 illustrates an example of the configuration of a table reference addition part 30D, which calculates the following equation for the input thereto of elliptic curve E, elliptic-curve points $P_0, P_1, \ldots, P_{r-1}$ and integers $c_0, c_1, \ldots, c_{r-1}$ and outputs mP.

$$mP = \sum_{i=0}^{r-1} c_i \phi^i P \qquad (22)$$

The table reference addition part 30D comprises a memory 31D, a control part 32D, an elliptic-curve addition part 33D and Frobenius mapping means 34D. The Frobenius mapping means 34D has the same configuration as depicted in FIG. 5 or 6.

Figure 20:
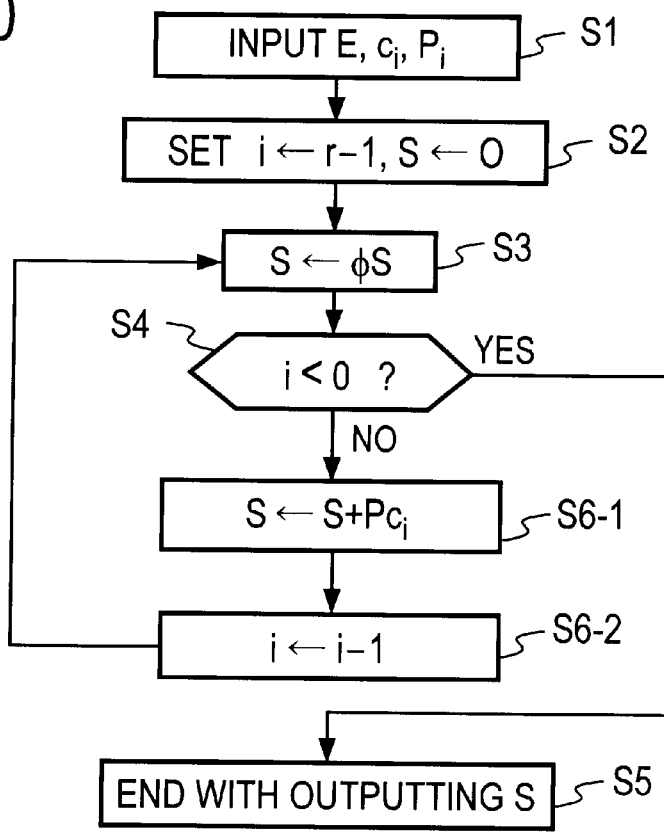
FIG. 20 is a flowchart showing the procedure for table reference addition (WINDOW)

The operation of the table reference addition part 30D is implemented by a computer following the procedure of FIG. 20 as described below.

Step S1: Input E, $c_i$, $P_i$.

Step S2: The control part 32D sets i←r−1 and S←O and stores them in the memory 31D.

Step S3: The control part 32D calculates φS by the Frobenius mapping means 34D and retains it in the memory 31D.

Step S4: The control part 32D determines whether i<0.

Step S5: If i<0, then output S and terminate the operation.

Step S6: If i>0, then add $Pc_i$ to S (step S6-1) and subtract 1 from i (step S6-2) by the elliptic-curve addition part 33D, and retain them in the memory 31D, followed by a return to step S3.

EMBODIMENT 3

Figure 21:
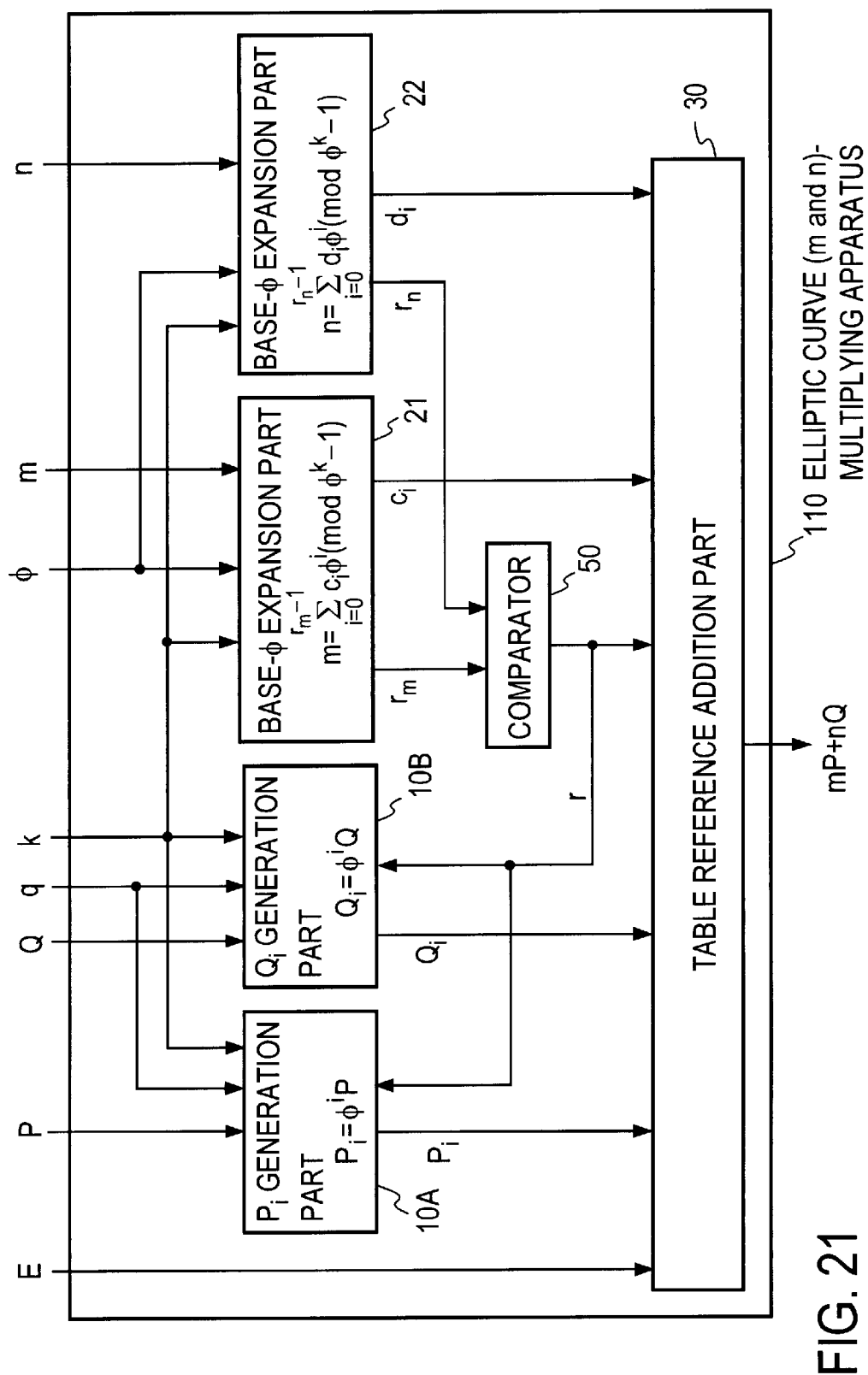
FIG. 21 is a block diagram illustrating the configuration of an elliptic-curve (m+n)-multiplying apparatus according to the present invention.

Elliptic-Curve (m and n)-Multiplying Apparatus (FIG. 21)

According to the signature or cryptosystem used, it may sometimes be necessary to perform an operation of outputting mP+nQ for input values P, Q, m and n, which operation will hereinafter be referred to as an (m and n)-multiplication. In such an instance, too, the apparatus of the present invention can be used. FIG. 21 illustrates in block form a modification of the FIG. 1 apparatus to perform the (m and n)-multiplication.

FIG. 21 depicts an example of the configuration of a multiplying apparatus 110 which outputs mP+nQ for the inputs thereto of elliptic curve E, definition field size q, integer k, $GF(q^k)$-rational points P and Q, Frobenius map $\phi$ and integers m and n.

The apparatus 110 comprises a $P_i$-generation part 10A, a $Q_i$-generation part 10B, a base-$\phi$ expansion part 21, a base-$\phi$ expansion part 22, a table reference addition part 30 and a comparison part 50.

The $P_i$ generation part 10A and the $Q_i$ generation part 10B have the same configuration as depicted in FIG. 3, the base-$\phi$ expansion parts 21 and 22 have the same configuration as depicted in FIG. 5, and the table reference addition part 30 has any one of the configurations depicted in FIGS. 7, 8 and 9.

Figure 22:
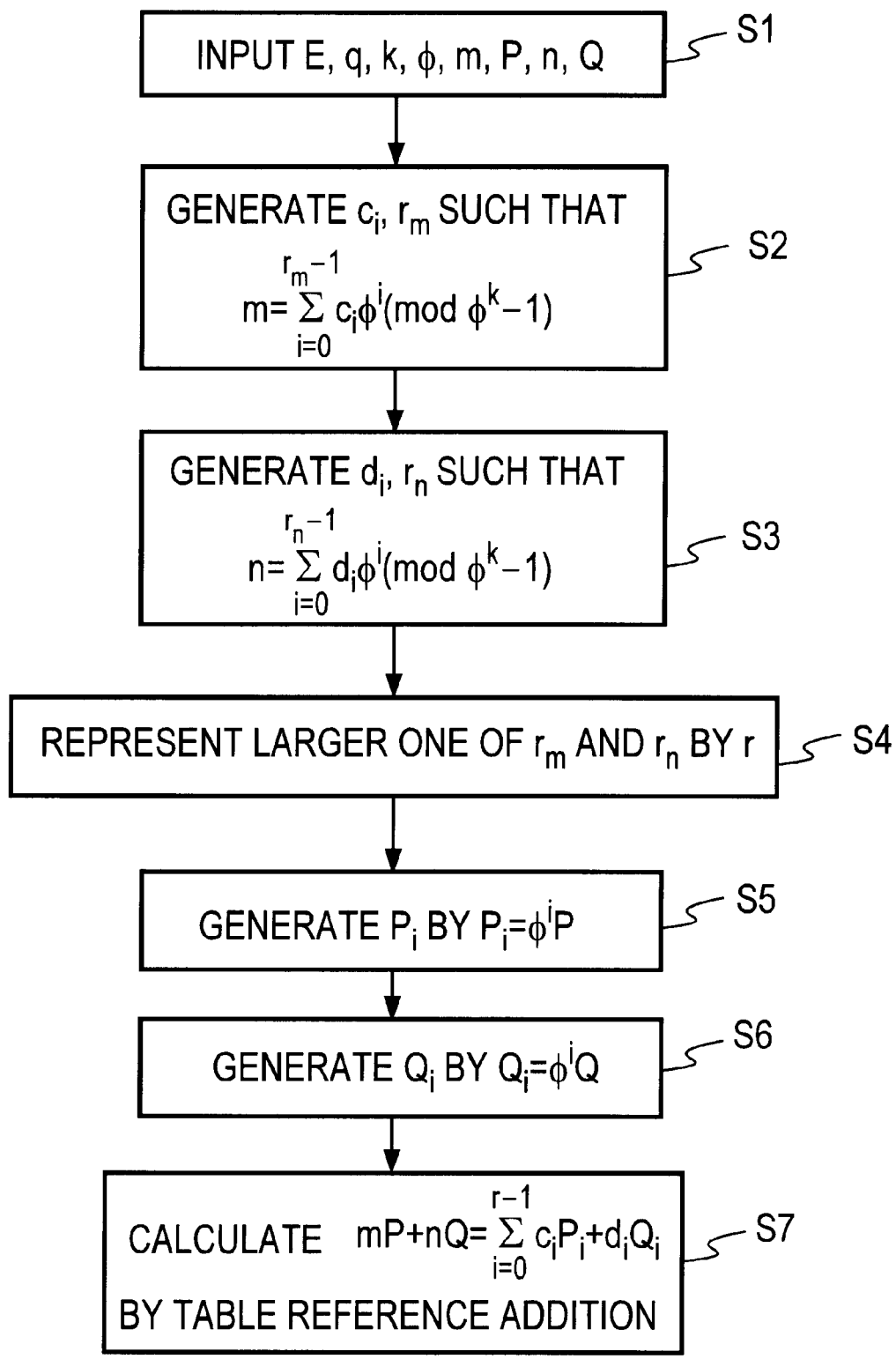
FIG. 22 is a flowchart depicting the procedure for the elliptic-curve (m+n)-multiplication by the apparatus of FIG. 21.

In the case of implementing the operation of the apparatus 110, the arithmetic operation is performed following the procedure of FIG. 22 as described below.

Step S1: input E, q, k, $\phi$, m P, n and Q.

Step S2: For the inputs k, $\phi$ and m, the base-$\phi$ expansion part 21 calculates and outputs $c_0, c_1, \ldots, c_{r_m-1}$ and $r_m$ ($0<i<r_m$) that satisfy the following equation:

$$m = \sum_{i=0}^{r_m-1} c_i \phi^i (mod \phi^k - 1) \quad (23)$$

Step S3: For the inputs k, $\phi$ and n, the base-$\phi$ expansion part 22 calculates and outputs $d_0, d_1, \ldots, d_{r_n-1}$ and $r_n$ ($0<i<r_n$) that satisfy the following equation:

$$n = \sum_{i=0}^{r_n-1} d_i \phi^i \quad (24)$$

Step S4: The comparison part 50 outputs a larger one of the inputs $r_m$ and $r_n$ as r.

Step S5: The $P_i$ generation part 10A calculates $P_i = \phi^i P$ for the inputs q, P, k and r and outputs $P_0, P_1, \ldots, P_{r-1}$.

Step S6: The $Q_i$ generation part 10B calculates $Q_i = \phi^i Q$ for the input q, Q, k and r and outputs $Q_0, Q_1, \ldots, Q_{r-1}$.

Step S7: For the inputs E, r, $P_i$, $Q_i$, $c_i$ and $d_i$, the table reference addition part 30 sets $R_i = P_i$ for $0 \leq i < r$ $= Q_{i-r}$ for $r \leq i < 2r$ $e_i = c_i$ for $0 \leq i < r$ $= d_{i-r}$ for $r \leq i < 2r$ then calculates $$mP + nQ = \sum_{i=0}^{2r-1} e_i R_i \quad (25)$$

and outputs mP+nQ.

The apparatus of FIG. 1 can be modified to perform the (m+n)-multiplication.

Furthermore, by the generalization of the apparatus of FIGS. 1, 15 and 21, an apparatus for computing the following multiplication-addition for an arbitrary number of terms i can similarly be constructed.

$$m_1 P + m_2 Q + m_3 R + \ldots \quad (26)$$

In FIGS. 1 and 15, the $P_i$ generation part 10 may be combined with the table reference addition part 30 (30D) into one arithmetic unit. Moreover, the $P_i$ generation part 10 in FIG. 15 may be configured to be supplied with an externally pre-computed version of $P_i = iP$.

EMBODIMENT 4

In the first, second and third embodiments described above, the aforementioned Equation (6) is regarded as a pre-computed value and $P_i$ is used to perform the m-multiplication in the same fashion as in the case of Equation (7). However, this method is not always higher in efficiency than in the case of the conventional method using $GF(2^k)$. Next, a description will be given of an embodiment which is adapted to reduce the number of operations in the table reference addition part 30 by adjusting or controlling r and $c_i$.

Operation Number Reduction Scheme 1

Several table reference addition methods utilizing pre-computation have been proposed, and the smaller the number of inputs $c_i$'s, the higher the processing speed.

Incidentally, when the rational point P on elliptic curve is $GF(q^k)$-rational point, the following relationship holds:

$(\phi^k - 1)P = 0$

The number of terms of $c_i$ can be decreased through utilization of this relationship.

For example, consider the case where $c_0 = 3$, $c_1 = 5$, $c_2 = 1$ and $c_3 = 4$ at the time of calculating mP by using $m = c_0 + c_1 \phi + c_2 \phi^2 + c_3 \phi^3$ when k=3.

Since $\phi^3 = 1$, the following relationship holds $m = c'_0 + c'_1 \phi + c'_2 \phi^2$ by setting $c'_0 = c_0 + c_3 = 7$ $c'_1 = c_1 = 5$ $c'_2 = c_2 = 1$ With this scheme, it is possible to convert $c_i$ to $c'_i$, thereby decreasing the number of terms to k.

Operation Number Reduction Scheme 2

The table reference addition methods using pre-computation differ in processing speed according to the input value of $c_i$. For example, in the case of the "comb-type method" described previously with reference to FIG. 9, the processing time increases with an increase in the number of "1's" (which will hereinafter be referred to as a Hamming weight) of respective digit values (0 or 1) which express $c_i$ in binary digit.

Incidentally, in the case where a $GF(q^k)$ rational point P whose order is a prime is larger than $\#E(GF(q))$, the following relationship holds $$(\phi^{k-1}+\phi^{k-2}+\ldots+\phi+1)P=0$$

since $(\phi^k-1)=0$ and since $(\phi-1)\neq 0$. For instance, consider the case where $c_0=7$, $c_1=5$, and $c_2=1$ at the time of calculating mP by using $$m=c_0+c_1\phi+c_2\phi^2$$

when k=3. Let it be assumed here that P is the $GF(q^k)$-rational point and that $(\phi^2+\phi+1)P=0$ holds. These $c_i$'s in binary representation are as follows:

$$c_0=7=111_2$$
$$c_1=5=101_2$$
$$c_2=1=001_2$$

and the number of 1's (the Hamming weight) is 6. By the way, since $$\phi^2+\phi^1+1=0,$$

even if the same number is added to or subtracted from each $c_i$, the following equation holds:

$$m=c_0+c_1\phi+c_2\phi^2.$$

Then, setting $c'_i=c_i-1$, it follows that $$c'_0=6=110_2$$
$$c'_1=4=100_2$$
$$c'_2=0=000_2.$$

Thus, the Hamming weight can be reduced to 3. Further, by setting $c''_i=c'_i-4$, it follows that $$c''_0=2=010_2$$
$$c''_1=0=000_2$$
$$c''_2=-4=\bar{1}00_2$$

where the symbol over a digit represents a negative sign. Thus, the Hamming weight can be reduced to 2.

With this scheme for reduction of number of operations, the average number of elliptic-curve additions involved in the comb-type method can be reduced to roughly ⅔ those in the first, second and third embodiments; that is, the processing can be performed about 1.5 times faster than in the above-described embodiments.

The fourth embodiment accelerates the arithmetic operation by pre-adjusting the sequence $c_i$ of the base-$\phi$ expansion in accordance with the table reference addition method through the use of an equation that holds for $\phi$.

Figure 23:
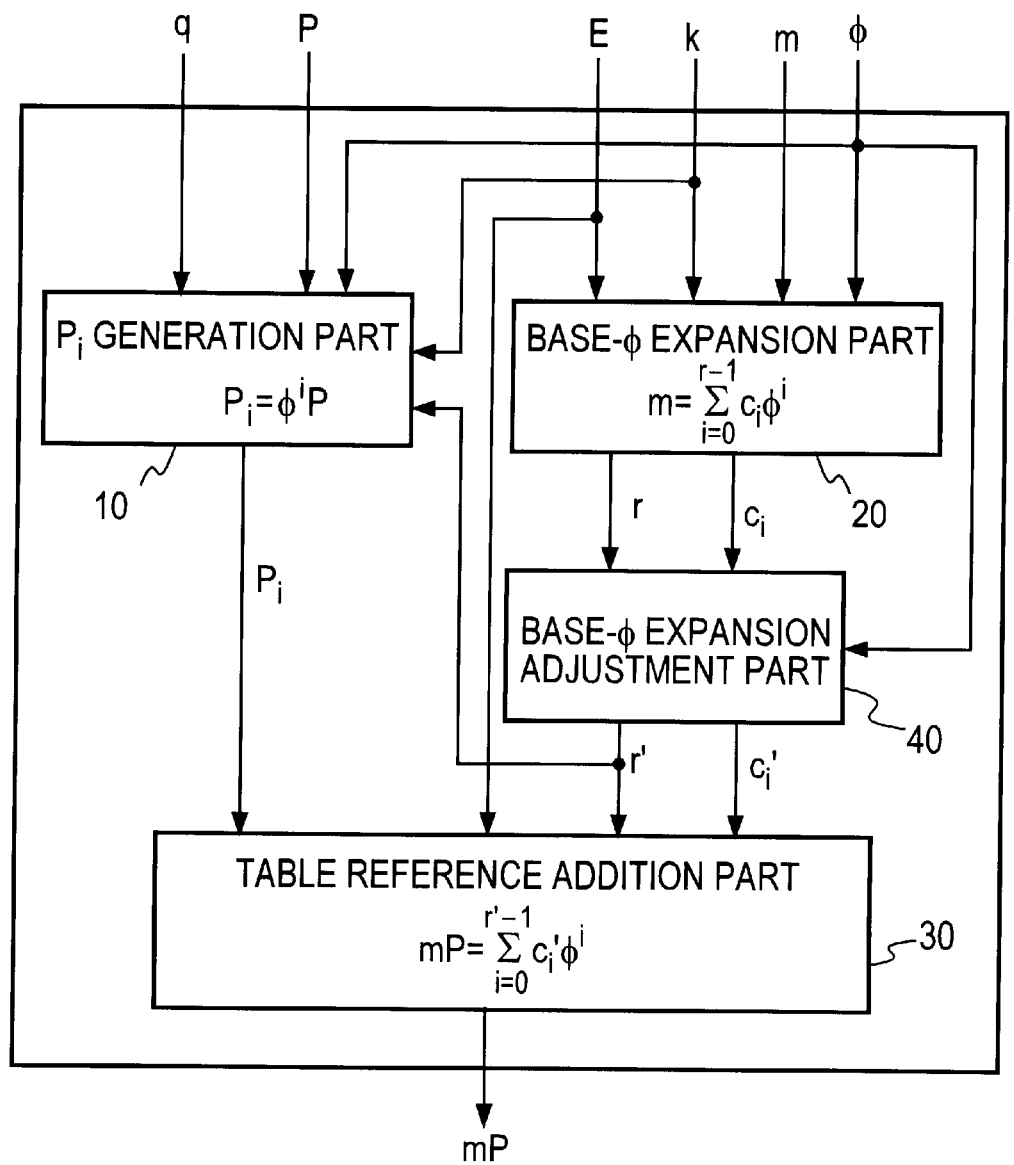
FIG. 23 is a block diagram illustrating another embodiment of the m-multiplying apparatus according to the present invention which is adapted to reduce the number of operations.

Elliptic-Curve m-Multiplying Apparatus (FIG. 23)

FIG. 23 is a block diagram illustrating an example of an elliptic-curve m-multiplying apparatus according to the fourth embodiment of the present invention. This apparatus 110 outputs mP for the inputs thereto of elliptic curve E, definition field size q, integer k, $GF(q^k)$-rational point P on elliptic curve and integer m. The apparatus 110 comprises a $P_i$ generation part 10, a base-$\phi$ expansion part 20, a table reference addition part 30 and a base-$\phi$ expansion adjustment part 40.

The $P_i$ generation part 10 and the base-$\phi$ expansion part 20 are the same as those shown in FIGS. 3 and 7, respectively, and the table reference addition part 30 is the same as shown in FIG. 9 or 10. This embodiment differs from that of the FIG. 1 embodiment in the newly provided base-$\phi$ expansion adjustment part 40, by which r and $c_i$ obtained in the base-$\phi$ expansion part 20 are adjusted to provide r' and $c'_i$ for the reduction of the number of operations in the table reference addition part 30, to which r' and $c'_i$ are provided. The $P_i$ generation part 10 also calculates $P_i$ using r' in place of r. This embodiment is identical with the FIG. 1 embodiment except in these points.

Figure 24:
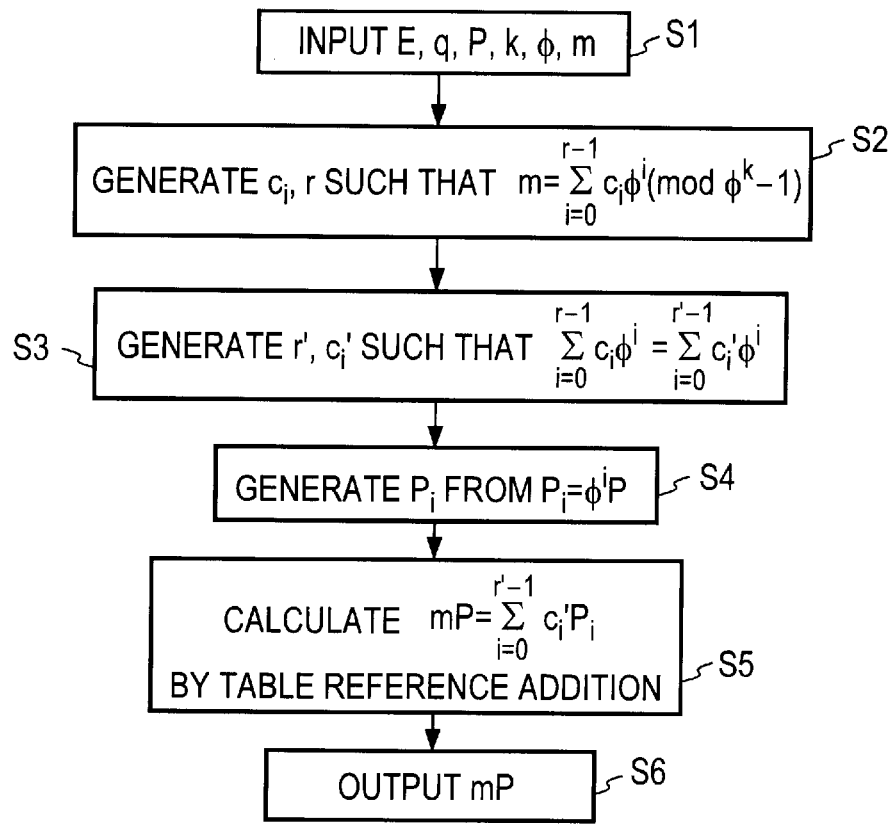
FIG. 24 is a flowchart showing the m-multiplication procedure of the apparatus depicted in FIG. 23.

The operation of this m-multiplying apparatus is implemented by a computer following the procedure of FIG. 24 as described below.

Step S1: Input E, q, P, k, $\phi$ and m.

Step S2: For the inputs k, $\phi$ and m the base-$\phi$ expansion part 20 calculates and outputs $c_0, c_1, \ldots, c_{r-1}$, and r that satisfy the following equation:

$$m = \sum_{i=0}^{r-1} c_i\phi^i (mod\phi^i - 1) \tag{27}$$

Step S3: For the inputs thereto of r and $c_i$ from the base-$\phi$ expansion part 20, the base-$\phi$ expansion adjustment part 40 calculates and outputs $c'_0, c'_1, \ldots, c'_{r'-1}$ and r' that satisfy the following equation:

$$\sum_{i=0}^{r-1} c_i\phi^i = \sum_{i=0}^{r'-1} c'_i\phi^i \tag{28}$$

Step S4: For the inputs thereto of q, P, k and r' the $P_i$ generation part 10 calculates $P_0, P_1, \ldots, P_{r'-1}$ from $$P_i=\phi^i P$$

and outputs them.

Step S5: For the input thereto of E, $P_i$, $c'_i$ and r' the table reference addition part 30 calculates and outputs mP that satisfies the following equation:

$$mP = \sum_{i=0}^{r'-1} c'_i P_i \tag{29}$$

Figure 25:
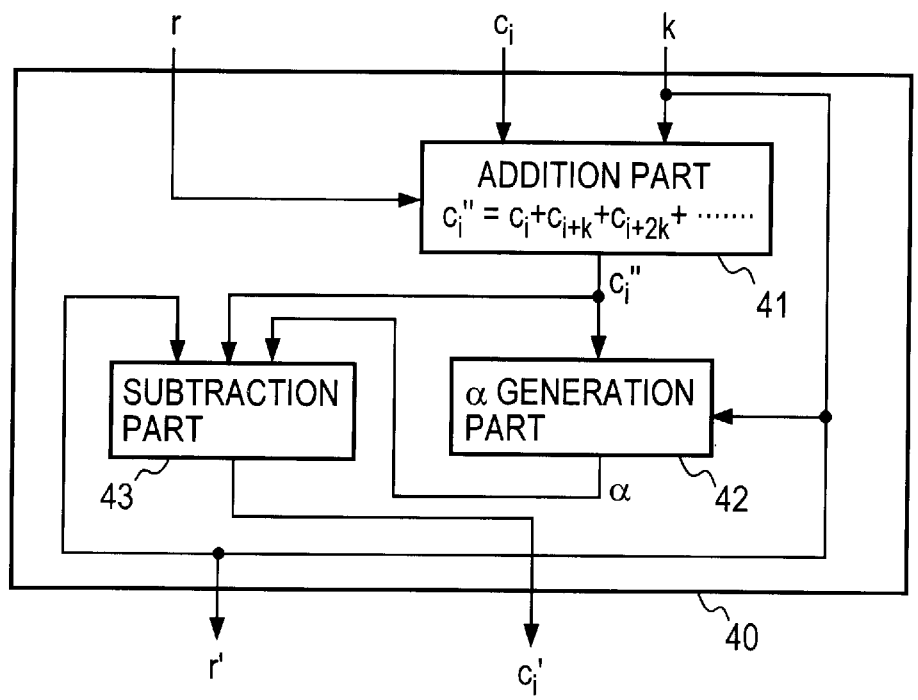
FIG. 25 is a block diagram illustrating the configuration of a base-φ expansion adjustment part 40 in FIG. 23.
Figure 26:
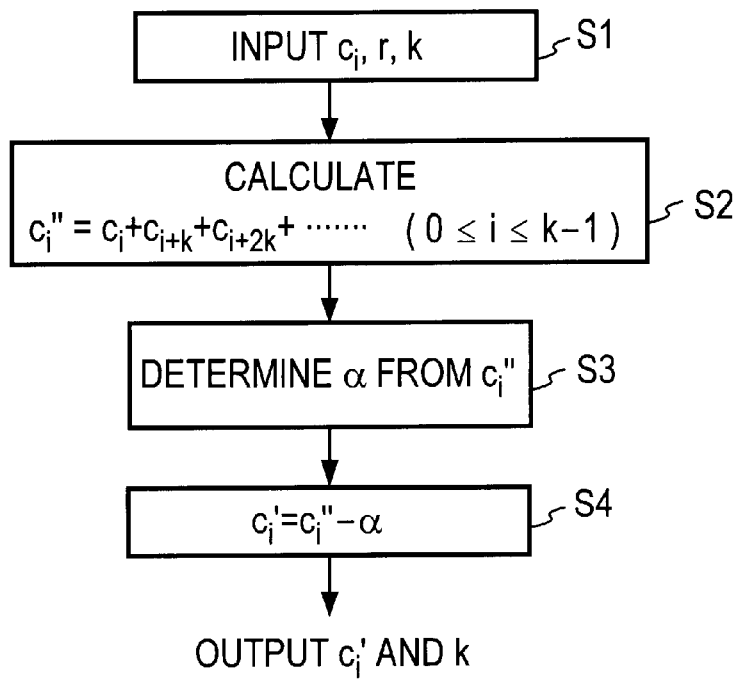
FIG. 26 is a flowchart depicting the base-φ expansion adjustment procedure in FIG. 25.

Base-$\phi$ Expansion Adjustment Part (FIG. 25)

FIG. 25 illustrates in block form the base-$\phi$ expansion adjustment part 40, which comprises an addition part 41, an $\alpha$ generation part 42 and a subtraction part 43. The base-$\phi$ expansion adjustment part 40 calculates, for the inputs thereto of integers $c_0, c_1, \ldots, c_{r-1}$, r and k, integers $c'_0, c'_1, \ldots c'_{r-1}$ and r' that satisfy the following equation $$\sum_{i=0}^{r-1} c_i P_i = \sum_{i=0}^{r'-1} c'_i P_i \tag{30}$$

and outputs them.

Figure 27:
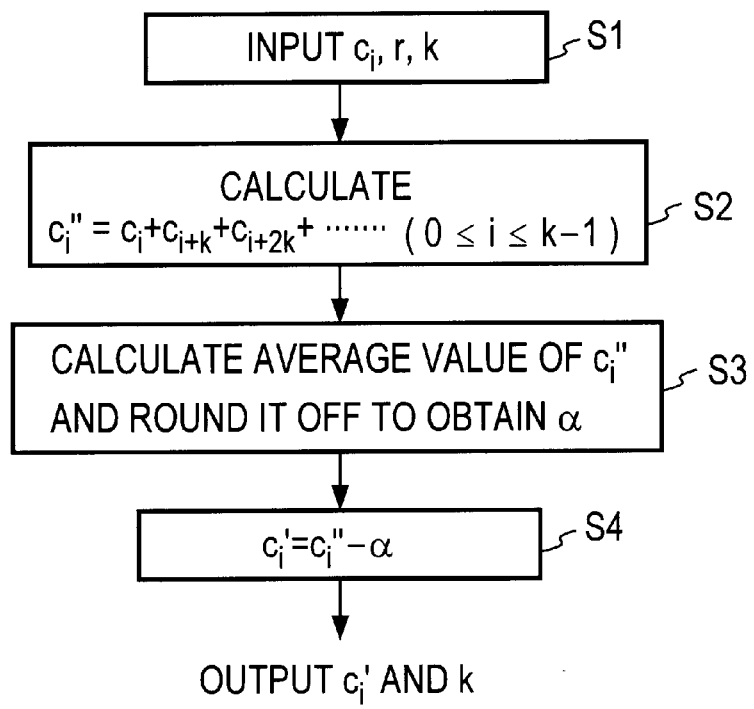
FIG. 27 is a flowchart depicting another example of the base-φ expansion adjustment procedure in FIG. 25.

The operation of the adjustment part 40 is implemented by a computer following the procedure of FIG. 27 as described below.

Step S1: Input $c_i$, r and k.

Step S2: The addition part 41 calculates $c''_i$ that satisfies $c''_i = c_i + c_{i+k} + c_{i+2k} + \ldots$, where $0 < i < k-1$.

Step S3: The α generation part 42 calculates adequate α from $c''_i$ and k input thereto. When the table reference addition part 30 used is the BGMW type depicted in FIG. 10, the α generation part 40 outputs, as α, an integer most close to a mean value of $c''_i$ (FIG. 27).

When the table reference addition part 30 used is the comb type depicted in FIG. 9, the α generation part 42 calculates $s_i$ by $$s_i = 1 \text{ for } \sum_{j=0}^{k-1} c''_{i,j} > k/2 \qquad (31)$$
$$= 0 \text{ for } \sum_{j=0}^{k-1} c''_{i,j} \leq k/2$$

where $c''_{i,j}$ (0 or 1) is a j-th digit value of $c''_i$ expressed in binary digit, then calculates $$\alpha = \sum_{i=0}^{[\log_2 b]+1} s_i 2^i \qquad (32)$$

where b is the maximum one of $c_{ij}$ using $s_i$, and outputs it.

Step S4: The subtraction part 43 calculates $c'_i$ that satisfies $c'_i = c''_i - \alpha$, where $0 \leq i \leq k-1$, and outputs $c'_i$ and k.

EMBODIMENT 5

Figure 28:
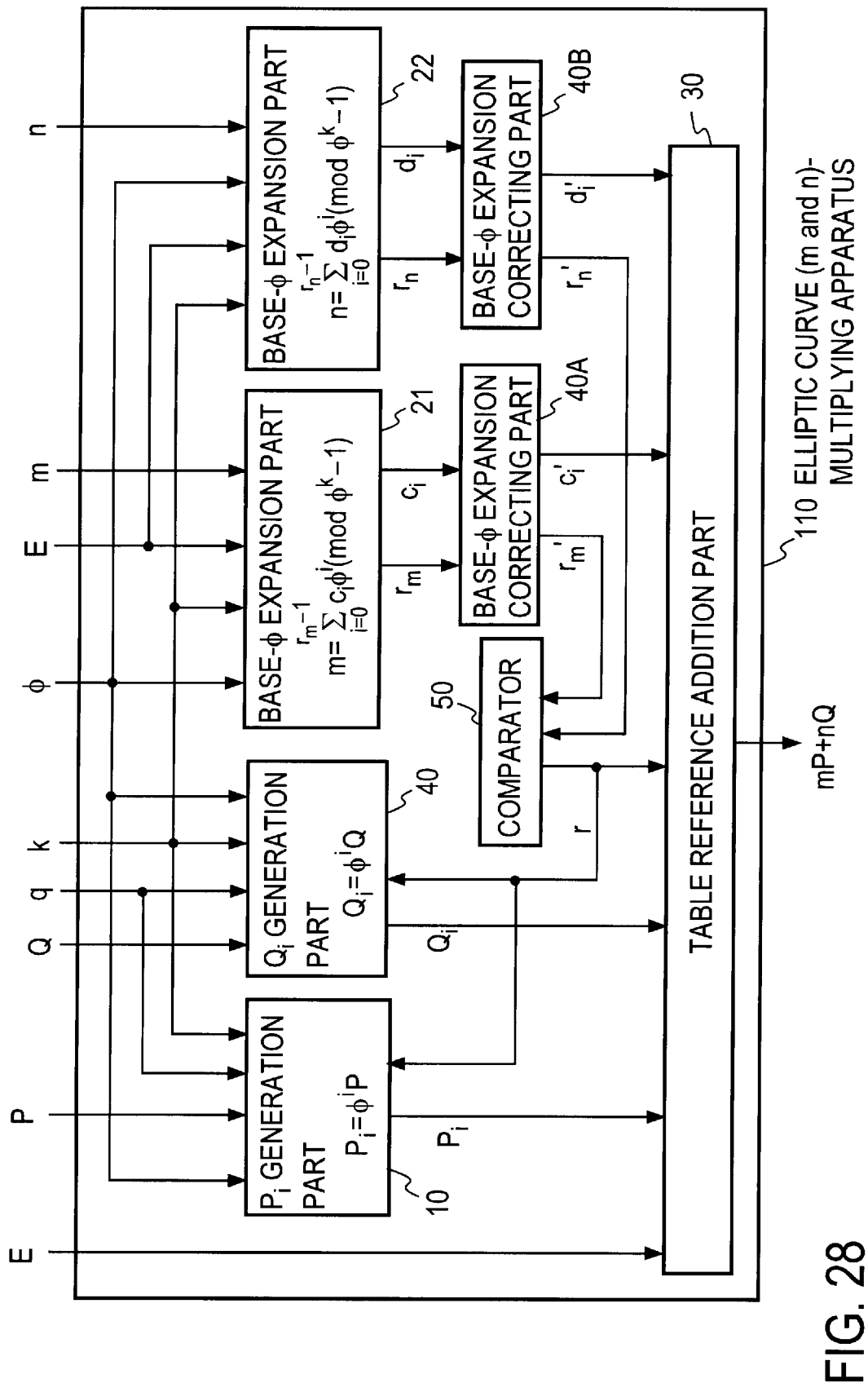
FIG. 28 is a block diagram illustrating another example of the configuration of the elliptic-curve (m+n)-multiplying apparatus according to the present invention.

Elliptic-Curve (m and n)-Multiplying Apparatus (FIG. 28)

In FIG. 28 there is depicted the fourth embodiment of FIG. 23 as being applied to the same (m and n)-multiplication as described previously with respect to FIG. 21. The multiplying apparatus of FIG. 28 outputs mP+nQ for the inputs thereto of elliptic curve E, definition field size q, integer k, $GF(q^k)$-rational points P and Q on eliptic curve, Frobenius map φ and integers m and n.

The apparatus 110 comprises a $P_i$-generation part 10A, a $Q_i$-generation part 10B, a base-φ expansion parts 21 and 22, a table reference addition part 30, a comparison part 50 and φ-expansion adjustment parts 40A and 40B.

The $P_i$ generation part 10A and the $Q_i$-generation part 10B have the same configuration as depicted in FIG. 3, the base-φ expansion parts 21 and 22 have the same configuration as depicted in FIG. 7, and the table reference addition part 30 has either one of the configurations depicted in FIGS. 9 and 10.

Figure 29:
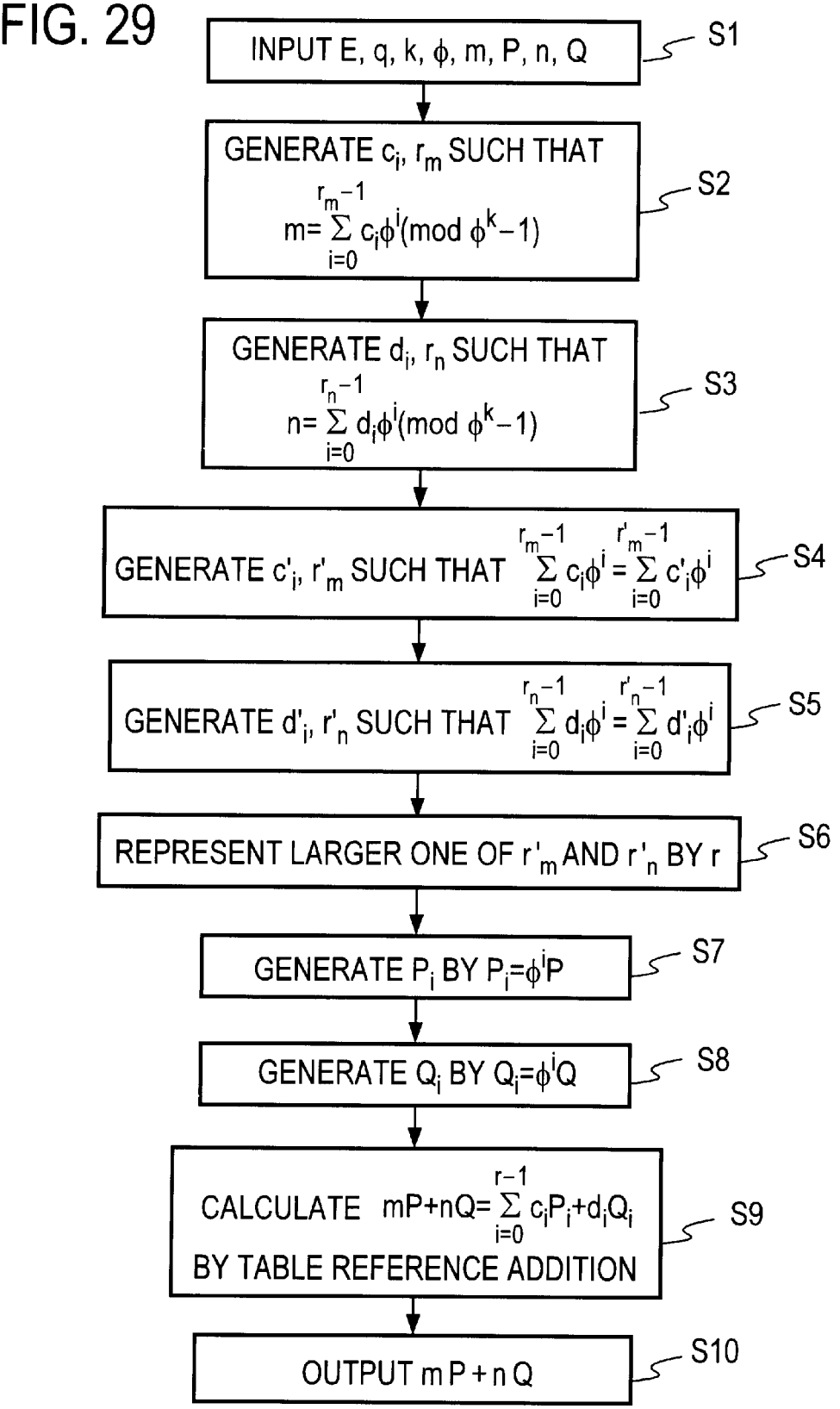
FIG. 29 is a flowchart depicting the multiplication procedure of the apparatus of FIG. 28.

The operation of the apparatus 110 is implemented by a computer following the procedure of FIG. 29 as described below.

Step S1: Input E, q, k, φ, m P, n and Q.

Step S2: For the inputs k, φ and m, the base-φ expansion part 21 calculates and outputs $c_0, c_1, \ldots, c_{r_m-1}$ and $r_m$ that satisfy the following equation:

$$m = \sum_{i=0}^{r_m-1} c_i \phi^i \qquad (33)$$

Step S3: For the inputs k, φ and n, the base-φ expansion part 22 calculates and outputs $d_0, d_1, \ldots, d_{r_n-1}$ and $r_n$ that satisfy the following equation:

$$n = \sum_{i=0}^{r_n-1} d_i \phi^i \qquad (34)$$

Step S4: For the inputs $r_m$ and $c_i$, the base-φ expansion adjustment part 40A calculates and outputs $c'_i$ and $r'_m$ that satisfy the following equation:

$$\sum_{i=0}^{r_m-1} c_i \phi^i = \sum_{i=0}^{r'_m-1} c'_i \phi^i \qquad (35)$$

Step S5: For the inputs $r_m$ and $d_i$, the base-φ expansion adjustment part 40B calculates and outputs $d'_i$ and $r'_n$ that satisfy the following equation:

$$\sum_{i=0}^{r_n-1} d_i \phi^i = \sum_{i=0}^{r'_n-1} d'_i \phi^i \qquad (36)$$

Step S6: The comparison part 50 outputs a larger one of the inputs $r'_m$ and $r'_n$ as r.

Step S7: The $P_i$ generation part 10A calculates $P_0, P_1, \ldots, P_{r-1}$ for the inputs q, P, k and r by $$P_i = \phi^i P \qquad (37a)$$

and outputs them.

Step S8: The $Q_i$ generation part 10B calculates $Q_0, Q_1, \ldots, Q_{r-1}$ for the input q, Q, k and r by $$Q_i = \phi^i Q \qquad (37b)$$

and outputs them.

Step S9: For the inputs E, r, $P_i$, $Q_i$, $c'_i$ and $d'_i$, the table reference addition part 30 sets $$\begin{aligned} R_i &= P_i && \text{for } 0 \leq i < r \\ &= Q_{i-r} && \text{for } r \leq i < 2r \\ e_i &= c'_i && \text{for } 0 \leq i < r \\ &= d'_{i-r} && \text{for } r \leq i < 2r \end{aligned} \qquad (38)$$

then calculates mP+nQ by $$mP + nQ = \sum_{i=0}^{2r-1} e_i R_i \qquad (39)$$

and outputs it.

By the generalization of the embodiments of FIGS. 23 and 28, an apparatus for computing the following multiplication-addition for an arbitrary number i of terms can similarly be constructed:

$$m_1 P + m_2 Q + m_3 R + \ldots$$

The fourth and fifth embodiments permits construction of the reference table without involving the pre-computation, and hence they have a wider range of applications than the conventional table reference addition method; they can be applied, for example, to the signature verification of an elliptic-curve DSA signature scheme.

Furthermore, the fifth embodiment is also applicable to a GF(2)-definition field heretofore employed, in which case the m-multiplication can be performed about twice faster than in the past.

EMBODIMENT 6

A typical conventional base-φ expansion method calculates first $c_{j,i}$ that satisfies the following equation:

$$c_i = \sum_{j=0}^{b-1} 2^j c_{j,i} \tag{40}$$

(where $c_{j,i} \in \{0, 1\}$ and b is an integer of $b \geq \log_2 c_i$) using $c_i$ ($0 \leq i < k$) obtained by the base-φ expansion, then calculates $$S_j = \sum_{i=0}^{r-1} c_{ij} \phi^i P, \quad 0 \leq j < b \tag{41}$$

an computes the following equation using $S_j$:

$$S = \sum_{j=0}^{b-1} 2^j S_j \tag{42}$$

thereby obtaining mP. In this case, mP is calculated by performing b−1 "elliptic-curve doublings" in the form of $$S=2(2(\ldots 2(2(S_{b-1})+S_{b-2})+\ldots S_2)+S_1)+S_0$$

The "elliptic-curve addition" and the "elliptic-curve doubling" are far more time-consuming than the φ-multiplication. Attempts have been made to accelerate the "elliptic-curve addition" but no schemes have yet been introduced for faster "elliptic-curve doubling," which still remains as a bottleneck in the elliptic-curve multiplication.

Now, a description will be given of a polynomial calculation method well known as a Horner's method. (In the following description, L denotes the finite field $GF(q^k)$).

Input: Element x of L and $u_j$ ($0 \leq j < b$)
Output: Value of polynomial $$f(x) = \sum_{j=0}^{b-1} u_j x^j$$

Temporary storage area: Element f of L, integer j
Step 1: $f \leftarrow u_{b-1}$, $j \leftarrow b-2$
Step 2: If j<0, then go to step 6.
Step 3: $f \leftarrow f \times x + u_j$
Step 4: $j \leftarrow j-1$
Step 5: Go to step 2.
Step 6: Output f as the value of f(x).

If the calculation on j is ignored, then the Horner's method will require b−1 x-multiplications and b−1 additions to compute the value of the (b−1)-degree polynomial f(x). Incidentally, letting a denote the maximum integer not exceeding (b+1)/2 and letting it be assumed that $u_j x_a$ ($a \leq j < 2a$) (when b is an odd number, $u_{2a-1}=0$) is preknown in place of $u_j$ ($a \leq j < 2a$), the Horner's method can be improved as described below. This is well-known in the art.

Input: Element x of L and $u_j$, ($0 \leq j < a$) and $u_j x^a$, ($a \leq j < 2a$)
Output: Value of polynomial $$f(x) = \sum_{j=0}^{2a-1} u_j x^j$$

Temporary storage area: Element f of L and integer j
Step 1: $f \leftarrow u_{a-1} + u_{2\,a-1} x^a$, $j \leftarrow a-2$
Step 2: If j<0, then go to step 6.
Step 3: $f \leftarrow f \times x + u_j + u_{j+a} x^a$
Step 4: $j \leftarrow j-1$
Step 5: Go to step 2.
Step 6: Output f as the value of f(x).

If the calculation on j and the obvious 0-addition are ignored, then this method will require b−1 additions and a−1 x-multiplications. The number of additions is not decreased but the number of x-multiplications is reduced substantially by half. In this example, coefficients of the polynomial were divided into those having terms of degrees exceeding a and those not exceeding a−1, and pre-computed data (by $x^a$-multiplying the coefficients with terms of degrees exceeding a) is prepared, by which the number of x-multiplications could be cut about by half. Similarly, by dividing the coefficients into s categories according to the degree of their term and preparing pre-computed data accordingly, the number of x-multiplications can be reduced down to around 1/s.

The calculation of Equation (42) conducted by the conventional base-φ expansion method is none other than the calculation by the Horner's method with L as an integer, $u_j$ as a value which satisfies $u_j P = S_j$ and x=2. The calculations of $S_j$ ($0 \leq j < b$) are usually performed one after another during the execution of the Horner's method. This will be described below by way of simple examples with respect to FIGS. 30A, 30B and 30C. These drawings are schematic showings of processing in the table reference addition part employed in the conventional base-φ expansion method. For the sake of simplicity, let it be assumed that the base-φ expansion coefficient is represented by a binary number or signed binary number of 20 digits from 19th to 0th digit. The traditional table reference addition part receives P, φP, $\phi^2 P$, $c_0$, $c_1$ and $c_2$ and outputs the value of $$\sum_{i=0}^{2} c_i \phi^i P \tag{43}$$

Figure 30A:
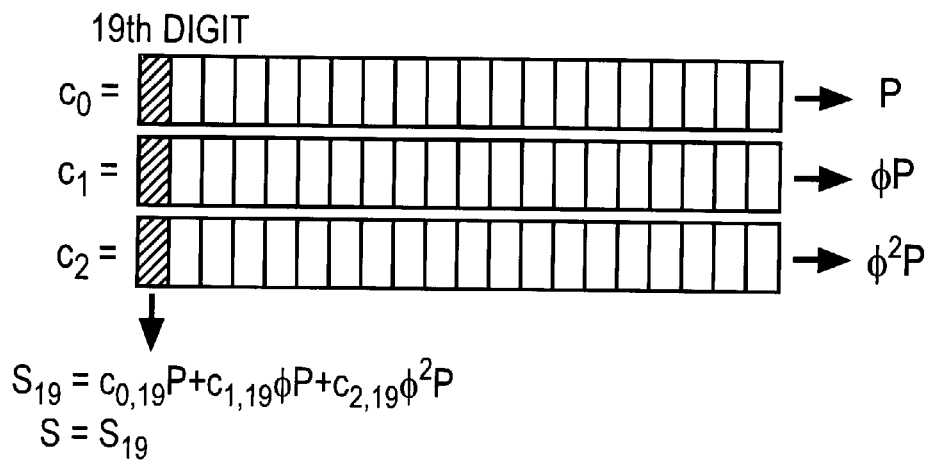
FIG. 30A is a diagram for explaining a Horner's polynomial calculating method.
Figure 30B:
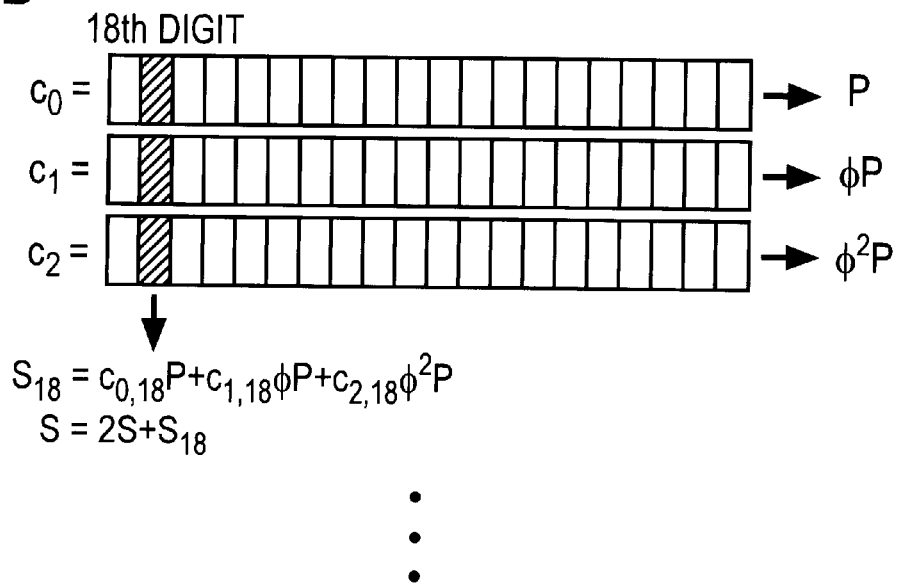
FIG. 30B is a diagram for explaining the Horner's polynomial calculating method.
Figure 30C:
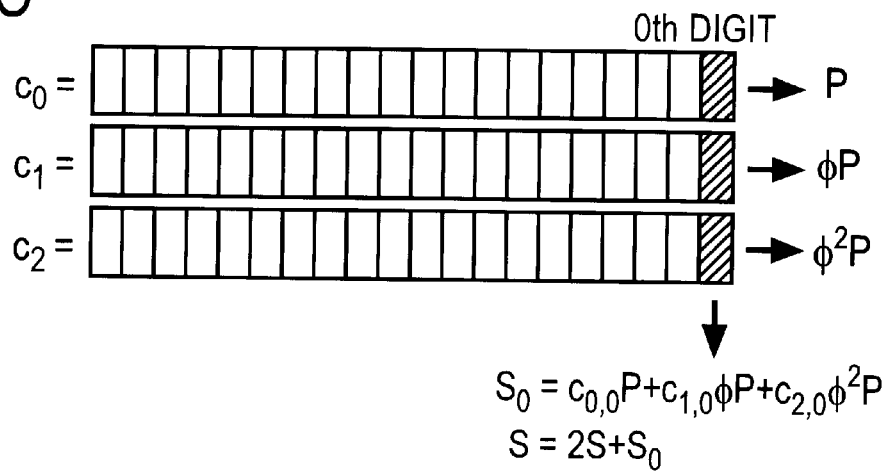
FIG. 30C is a diagram for explaining the Horner's polynomial calculating method.

FIGS. 30A, 30B and 30C each represent the processing therefor. Reference character S denotes a temporary storage area which stores the coordinates of elliptic-curve points for computation and holds the value of Equation (43) that is the output of this part at the final stage of computation.

In FIG. 30A, $c_{i,j}$ denotes the numerical value of a j-th digit when the input $c_i$ is expressed in the binary or signed binary number of 20 digits from 10th to 0th digit. Accordingly, $c_{i,j}$ is a numerical value that is 0 or ±1, and $c_{i,j}$-multiplication can be performed easily. Usually, only when this numerical value is other than 0, the "elliptic-curve addition" takes place. In FIG. 30A, the first step is to calculate $S_{19}$ concerning the 19th digit that is the most significant digit of each of the inputs $c_0$, $c_1$ and $c_2$. The results of the calculation on $S_{19}$ do not necessarily require the temporary storage area, but they need only to be sequentially written into the temporary storage area for the calculation of Equation (43).

Upon completion of the processing for the 19th digit of each of the inputs $c_0$, $c_1$ and $c_2$, processing for the 18th digit of each input is started, in which case S is doubled and each term of $S_{18}$ is written in the storage area S. Thereafter, similar processing is performed from 17th to 0th digits, and at the instant of completion of the processing for the 0th digit as shown in FIG. 30 the value of Equation (43) is loaded into the storage area S. It is this value that the conventional table reference addition part outputs.

If pre-computed data can be prepared in place of $S_j$ ($0 \leq j < b$), then the number of "elliptic-curve doublings" can be cut as is possible with the improved version of the Homer's method.

For example, in the case of dividing $S_j$ ($0 \leq j < b$) into two, if $T_j$ can be calculated as a substitute for $S_j$ by the following equation with a set as the maximum integer not exceeding (b+1)/2:

$$T_j = S_j + 2^a S_{a+j}, (0 \leq j < a) \qquad (44)$$

the following equation needs only to be calculated by the Homer's method:

$$S = \sum_{j=0}^{a-1} 2^j T_j \qquad (45)$$

If $2^a P$ points over the elliptic curve can be prepared beforehand in addition to point P, $T_j$ can be constructed only by slightly improving the method of calculating S while constructing $S_j$ ($0 \leq j < b$) from P as in the conventional base-$\phi$ expansion method.

Figure 31:
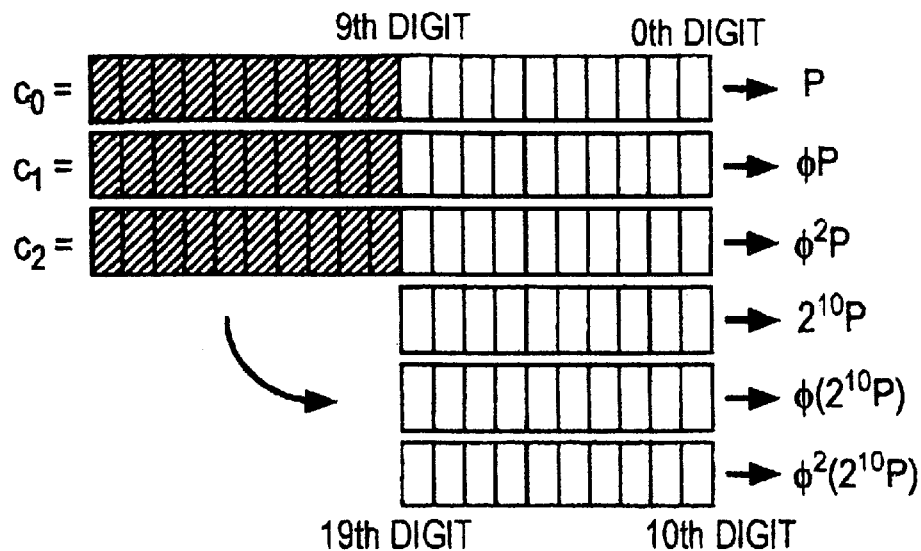
FIG. 31 is a diagram for explaining the division of digits in the polynomial calculation.
Figure 32:
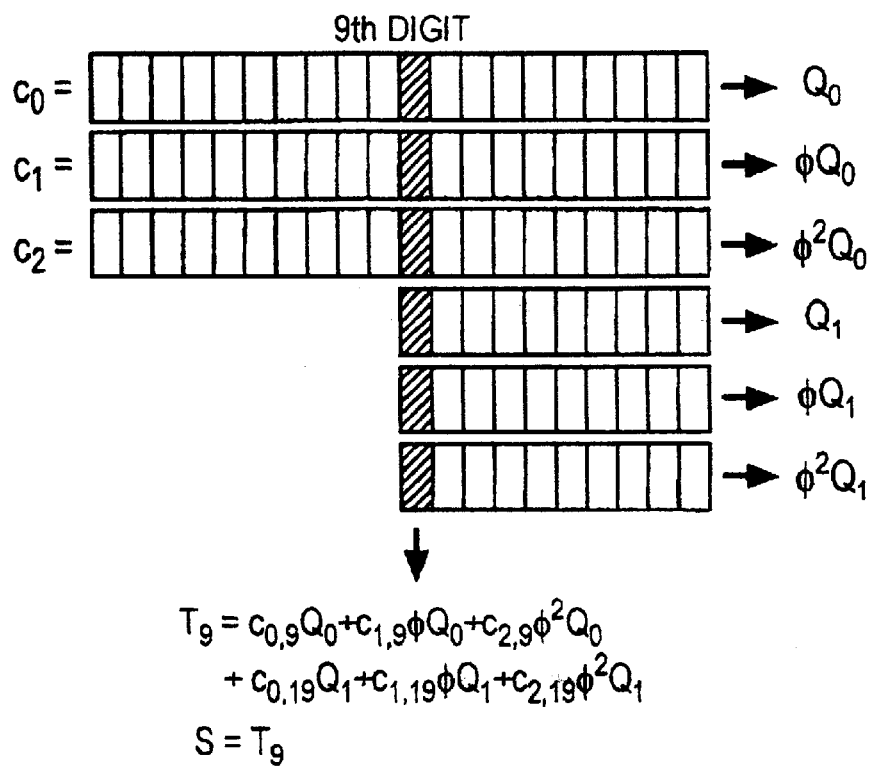
FIG. 32 is a diagram for explaining a calculation method proposed in a sixth embodiment of the invention.
Figure 33:
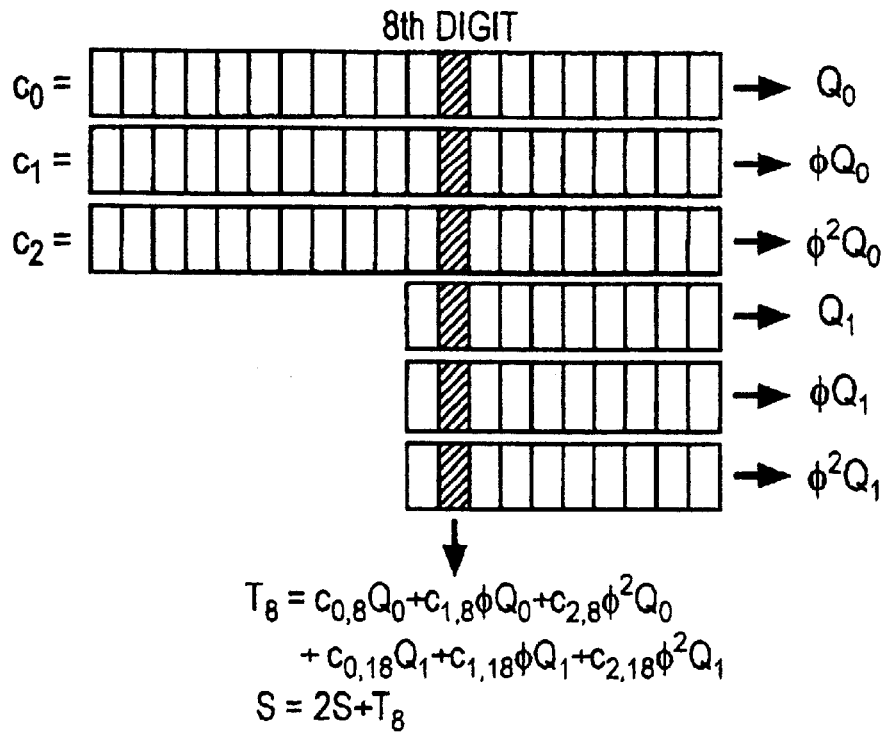
FIG. 33 is a diagram for explaining another calculation method proposed in a sixth embodiment of the invention.
Figure 33:
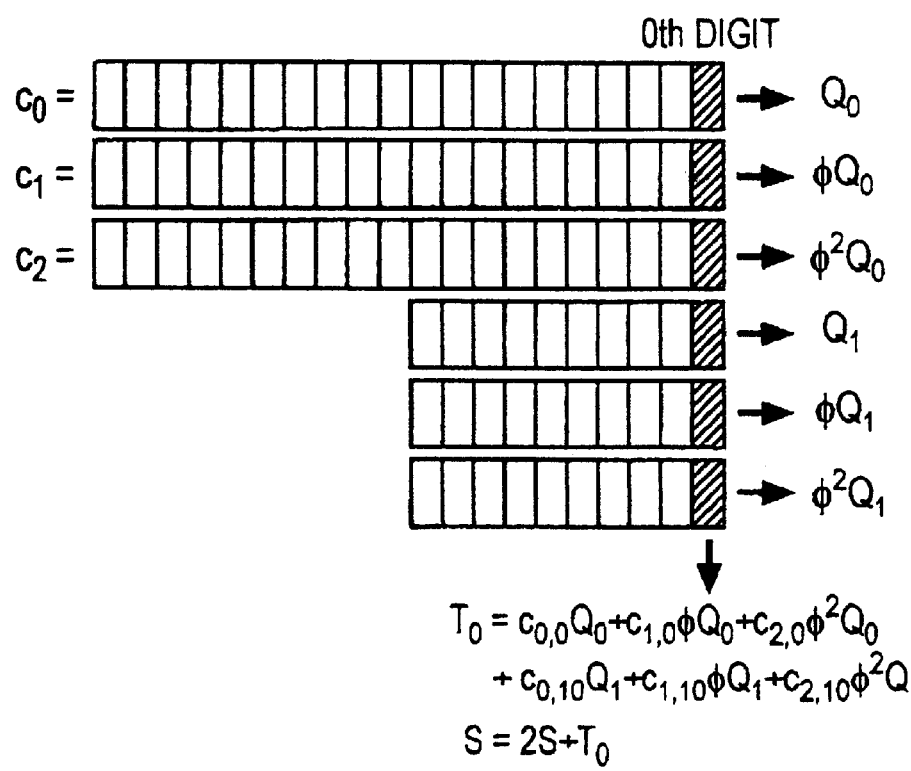

FIGS. 31 to 33 each schematically show a process by which the pre-computed table reference addition part calculates Equation (43) while constructing $T_j$. For the sake of simplicity, let it be assumed that the base-$\phi$ expansion coefficient is expressed by a binary or signed binary number of 20 digits from 19th to 0th digit. The table reference addition part receives P, $\phi$P, $\phi^2$P, $2^{10}$P, $\phi 2^{10}$P, $\phi^2 2^{10}$P, $c_0, \ldots, c_2$ and outputs the value of Equation (43). FIGS. 32 to 33 each represent the processing therefor. Reference character S denotes a temporary storage area which stores the coordinates of elliptic-curve points for computation and holds the value of Equation (43) that is the output of this part at the final stage of computation.

In FIG. 31 to 33, $c_{i,j}$ denotes the numerical value of a j-th digit when the input $c_i$ is expressed by the binary or signed binary number of 20 digits from 10th to 0th digit. Accordingly, $c_{i,j}$ is a numerical value that is 0 or ±1 and $c_{i,j}$-multiplication can be performed easily. Usually, only when this numerical value is other than 0, the "elliptic-curve addition" takes place. In FIGS. 32 and 33, $Q_0$=P and $Q_1 = 2^{10}$P in the interests of simplicity.

FIG. 31 depicts the manner in which the inputs $c_0$, $c_1$ and $c_2$ are each divided into 10 high-order digits from 19th to 10th digit and 10 low-order digits from 9th to 0th digit.

In FIGS. 32 and 33, assume that the high-order digits corresponding to the 19th to 10th digits of each of the inputs $c_0$, $c_1$ and $c_2$ are handled as 9th to 0th digits.

In FIG. 32, the first step is to calculate $T_9$ concerning the 9th one of the high-order digits of each of $c_0$, $c_1$ and $c_2$. S19. The results of the calculation on $T_9$ do not necessarily require the temporary storage area, but they need only to be sequentially written into the temporary storage area for the calculation of Equation (43).

The processing for the 8th to 0th digits are schematically depicted in FIG. 33. Upon completion of the processing for the 9th digit, processing for the 8th digit is started, in which case S is doubled and each term of $T_8$ is written in the storage area S. Thereafter, similar processing is performed from 7th to 0th digits, and at the instant of completion of the processing for the 0th digit the value of Equation (43) is loaded into the storage area S. The pre-computed table reference addition part outputs this value.

The Frobenius map can be computed far faster than the "elliptic-curve addition" and the "elliptic-curve doubling." Hence, P, $\phi$P, $\phi^2$P, $2^{10}$P, $\phi 2^{10}$P and $\phi^2 2^{10}$P could be computed very fast if P and $2^{10}$P are prepared beforehand.

Accordingly, in the case of this example, the number of "elliptic-curve doublings" can be reduced by half only by preparing $2^{10}$P in addition to P.

In the sixth embodiment of the present invention, the multiplication is accelerated by using the pre-computed $Q_t = d^{ta}P$ ($1 \leq t \leq s$) in the process of constructing mP after the base-$\phi$ expansion of m.

Figure 34:
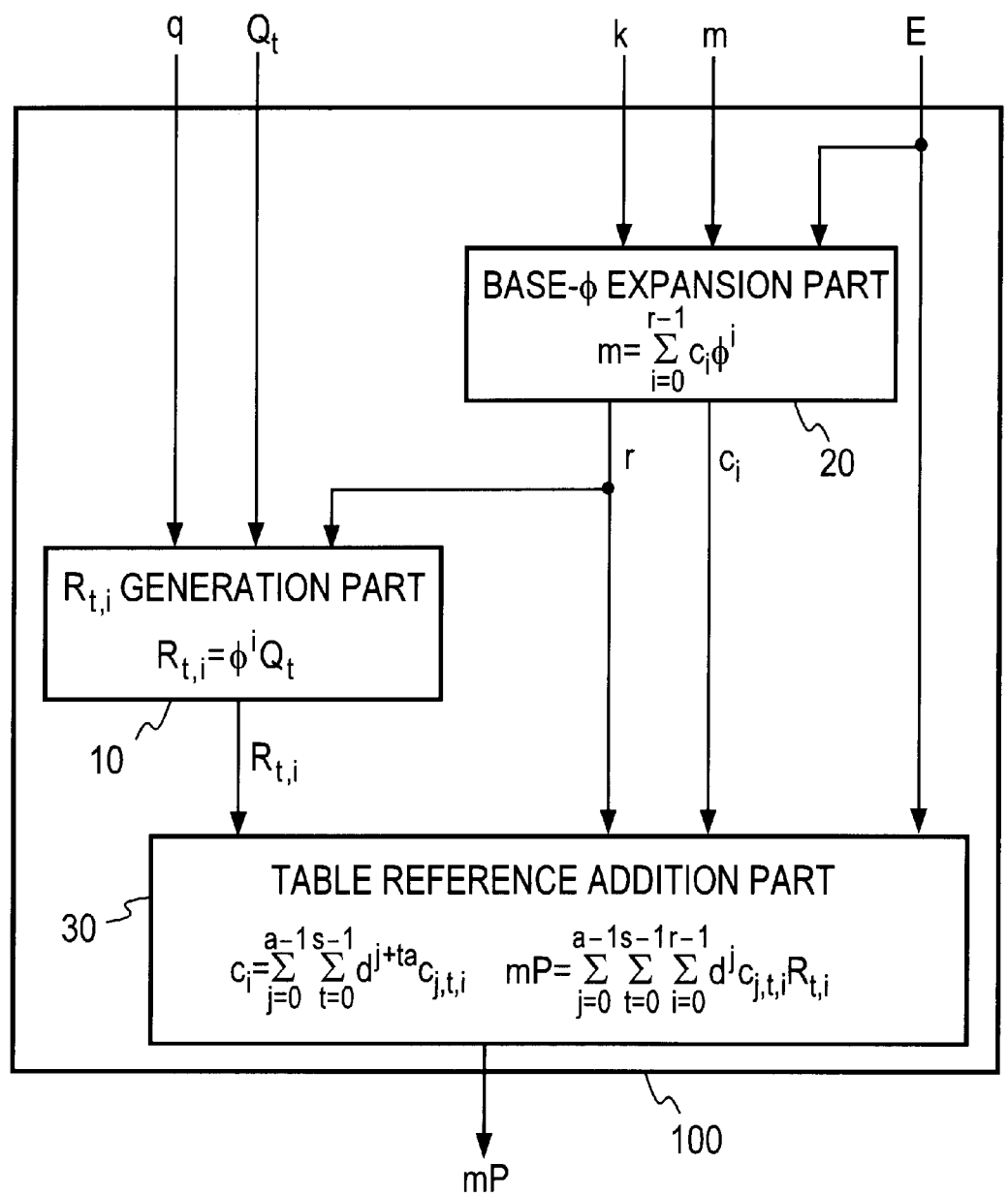
FIG. 34 is a block diagram illustrating an elliptic-curve m-multiplying apparatus according to the sixth embodiment of the present invention.

FIG. 34 illustrates in block from an elliptic-curve m-multiplication apparatus 100 according to the sixth embodiment of the invention, which comprises a $R_{t,i}$ generation part 10, a base-$\phi$ expansion part 20 and a pre-computed table reference addition part 30. The multiplication apparatus 100 outputs mP for the inputs thereto of the elliptic curve E, the definition field size q, the integer k, an elliptic-curve $GF(q^k)$-rational point sequence $Q_t = 2^{ta}P$ ($0 \leq t \leq s$) pre-computable from the elliptic-curve $GF(q^k)$-rational point P, and the integer m.

Figure 36:
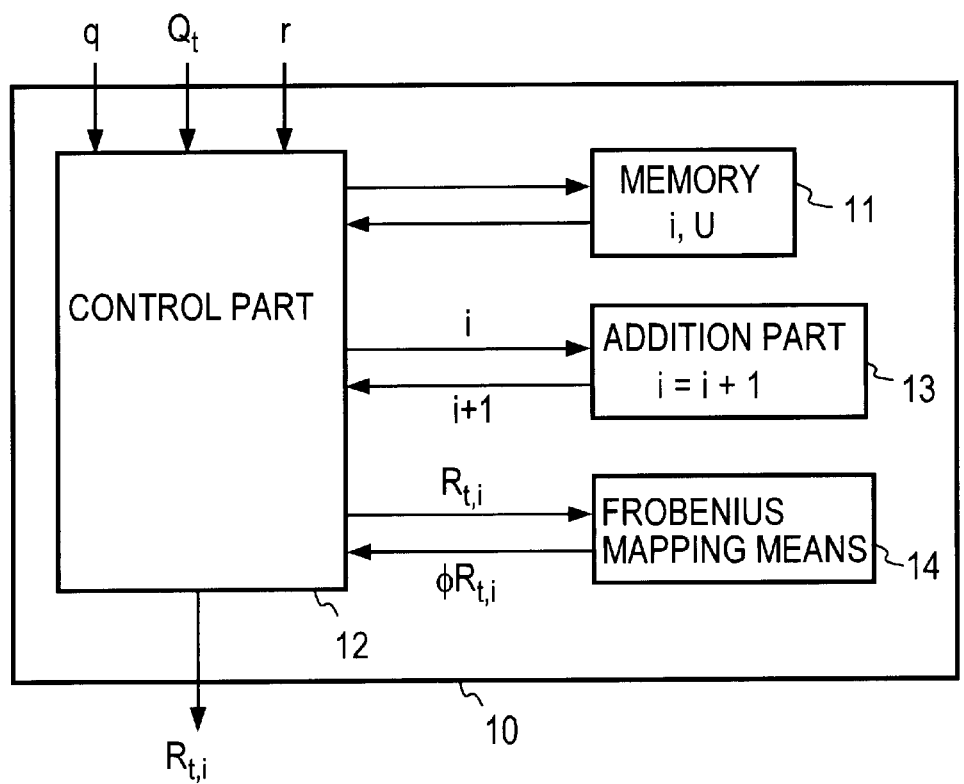
FIG. 36 is a block diagram showing the configuration of a $P_{1j,i}$ generation part in FIG. 35.
Figure 38:
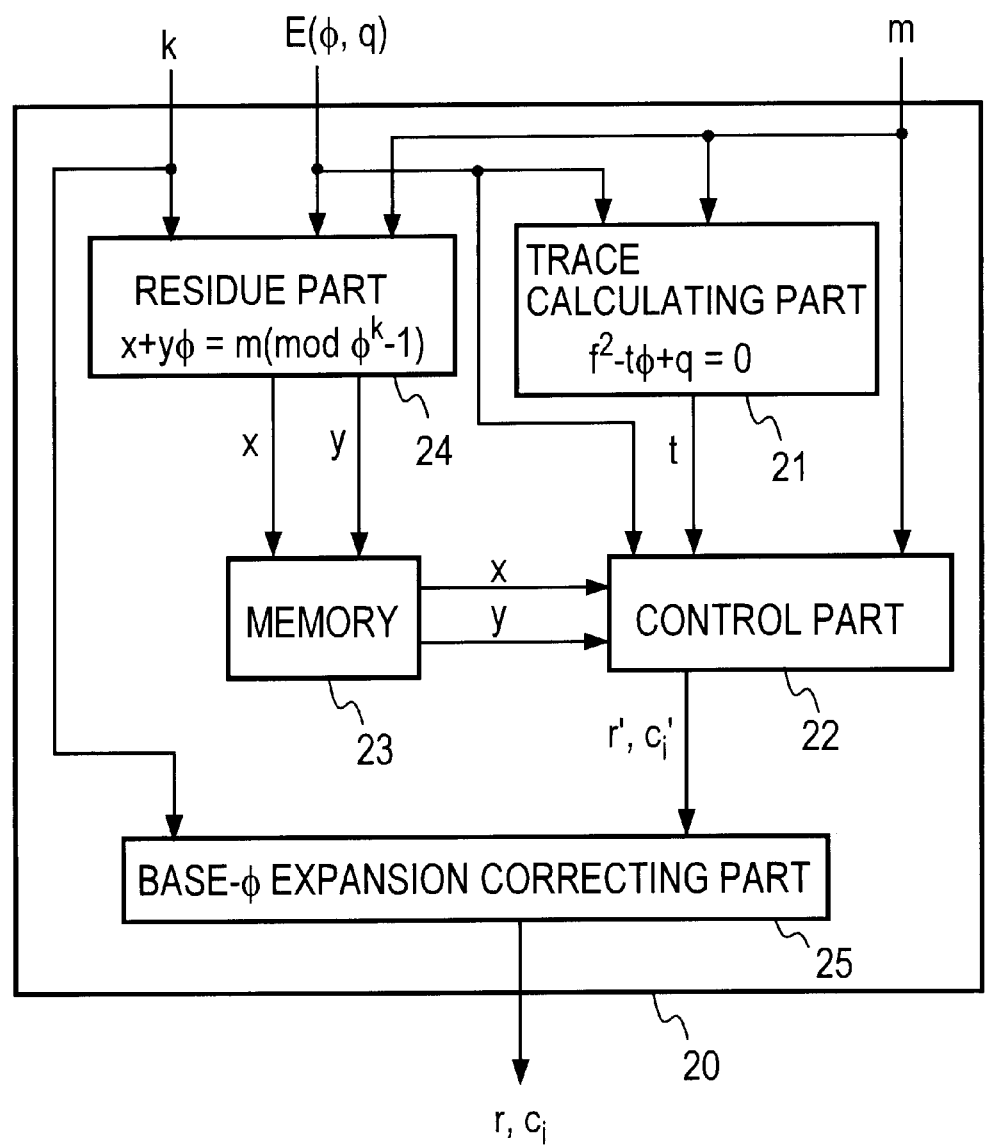
FIG. 38 is a block diagram illustrating the configuration of a base-φ expansion part in FIG. 35.
Figure 40:
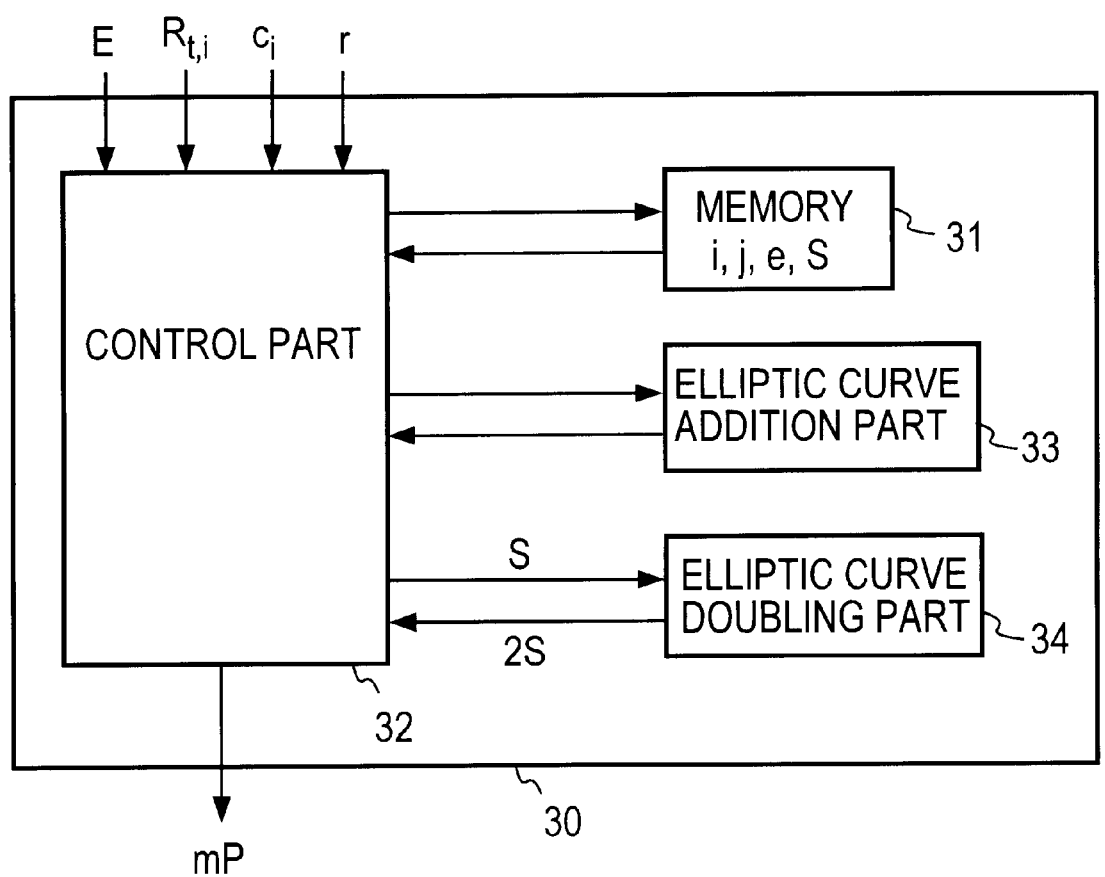
FIG. 40 is a block diagram illustrating the configuration of a pre-computed table reference addition part.

The $R_{t,i}$-generation part 10 has such a configuration as depicted in FIG. 36; the base-$\phi$ expansion part 20 has such a configuration as depicted in FIG. 38; and the pre-computed table reference addition part 30 has such a configuration as depicted in FIG. 40.

Figure 35:
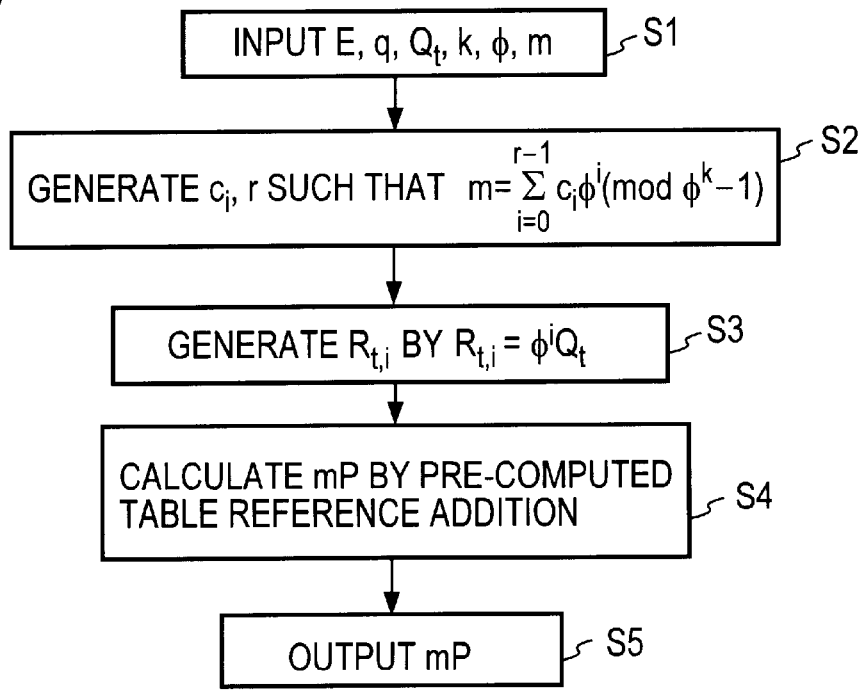
FIG. 35 is a flowchart depicting the elliptic-curve m-multiplication procedure in FIG. 34.

The $R_{t,i}$-generation part 10 inputs thereinto r from the base-$\phi$ expansion part 20, but since it is preknown that r can be made smaller than k, it is also possible to operate the $R_{t,i}$-generation part 10 and the base-$\phi$ expansion part 20 in parallel by inputting k into the generation part 10 as a substitute for r. The multiplication of the FIG. 34 apparatus 100 is implemented by computer following the procedure of FIG. 35 as described below.

Step S1: For the inputs thereto k, $\phi$ and m the base-$\phi$ expansion part 20 calculates and outputs $c_0, c_1, \ldots, c_{r-1}$ and r that satisfy the following equation:

$$m = \sum_{i=0}^{r-1} c_i \phi^i \qquad (46)$$

Step S2: For the inputs thereto q, k, r, P and $2^{2a}$P, ..., $2^{(s-1)a}$P, the $R_{t,i}$ generation part 10 calculates $R_{t,i}$ ($0 \leq i < r$, $0 \leq t < s$) by $$R_{t,i} = \phi^i 2^{ta} P \qquad (47)$$

and outputs it.

Step S3: For the inputs thereto E, $R_{t,i}$, $c_i$ and r, the pre-computed table reference addition part 30 calculates $c_{j,t,i}$ that satisfies $$c_i = \sum_{j=0}^{a-1} \sum_{t=0}^{s-1} d^{j+ta} c_{j,t,i}$$

then calculates mP by the following equation:

$$mP = \sum_{j=0}^{a-1} \sum_{t=0}^{s-1} \sum_{i=0}^{r-1} d^j c_{j,t,i} R_{t,i} \tag{48}$$

and outputs it.

$R_{t,i}$ Generation Part (FIG. 36)

The $R_{t,i}$ generation part 10 depicted in FIG. 36 comprises a memory 11, a control part 12, an addition part 13 and a Frobenius mapping means 14. For the inputs thereto the definition field size q, the elliptic-curve $GF(q^k)$-rational point sequence $Q_t=2^{ta}P(0 \leq t<s)$ pre-computable from the elliptic-curve $GF(q^k)$-rational point P, and the integer r, the $R_{t,i}$ generation part 10 outputs $R_{t,i}(0 \leq i<r, 0 \leq t<s)$ that satisfy $R_{t,i}=\phi^i 2^{ta}P$.

The Frobenius mapping means 14 is identical with that used in FIG. 5 or 6 embodiment in construction and in operation; hence, no description will be repeated. It is also possible to obtain $\phi Q_t$ in parallel from a plurality of points on a point sequence $Q_t$ by using a plurality of Frobenius mapping means 14.

Figure 37:
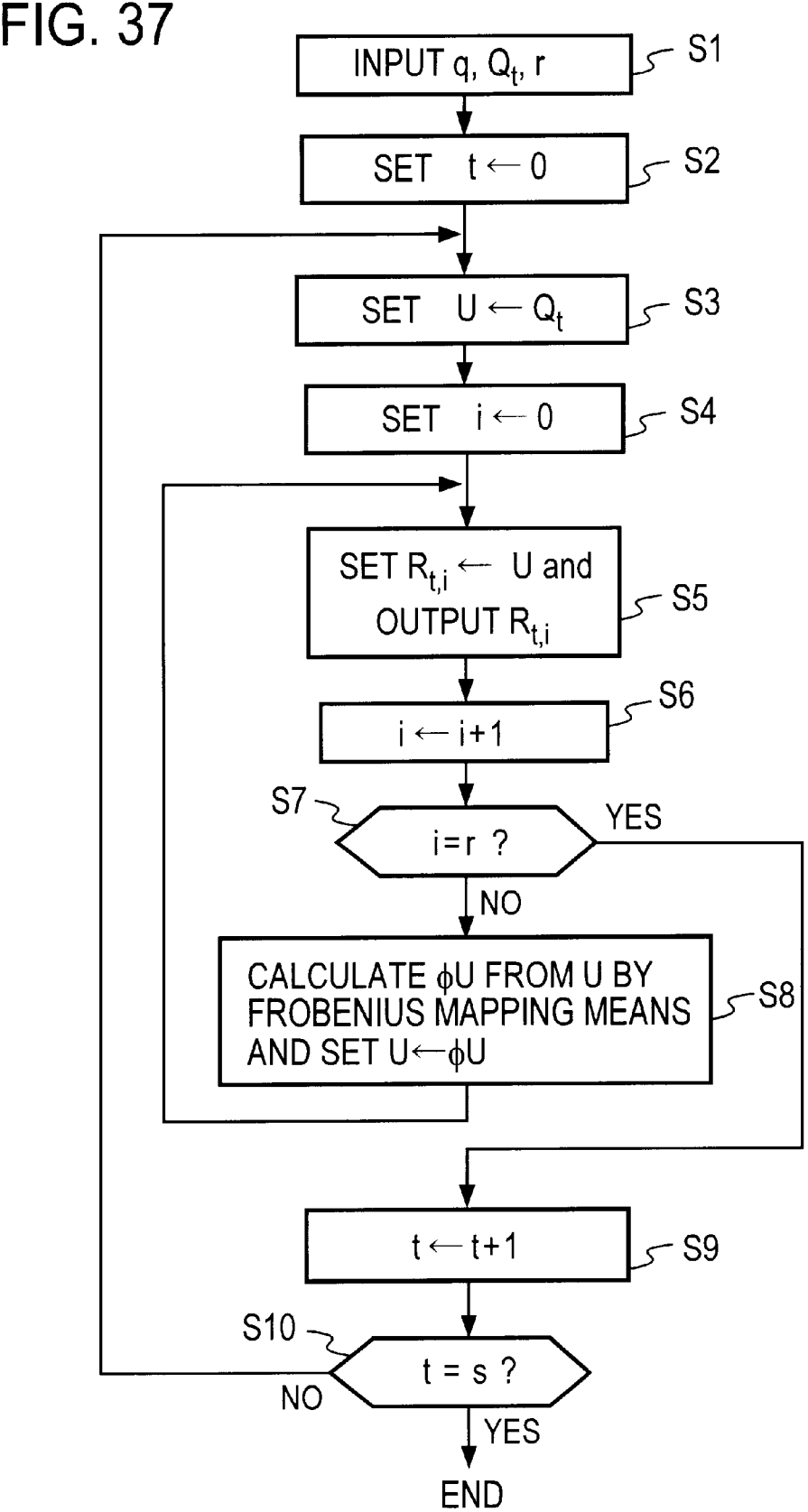
FIG. 37 is a flowchart depicting the $P_{1j,i}$ generation procedure in FIG. 36.

The operation of the $R_{t,i}$ generation part 10 depicted in FIG. 36 is implemented by computer following the procedure of FIG. 37 as described below.

Step S1: The control part 12 accepts q, $Q_t$ and r as inputs thereto.

Step S2: The control part 12 sets t←0.

Step S3: The control part 12 sets U←$Q_t$.

Step S4: The control part 12 sets i←0.

Step S5: The control part 12 sets $R_{t,j}$←U and and outputs $R_{t,j}$.

Step S6: The control part 12 sets i←i+1.

Step S7: The control part 12 determines whether i=r, and if so, the procedure goes to step S9.

Step S8: The control part 12 inputs U into the Frobenius mapping means 6E, then accepts $\phi$U and sets U←$\phi$U, and the procedure goes to step S5.

Step S9: The control part 12 sets t←t+1.

Step S10: The control part 12 determines whether t=s, and if not, the procedure goes to step S3.

Base-$\phi$ Expansion Part (FIG. 38)

FIG. 38 illustrates in block form the base-$\phi$ expansion part 20, which comprises a trace calculating part 21, a control part 22, a memory 23, a residue part 24 and a base-$\phi$ expansion correcting part 25. For the inputs thereto of the definition field size q, the extension degree k, the integer m and the Frobenius map $\phi$, the base-$\phi$ expansion part 20 calculates and outputs $c_0, c_1, \ldots, c_{r-1}$ and $r(0 \leq i<r)$ that satisfy Equation (46).

Figure 42:
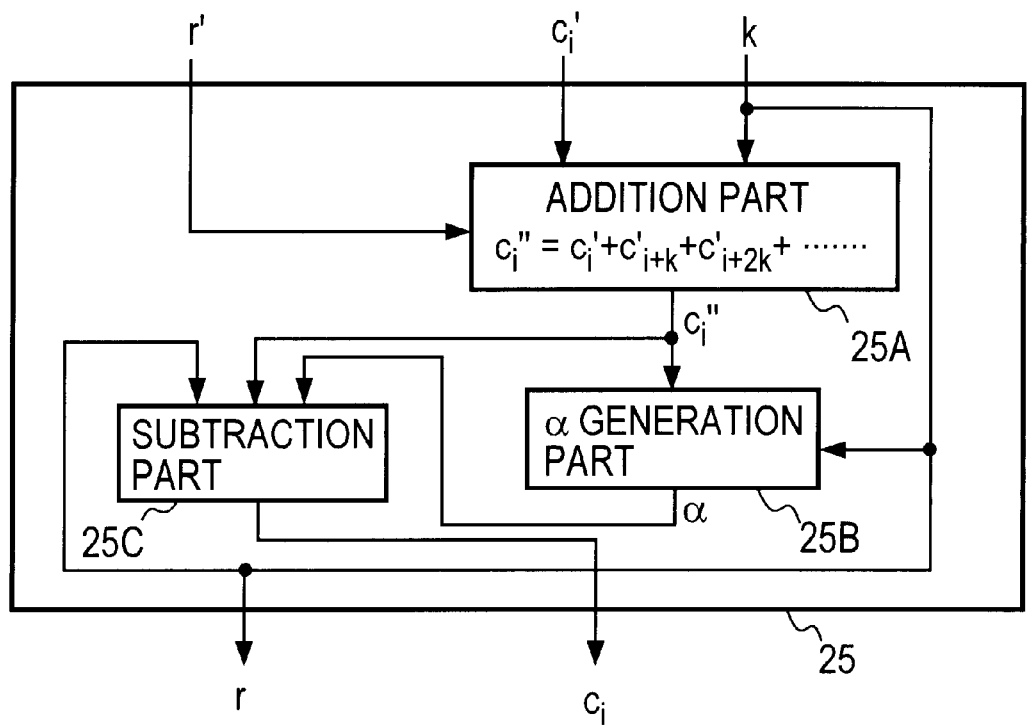
FIG. 42 is a block diagram illustrating a base-φ expansion correction part in FIG. 38.

The base-$\phi$ expansion part 20 has such a configuration as shown in FIG. 42 described later on, which configuration is the same as depicted in FIG. 25.

Figure 39:
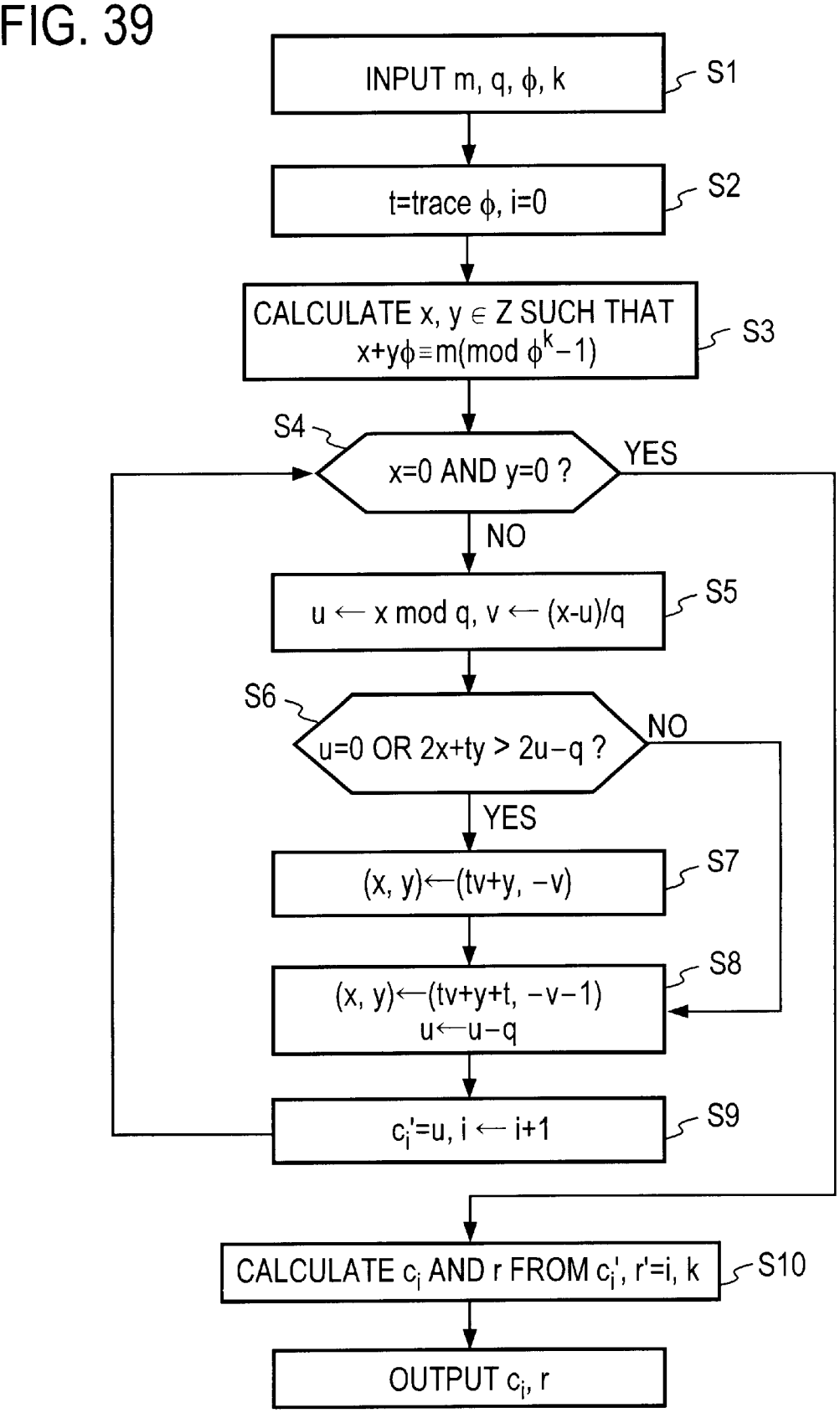
FIG. 39 is a flowchart showing the base-φ expansion procedure.

The operation of the base-$\phi$ expansion part 20 of FIG. 38 is implemented by computer following the procedure of FIG. 39 as described below.

Step S1: m, q, $\phi$ and k are input into the base-$\phi$ expansion part 20.

Step S2: The trace calculating part 21 calculates from the input values $\phi$ and q a trace t that satisfies $\phi^2 - t\phi + q = 0$ and passes it to the control part 22. Since the trace is a fixed value depending on $\phi$ and q, it may also be pre-computed and provided from the outside, in which case the trace calculating part 21 is unnecessary.

Step S3: For the inputs m, q and $\phi$, the reside part 24 calculates x and y such that $x+y\phi \equiv m(\mod \phi^k - 1)$, and stores them in the memory 23. They may also be provided from an outside source. In such a case, the values x and y are input in place of the integer m. When this calculation is not performed, the reside part 24 is unnecessary. The memory 22 retains the counter value i and integers x, y, u and v. The initial value of i is 0.

Step S4: The control part 22 determines whether x=0 and y=0 hold for the input values x, y, t and q, and if x=0 and y=0, then it inputs the counter value i as r' into the base-$\phi$ expansion correcting part 25, and the procedure goes to step S10.

Step S5: For the input values x, y, t and q, the control parts 22 sets u←x mod q and v←(x−u)/q.

Step S6: Determine whether u=0 or 2x+ty>2u−q.

Step S7: If so, set and write (x, y)←(tv+y, −v) in the memory 23.

Step S8: If not, set (x, y)←(tv+y+t, −v−1) and u←u−q, and write these values in the memory 23.

Step S9: The control part 22 inputs u as $c'_i$ into the base-$\phi$ expansion correcting part 25, then adds 1 to i and writes it into the memory 23, followed by a return to step S4.

Step S10: If x=0 and y=0 in step S4, then the base-$\phi$ expansion correcting part 25 calculates, from the input values r', k and $c'_i$, values r and $c_i$ such that $$\sum_{i=0}^{r'-1} c'_i \phi^i = \sum_{i=0}^{r-1} c_i \phi^i \tag{49}$$

and that r≤k, and outputs them.

Pre-Computed Table Reference Addition Part (FIG. 40)

As depicted in FIG. 40, the pre-computed table reference addition part 30 comprises a memory 31, a control part 32, an elliptic-curve addition part 33 and an elliptic-curve doubling part 34. For the inputs thereto of elliptic curve E, elliptic-curve rational point sequence $R_{t,i}=\phi^i 2^{ta}P(0 \leq i<r, 0 \leq t<s)$ and integer $c_i$ ($0 \leq t<s$), the pre-computed table reference addition part 30 calculates mP by the following equation $$mP = \sum_{i=0}^{r-1} c_i R_{t,i} \tag{50}$$

and outputs it.

Figure 41:
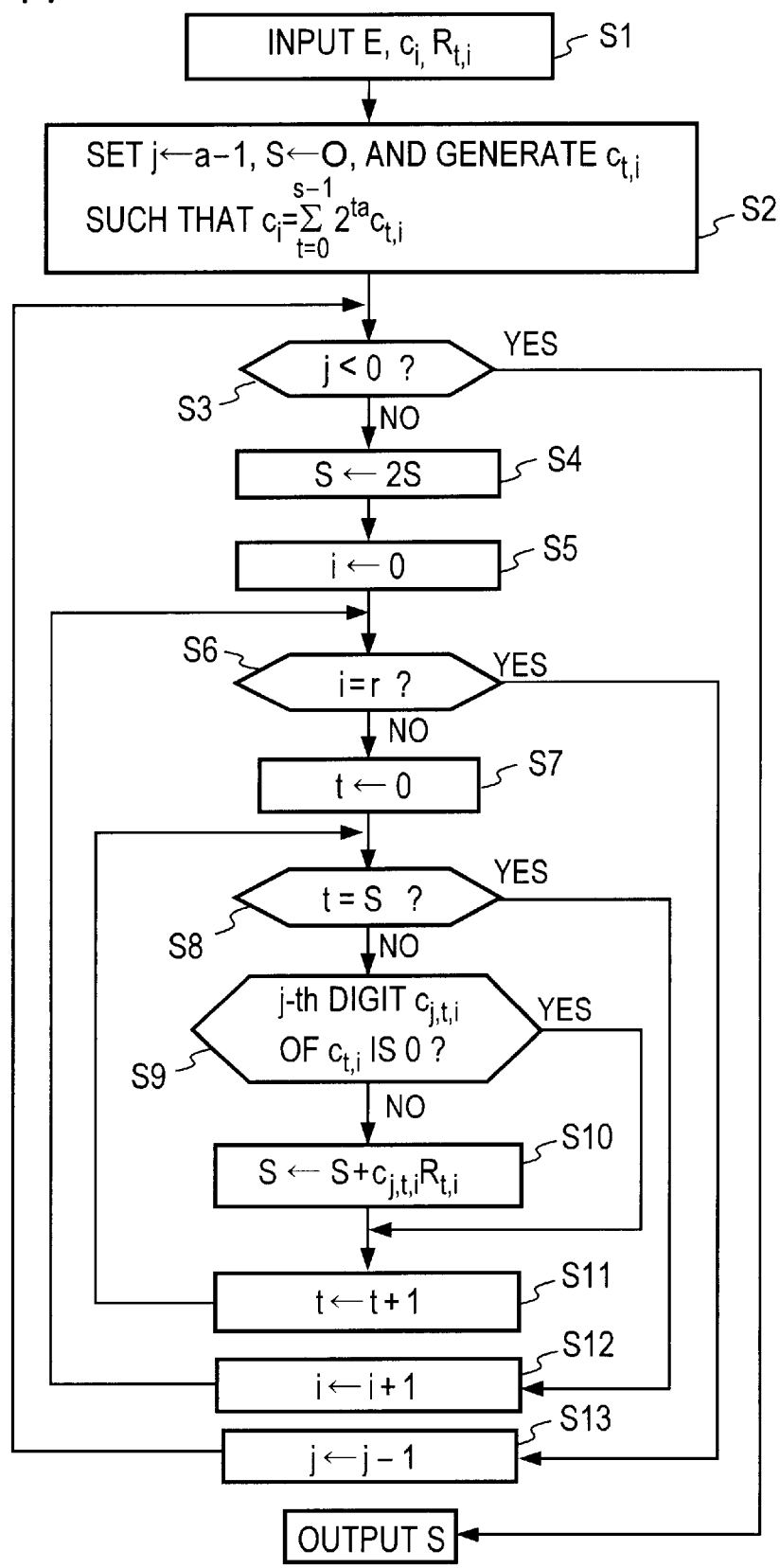
FIG. 41 is a flowchart depicting the pre-computed table reference addition procedure.

The operation of the pre-computed table reference addition part 30 is implemented by computer following the procedure of FIG. 41 as described below.

Step S1: Input E, $c_i$ and $R_{t,i}$.

Step S2: The control part 32 sets j←a−1 and S←O and stores j and S in the memory 31. Further, the control part 32 generates $c_{t,j}$ such that $$c_i = \sum_{t=0}^{s-1} 2^{ta} c_{t,i} \tag{51}$$

The memory 31 passes i, t, j and S to the control part 32.

Step S3: If j<0, then the control part 32 outputs S and terminates the procedure.

Step S4: If not, then the control part 32 passes S to the elliptic-curve doubling part 34. For the input S the elliptic-curve doubling part 34 passes 2S to the control part 32. The control part 32 stores 2S as S in the memory 31.

Step S5: The control part 32 sets is←0.
Step S6: If i=r, then the procedure goes to step S13.
Step S7: The control part 32 sets t←0.
Step S8: It t=s, then the procedure goes to step S12.
Step S9: If the j-th digit $c_{j,t,i}$ of $c_{t,i}$ is equal to zero, the procedure goes to step S11.
Step S10: The control part 32 passes S and $c_{j,t,i}$, $R_{t,i}$ to the elliptic curve addition part 33. For the input S and $c_{j,t,i}R_{t,i}$, the elliptic curve addition part 33 passes $S+c_{j,t,i}R_{t,i}$ to the control part 32. The control part 32 stores $S+c_{j,t,i}R_{t,i}$ as S in the memory 31.
Step S11: The control part 32 sets t←t+1 and the procedure goes to sep S8.
Step S12: The control part 32 sets i←t+1 and the procedure goes to step S6.
Step S13: The control part 32 sets j←j+1 and the procedure goes to step S3.

Base-φ Expansion Correcting Part (FIG. 42)

As depicted FIG. 42, the base-φ expansion correcting part 25 in FIG. 38 comprises an addition part 25A, an α generation part 25B and a subtraction part 25C as in the case of FIG. 25. For the inputs thereto of integers $c'_0, c'_1, \ldots, c'_{r-1}$, r' and k, the base-φ expansion correcting part 25 calculates and outputs integers $c_0, c_1, \ldots, c_{r-1}$ and r that satisfy the following equation:

$$\sum_{i=0}^{r'-1} c'_i P_i = \sum_{i=0}^{r-1} c_i P_i \quad (52)$$

Figure 43:
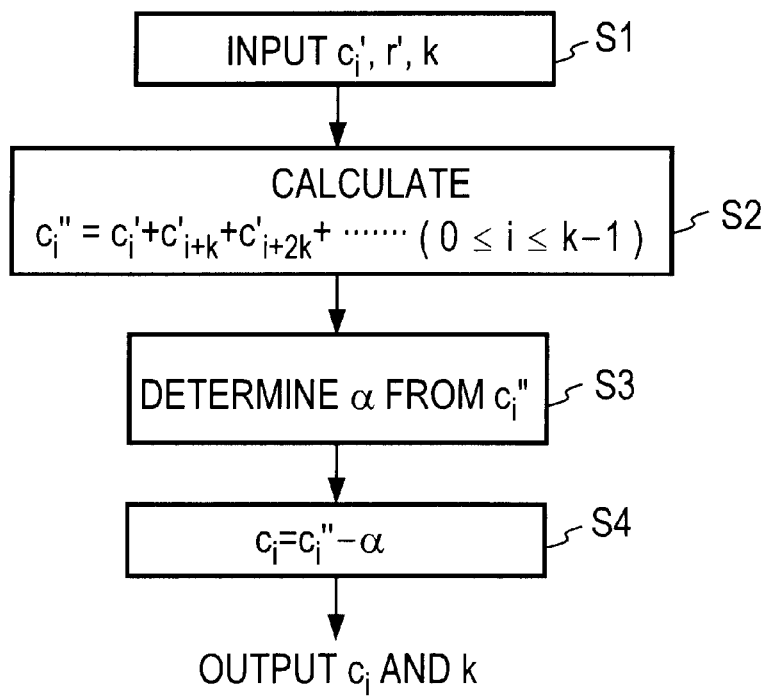
FIG. 43 is a flowchart depicting the base-φ expansion correction procedure.

The operation of the base-φ expansion correcting part 25 is implemented by computer following the procedure of FIG. 43 as described below.

Step S1: Upon inputting of $c'_i$, r' and k into the correcting part 25, the addition part 25A calculates $c''_i$ such that $$c''_i = c'_i + c'_{i+k} + c'_{i+2k} + \ldots, (0 \leq i < k).$$

Step S2: The α generation part 25B calculates $c_i = c''_i - \alpha$ from the inputs thereto $c''_i$ and k, and letting $w_i$ denote the number of digits other than 0 when $c_i$ is expressed in binary or signed binary number, the α generation part 25B calculates an appropriate at that reduces or statistically decreases $$\sum_{i=0}^{k-1} w_i \quad (53)$$

Step S3: The subtraction part 25C calculates and outputs $c_i = c''_i - \alpha$ ($0 \leq i < k$) and, further, outputs k as r.

Thus, the sixth embodiment of the present invention improves the conventional algorithm using the Frobenius map for the elliptic curve over GF(q), providing enhanced efficiency in the elliptic-curve multiplication. This accelerates the signature verification in the elliptic curve DSA signature scheme, for instance.

EMBODIMENT 7

In each of the embodiments described above, the $P_i$ generation part 10 calculates $P_i = \phi^i P$ ($0 \leq i < k$). This calculation is to map $P_i$ times using φ. Letting the elliptic-curve point $P_0$ be represented by ($x_0$, $y_0$), the point ($x_i$, $y_i$) by i-times mapping becomes ($X_o^{iq}$, $y_0^{iq}$). That is, an arithmetic operations $x^q$ and $y^q$ performed for each mapping by the power operating parts 14A and 14B of the Frobenius mapping means 14 depicted in FIG. 5, for instance. This embodiment described below is intended to increase the efficiency of the power operations of the power operating parts 14A and 14B in the Frobenius mapping means 14.

Usually, to express an element a (a∈GF(qk)) by a set of elements ($a_0, a_1, \ldots, a_{k-1}$) over the finite field GF(q), either one of the following schemes is chosen in many cases. The one is the scheme that expresses the element a using a polynomial basis $\{1, \alpha, \alpha^2, \ldots, \alpha^{k-1}\}$ with $\alpha \in GF^*(q^k) = GF(q^k) - \{0\}$ as the generator, and the other uses a normal basis $$(\alpha, \alpha^q, \alpha^{q^2}, \ldots, \alpha^{q^{k-1}})$$

In the case of using the polynomial basis, elements $a_i$ ($0 \leq i < k$) of the finite field GF(q) are used to provide $$a = \{a_0, a_1, a_2, \ldots, a_{k-1}\} = a_0 + a_1\alpha + a_2\alpha^2 + \ldots + a_{k-1}\alpha^{k-1}.$$

In the case of using the normal basis, the elements $a_i$ ($0 \leq i < k$) of the finite field GF(q) are used to provide $$a = \{a_0, a_1, a_2, \ldots, a_{k-1}\} = a_0\alpha + a_1\alpha^q + a_2\alpha^{q^2} + \ldots + a_{k-1}\alpha^{q^{k-1}}$$

Incidentally, since the generators of the polynomial basis and the normal basis differ in the necessary and sufficient condition, the values do not necessarily become equal to each other. (For particulars, refer to HIRAMATSU Toyokazu, "Applied Algebra," Shohkaboh, chap. 3,3 and 3.6.)

Depending on whether the polynomial or normal basis is used, the arithmetic operation exhibits different characteristics. Usually, the polynomial basis is faster in the multiplication of elements than the normal basis, but in the $a^q$-th power operation, the latter is faster than the former.

According to Stinson, "Theory of Cryptography," translated by Sakurai, Kyoritsu Shuppan, p.198, in the case of performing addition which is a binary operation of elements defined over an elliptic curve, $$x_3 = \lambda^2 - x_1 - x_2$$

$$y_3 = \lambda(x_1 - x_3) - y_1$$

where $\lambda = (3x_1^2 + c)/(2y_1)$ for $x_1 = x_2$ and $y_1 = y_2$, and in the other cases $\lambda = (y_2 - y_1)/(x_2 - x_1)$. The value c is a quantity that depends on the parameter chosen over the elliptic curve.

Since the above operation is repeated, there is no difference between the polynomial basis and the normal basis in the case of addition, but the polynomial basis is preferred because of its advantage of fast multiplication over the normal basis.

However, in the case of Frobenius mapping from a to $a^q$, the normal basis representation is considered to be preferable because it requires only substitution of $\{a_0, a_1, a_2, \ldots, a_{k-1}\}$ with $\{a_{k-1}, a_0, a_1, \ldots, a_{k-2}\}$.

As described above, the polynomial basis permits faster multiplication of elements expressed by that basis but has a defect that the speed of the calculation of a power $a^q$ that is a map of a is low. This embodiment is intended to reduce the number of operations in the power operation ($x^q$, $y^q$) with the map φP that is performed by the Frobenius mapping means 14 in the $P_i$ generation part 10 in the embodiments described previously.

Now, the seventh embodiment of the invention will be described below.

A description will be given first of a power operation scheme using the polynomial basis. In this embodiment, the order q and the degree of the finite GF(q) and β are set so that the minimal polynomial of α over GF(q) is represented as $x^k - \beta$ (P∈GF(q), and the order q and the degree k are set to be relatively prime, and α is used to construct a k-degree extension field $GF(q^k)$ of $GF(q)$. The element a of the extension field $GF(q^k)$ is expressed by a polynomial $a=a_0+a_1\alpha+a_2\alpha^{2q}+\ldots+a_{k-1}\alpha k-1$ (where $a_i \in GF(q)$, $0 \leq i < k$), and the following operation is performed which is equivalent to the $a^q$-th power operation $a^q=a_0+a_1\alpha^q+a_2\alpha a^{2q}+\ldots+a_{k-1}\alpha^{(k-1)q}$.

Based on the relationship by $\alpha^k-\beta=0$, $\alpha^q$, $\alpha^{2q}$, $\alpha^{3q}$, ... $\alpha^{(k-1)q}$ are expressed respectively as follows:

$$\alpha^q = \alpha^{q \bmod k} \times \beta^{[q/k]}$$

$$\alpha^{2q} = \alpha^{2q \bmod k} \times \beta^{[2q/k]}$$

$$\alpha^{3q} = \alpha^{3q \bmod k} \times \beta^{[3q/k]}$$

$$\alpha^{(k-1)q} = \alpha^{(k-1)q \bmod k} \times \beta^{[(k-1)q/k]} \quad (54)$$

where $[iq/k]$ ($0<i<k$) represents an integer with the fraction portion of $iq/k$ dropped. Since q and k are relatively prime, iq mod k≠0. Furthermore, since q≠k, jq mod k≠q mod k holds for an arbitrary integer j that satisfies $0<j \neq i<k$. Accordingly, each element of k-1 bases ($\alpha^{q \bmod k}$, $\alpha^{2q \bmod k}$, $\alpha^3 q \bmod k$, ..., $\alpha^{2q \bmod k}$) has exponents different from each other, and the bases ($\alpha^{q \bmod k}$, $\alpha^{2q \bmod k}$, $\alpha^{3q \bmod k}$, ... $\alpha^{(k-1)q \bmod k}$) differ only in the basis ($\alpha$, $\alpha^2$, ... $\alpha^{(k-1)}$) and in the order of their elements but form the same space. The results of the operation iq mod k ($0<i<k$) will hereinafter be identified by iq/(k). The new bases are constructed by rearranging the computed bases ($\alpha^{q/(k)}$, $\alpha^{2q/(k)}$, $\alpha^{3q/(k)}$, ..., $\alpha^{(k-1)q(k)}$) in ascending order of powers. In the following description, the replacement operation of rearranging the newly computed bases in a manner to increase iq mod k ($0<i<k$) will be indicated by < >. Accordingly, $<\alpha^{q/(k)}, \alpha^{2q/(k)}, \alpha^{3q/(k)}, \ldots \alpha^{(k-1)q/(k)}> = \{\alpha, \alpha^2, \alpha^3, \ldots, \alpha^{k-1}\}$.

Next, correcting factors $\beta^{[iq/k]}$ ($0<i<k$) are calculated using preset β, k and q, and are prestored in a memory.

Next, operations $a_0$, $a_1\beta^{[q/k]}$ mod q, $a_2\beta^{[2q/k]}$ mod q, $a_3\beta^{[3q/k]}$ mod q, ... $a_{k-1}\beta^{[(k-1)q/k]}$ mod q are performed for $a_0, a_1, a_2, \ldots, a_{k-1}$ over $GF(q)$, and the results of operations are rearranged in an order corresponding to that of the new bases constructed by rearrangement, $<\alpha^0=1, \alpha^{q/(k)}, a^{2q/(k)}, \alpha^{3q/(k)}, \ldots, \alpha^{(k-1)q/(k)}> = \{1, \alpha, \alpha^2, \ldots, \alpha^{(k-1)}\}$, (in the same order as that in which the new bases were rearranged so that iq mod k ($0<i<k$) would increase.) In this way, processing equivalent to the operation $a^q=a_0+a_1\alpha^q+a_2\alpha^{2q}+\ldots+a_{k-1}\alpha^{(k-1)q}$ can be performed. The result of operation $a_i\beta^{[iq/k]}$ mod q will hereinafter be identified by $a_i\beta^{[iq/k]}/(q)$.

The processing cost by this scheme is to compute $\beta^{[q/k]}$, $\beta^{[2q/k]}, \ldots, \beta^{[(k-1)q/k]}$ (in practice, they are pre-computed and stored in a memory) and to compute $a_i\beta^{[iq/k]}/(q)$ and rearrange the computation results in accordance with the values of q mod k, 2q mod k, ..., (k-1)q mod k. The number of operations can be reduced significantly. This overcomes the defect of the polynomial basis that the q-th power operation $a^q$ takes much time.

Figure 44:
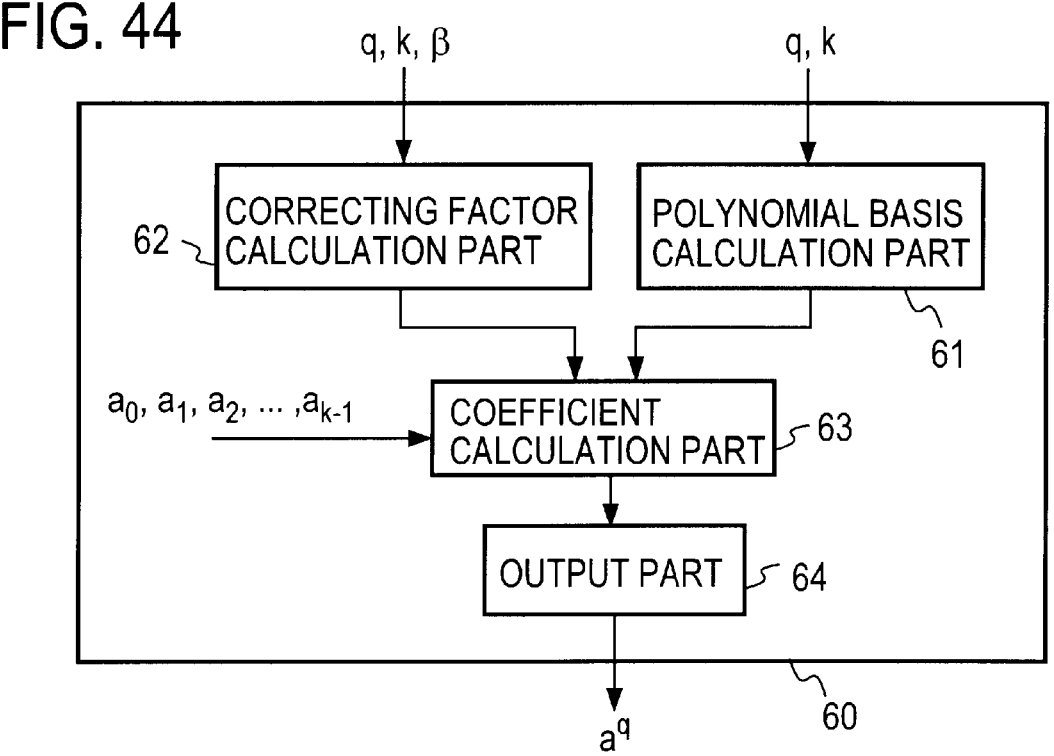
FIG. 44 is a block diagram illustrating an apparatus for implementing an arithmetic method using a polynomial basis according to a seventh embodiment of the present invention.

FIG. 44 is a block diagram of a power operating part for implementing the power operation using the polynomial basis, which is applied to the power operating parts 14A and 14B in the Frobenius mapping means 14 according to the embodiments described previously. The power operating part, indicated generally by 60, is made up of a polynomial basis calculating part 61, a correcting factor calculation part 62, a coefficient calculation part 63 and an output part 64.

The polynomial basis calculation part 61 inputs thereinto the order q of the finite field $GF(q)$ set so that the minimal polynomial of a over $GF(q)$ is expressed as $x^k-\beta$ ($\beta \in GF(q)$), the degree k set so that it and the order q are relatively prime, then calculates iq mod k ($1 \leq i 23 k-1$), then rearranges $1=\alpha^0$ and $\alpha^{iq/(k)}$ ($1 \leq i \leq k-1$) in ascending order of powers, and outputs them as new polynomial bases.

The correcting factor calculation part 62 inputs thereinto the order q, the degree k and β and calculates $\beta^{[iq/k]}$ ($1 \leq i \leq k-1$) as correcting factors of the elements $a_i$ ($1 \leq i \leq k-1$) of $GF(q)$.

The coefficient calculation part 63 inputs thereinto the elements $a_i$ ($1 \leq i \leq k-1$) of $GF(q)$ and the correcting factors $\beta^{[iq/k]}$ ($1 \leq i \leq k-1$), then calculates $a_i\beta^{[iq/k]}$mod q, then rearranges $a_0$ and $a_i\beta^{[iq/k]}/(q)$ ($1 \leq i \leq k-1$) corresponding to the aforementioned rearranged new polynomial bases $<\alpha^0=1$, $\alpha^{iq/(k)}$ ($1 \leq i \leq k-1$)>, and outputs them as coefficients of each basis.

The output part 64 represents the output from the coefficient calculation part 63 by a vector of a then multiplies the polynomial bases arranged in ascending order of powers by the corresponding coefficients and adds together the multiplied results, and outputs the added result as a polynomial of $a^q$.

Figure 45:
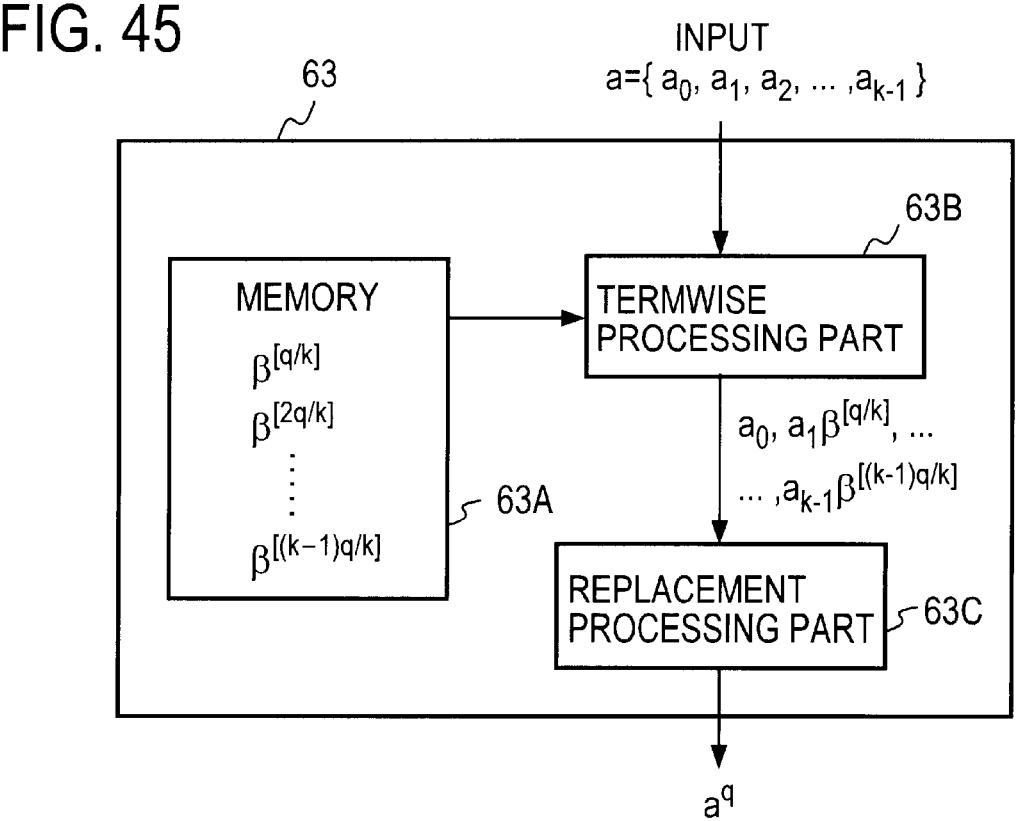
FIG. 45 is a block diagram illustrating an example of the configuration of a coefficient calculating part 63 in FIG. 44.

FIG. 45 is a block diagram illustrating the functional configuration of the coefficient calculation part 63 in the FIG. 44 embodiment. The coefficient calculation part 63 comprises a memory 63A, a termwise processing part 63B and a replacement processing part 63C. The memory 63 has stored therein pre-computed correcting factors $\beta^{[iq/k]}$ ($1 \leq i \leq k-1$). The termwise processing part 63B inputs thereinto the $GF(q)$-elements $a_i$ ($1 \leq i \leq k-1$) and the correcting factors $\beta^{[iq/k]}$ ($1 \leq i \leq k-1$) read out of the memory 63A, and calculates $a_i\beta^{iq/k}$mod q. The replacement processing part 63C processes $a_0$ and $a_i\beta^{[iq/k]}/(q)$ ($1 \leq i \leq k-1$) to rearrange them in correspondence to the new polynomial bases $<\alpha^0=1$, $\alpha^{iq/(k)}$ ($1 \leq i \leq k-1$)> arranged in ascending order of powers, and outputs them as coefficients of each corresponding basis.

Figure 46:
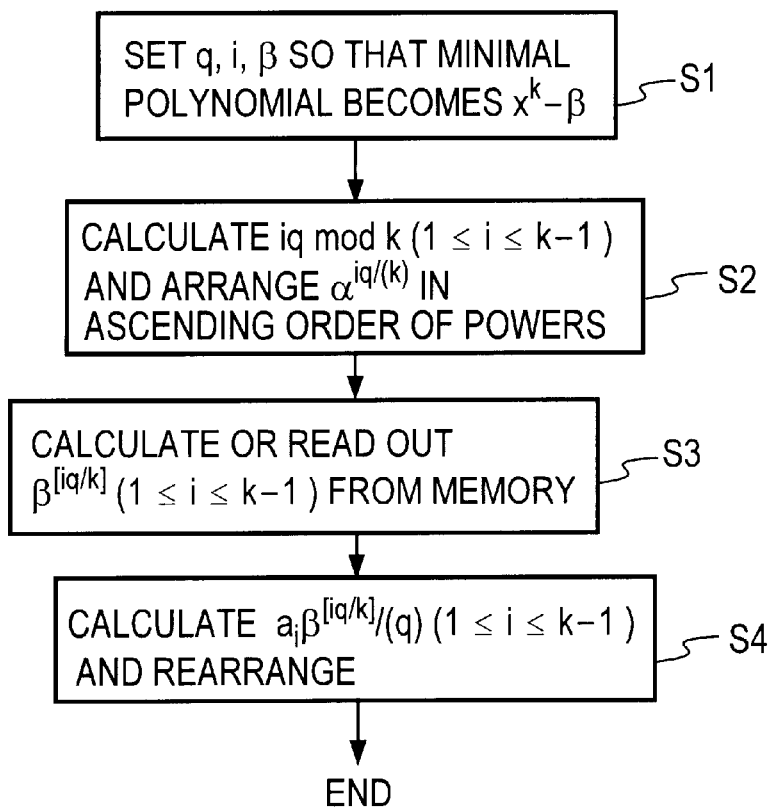
FIG. 46 is a flowchart for explaining the operation of the seventh embodiment.

FIG. 46 is a flowchart for explaining the operation of the FIG. 44 embodiment.

Step S1: The order q and order k of the finite field $GF(q)$ and β are preset so that the minimal polynomial of α over $GF(q)$ is expressed as $x^k\beta$, where k and q are relatively prime.

Step S2: Then, iq mod k ($0<i<k$) is calculated and $\alpha^{iq/(k)}$ ($0<i<k$) are arranged in ascending order of powers to construct new polynomial bases.

Step S3: Then, the correcting factors $\beta^{[iq/(k)]}$ ($0<i<k$) are calculated. When β, i and q are preknown and these correcting factors are prestored in the memory, the correcting factors are read out therefrom.

Step S4: Next, element correcting operations, $a_i\beta^{[iq/k]}/(q)$ ($0<i<k$), are performed over $GF(q)$, and the calculated results and $a_0$ are rearranged into an order corresponding to that of the new polynomial bases. The corrected elements $a_0$, $a_i\beta^{[iq/k]}/(q)$ ($0<i<k$) will hereinafter be referred to as coefficients. The newly-ordered arrangement of $a_0$, $a_i\beta^{[iq/k]}/(q)$ ($0<i<k$), i.e., $<a_0, a_i\beta^{[iq/k]}/(q)$ ($0<i<k$)>, is output as a vector of $a^q$. Moreover, the products of respective components of the new polynomial bases and the coefficients corresponding to the components are added together, and the sum is outputs as a polynomial of $a^q$.

The above will be described below, for example, in connection with the case where the bit length |q| of the order q of the finite field $GF(q)$ is 32-bit and k=5. As depicted in FIG. 45, $\beta^{[q/5]}$, $\beta^{[2q/5]}$, $\beta^{[3q/5]}$ and $\beta^{[4q/5]}$ are stored in the memory 63A, and for the inputs $a_0, a_1, a_2, a_3$ and $a_4$ to the termwise processing part 63B, outputs $a_0$, $a_1\beta^{[q/5]}$, $a_2\beta^{[2q/5]}$, $a_3\beta^{[3q/5]}$ and $a_4\beta^{[4q/5]}$ are generated. Foe instance, when q mod k=2 (i.e. q=5q+2 for a positive integer q), q mod k, 2q mod k, 3q mod k and 4q mod k become 2, 4, 1 and 3, respectively. As a result, new bases become as follows:

$$<1, \alpha^{qmod5}, \alpha^{2qmod5}, \alpha^{3qmod5}, \alpha^{4qmod5}> = \{1, \alpha^{3q/(5)}, \alpha^{q/(5)}, \alpha^{4q/(5)}, \alpha^{2q/(5)}\}$$

$$= \{1, \alpha, \alpha^2, \alpha^3, \alpha^4\} \ldots$$

Accordingly, the order of the coefficients $$\{a_0, a_1\beta^{\lceil q/5\rceil}/(q), a_2\beta^{\lceil 2q/5\rceil}/(q), a_3\beta^{\lceil 3q/5\rceil}/(q), a_4\beta^{\lceil 4q/5\rceil}/(q)\}$$

is replaced with $$\{a_0, a_3\beta^{\lceil 3q/5\rceil}/(q), a_1\beta^{\lceil q/5\rceil}/(q), a_4\beta^{\lceil 4q/5\rceil}/(q), a_2\beta^{\lceil 2q/5\rceil}/(q)\}.$$

As the result of this, the replacement corresponding to the following 5 by 5 matrix is performed:

$$\begin{pmatrix} 1 & 0 & 0 & 0 & 0 \\ 0 & 0 & 0 & 1 & 0 \\ 0 & 1 & 0 & 0 & 0 \\ 0 & 0 & 0 & 0 & 1 \\ 0 & 0 & 1 & 0 & 0 \end{pmatrix} \begin{pmatrix} a_0 \\ a_1\beta^{\lceil q/5\rceil} \\ a_2\beta^{\lceil 2q/5\rceil} \\ a_3\beta^{\lceil 3q/5\rceil} \\ a_4\beta^{\lceil 4q/5\rceil} \end{pmatrix} = \begin{pmatrix} a_0 \\ a_3\beta^{\lceil 3q/5\rceil} \\ a_1\beta^{\lceil q/5\rceil} \\ a_4\beta^{\lceil 4q/5\rceil} \\ a_2\beta^{\lceil 2q/5\rceil} \end{pmatrix} \quad (55)$$

Accordingly, the vector representation of $a^q$ is $$\{a_0, a_3\beta^{\lceil 3q/5\rceil}/(q), a_1\beta^{\lceil q/5\rceil}/(q), a_4\beta^{\lceil 4q/5\rceil}/(q), a_2\beta^{\lceil 2q/5\rceil}/(q)\}.$$

Furthermore, the polynomial basis representation of $a^q$ is $$a^q = a_0 + \{a_3\beta^{\lceil 3q/5\rceil}/(q)\}\alpha + \{a_1\beta^{\lceil q/5\rceil}/(q)\}\alpha^2 + \{a_4\beta^{\lceil 4q/5\rceil}/(q)\}\alpha^3 + \{a_2\beta^{\lceil 2q/5\rceil}/(q)\}\alpha^4.$$

In the FIG. 44 block diagram of the power operating part 60, there are not shown a processor which controls the power operating part to implement the operation schemes using the polynomial bases according to first and third embodiments and a control program which describes procedures necessary for implementing the operation schemes.

In the control program for implementing the power operation by the power operating part depicted in FIG. 44, there are described procedures for performing the processing listed below.

(1) Procedure by which the polynomial basis calculation part 61 inputs thereinto the order q and the degree k, calculates iq mod k ($1 \leq i \leq k-1$), then arranges $1 = \alpha^0$ and $\alpha^{iq/(k)}$ ($1 \leq i \leq k-1$) in ascending order of powers and outputs them as new polynomial bases.

(2) Procedure by which the correcting factor calculation part 62 inputs thereinto the order q, the degree k and β, divides iq ($1 \leq i \leq k-1$) by k to obtain an integer [iq/k] with its fractional portion dropped, and calculates $\beta^{iq/(k)}$ ($1 \leq i \leq k-1$) as the elements correcting factors of the GF(q)-elements $a_i$ ($1 \leq i \leq k-1$).

(3) Procedure by which the coefficient calculation part 63 inputs thereinto the GF(q)-elements $a_i$ ($1 \leq i \leq k-1$) and the correcting factors $\beta^{\lceil iq/(k)\rceil}$ ($1 \leq i \leq k-1$), then calculates $a_i\beta^{\lceil iq/(k)\rceil}$ mod q, then arranges $a_0$ and the calculated results $a_i\beta^{\lceil iq/(k)\rceil}/(q)$ ($1 \leq i \leq k-1$) in ascending order of powers in correspondence to the new polynomial bases $<1 = \alpha^0, \alpha^{iq/(k)}$ ($1 \leq i \leq k-1$)>, and outputs them as coefficients of the respective bases.

(4) Procedure by which the output part 46 represents the output from the coefficient calculation part 63 as the vector of $a^q$, and outputs, as the polynomial of $a^q$, the result of addition of the results of multiplications of the polynomial bases arranged in the ascending order of powers by the coefficients respectively corresponding to them.

As described above, the seventh embodiment of the present invention offers arithmetic method and apparatus using the polynomial bases with which it is possible to handle more general-purpose values by additionally processing arithmetic operations applied to data of limited length.

EMBODIMENT 8

A description will be given of another scheme for efficient calculation of the Frobenius map, that is, the q-th power of a.

As referred to previously, the q-th power $a^q$ of the element a is given by the following equation:

$$a^q = a_0 + a_1\alpha^q + a_2\alpha^{2q} + \ldots + a_i\alpha^{iq} \ldots a_{k-1}\alpha^{(k-1)q} \quad (56)$$

where $\alpha^{iq}$ ($0 \leq i \leq k-1$) is given by the following equation applying the definition of the minimal polynomial, $\alpha^k - \beta = 0$, to the minimal polynomial $x^k - \beta$ ($\beta \in GF(q)$) of α over GF(q):

$$\alpha^{iq} = \alpha^i \alpha^{i(q-1)} \quad (57)$$

$$= \alpha^i \beta^{i(q-1)/k}$$

Accordingly, $a^q$ is given by the following equation:

$$a^q = a_0 + a_1\alpha\beta^{\lceil(q-1)/k\rceil} + a_2\alpha^2\beta^{2\lceil(q-1)/k\rceil} + \ldots + a_i\alpha^i\beta^{i\lceil(q-1)/k\rceil} + \ldots$$
$$+ a_{k-1}\alpha^{(k-1)}\beta^{(k-1)\lceil(q-1)/k\rceil} \quad (58)$$

In Equation (58), since i(q-1)/k (0<i<k) is an integer, $a_i\beta^{i\lceil(q-1)/k\rceil} \in GF(q)$ (0<i<k). Hence, Equation (58) indicates that $a^q$ is expressed as the polynomial of α over GF(q).

Equation (58) indicates:

(1) The vector representation of $a^q$ using ($\alpha^0 = 1, \alpha, \alpha^2, \ldots, \alpha^{k-1}$) as the basis is as follows:

$$a^q = (a'_0, a'_1, a'_2, \ldots, a'_i, \ldots, a'_{k-1}) \quad (59)$$

$$= (a_0, a_1\beta^{\lceil(q-1)/k\rceil}, a_2\beta^{2\lceil(q-1)/k\rceil}, \ldots, a_i\beta^{i\lceil(q-1)/k\rceil}, \ldots,$$
$$a_{k-1}\beta^{(k-1)\lceil(q-1)/k\rceil})$$

(2) The polynomial representation of $a^q$ using ($\alpha^0 = 1, \alpha, \alpha^2, \ldots, \alpha^i, \ldots, \alpha^{k-1}$) as the basis is as follows:

$$a^q = a_0 + \sum_{i=1}^{k-1} a_i \beta^{iq-\frac{1}{k}} \alpha^i \quad (60)$$

The eighth embodiment of the invention will be described with reference to FIGS. 47 and 48.

Figure 47:
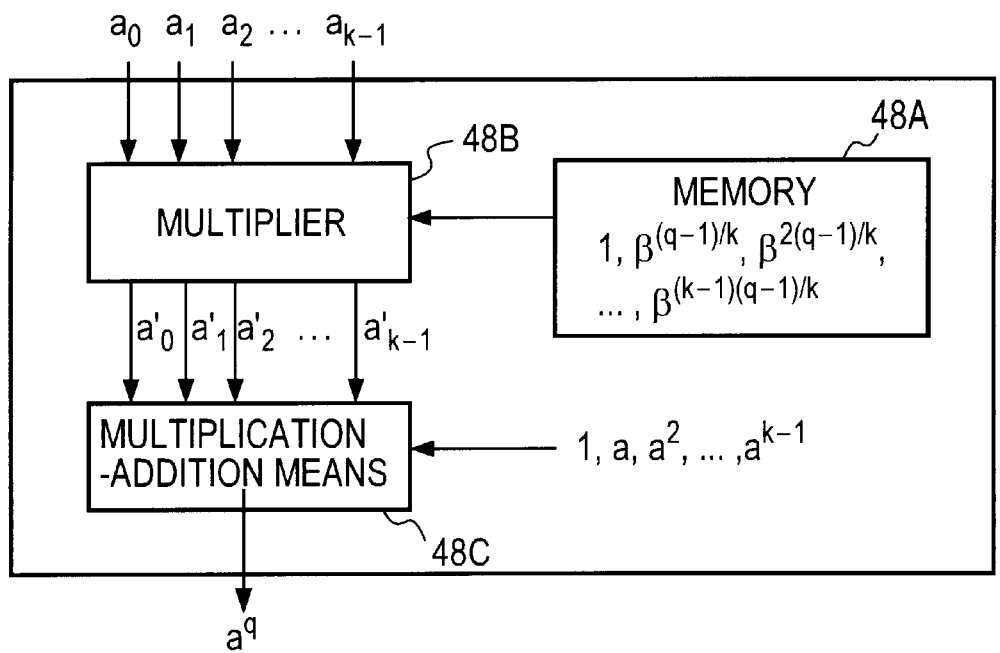
FIG. 47 is a block diagram illustrating a Frobenius map multiplication apparatus.

FIG. 47 is a block diagram illustrating an example of a Frobenius map calculation apparatus for implementing the Frobenius map calculation scheme according to this embodiment. In the following description, the k-degree extension field over GF(q) will be identified by $GF(q^k)$ and the element of an algebraic system $GF^*(q^k) - \{0\}$ by α.

The calculation apparatus depicted in FIG. 47 is a Frobenius map calculation apparatus which presets q, β and k such that the minimal polynomial of α over GF(q) becomes $$x^k - \beta (\beta \in GF(q)) \quad (61)$$

and, under the condition that k-1(q-1) (k exactly divides q-1), calculates $$a^q = a_0 + a'_1\alpha + a'_2\alpha^2 + \ldots + a'_j\alpha^j + \ldots + a'_{k-1}\alpha k - 1$$

where $a'_j \in GF(q)$ and $0 \leq j < k$, as processing equivalent to $a^q = a_0 + a_1\alpha^q + a_2\alpha^{2q} + \ldots + a_{k-1}\alpha^{(k-1)q}$ which is the q-th power of $$a = a_0 + a_1\alpha + a_2\alpha^2 \ldots + a_{k-1}\alpha^{k-1}$$

where $a \in GF^*(q^k)$, $a_i \in GF(q)$ and $0 \leq i \leq k-1$. Here, $a'_i$ is given by the following equation:

$$a'_{i} = a_i \beta^{i[(q-1)/k]}, \quad (0 < i < k) \tag{62}$$

as expressed in the aforementioned Equation (59).

The Frobenius map calculation apparatus is made up of a memory 48A, a multiplier 48B and a multiplication-addition means 48C. The memory 48A stores the following values pre-computed using preset q, β and k:

$$\beta^0 = 1, \beta^{\frac{q-1}{k}}, \beta^{2q-\frac{1}{k}}, \beta^{3q-\frac{1}{k}}, \ldots, \beta^{(k-1)q-\frac{1}{k}} \tag{63}$$

The multiplier 48B inputs thereinto $(\alpha_0, a_1, \ldots a_i, \ldots, a_{k-1})$ from an external circuit and $(1, \beta^{[(q-1)/k]}, \beta^{2[(q-1)/k]}, \ldots, \beta^{2[(q-1)/k]}, \ldots, \beta^{(k-1)[(q-1)/k]})$ from the memory 48A and multiplies them by the corresponding coefficients to generate $$(a'_0, a'_1, \ldots, a'_i, \ldots, a'_{k-1}) = (a_0 1, a_1\beta^{[(q-1)/k]}, \ldots, a_i\beta^{i[(q-1)/k]}, \ldots, a_{k-1}\beta^{(k-1)[(q-1)/k]})$$

The multiplication-addition means 48C inputs thereinto the output $(a'_0, a'_1, \ldots, a'_i, \ldots, a'_{k-1})$ from the multiplier 48B and $(\alpha = 1, \alpha, \ldots \alpha^i, \ldots \alpha^{k-1})$ from an external circuit, then multiplies them by the coefficients corresponding thereto, then, adds together the multiplied results, and the added result as $a^q$.

Figure 48:
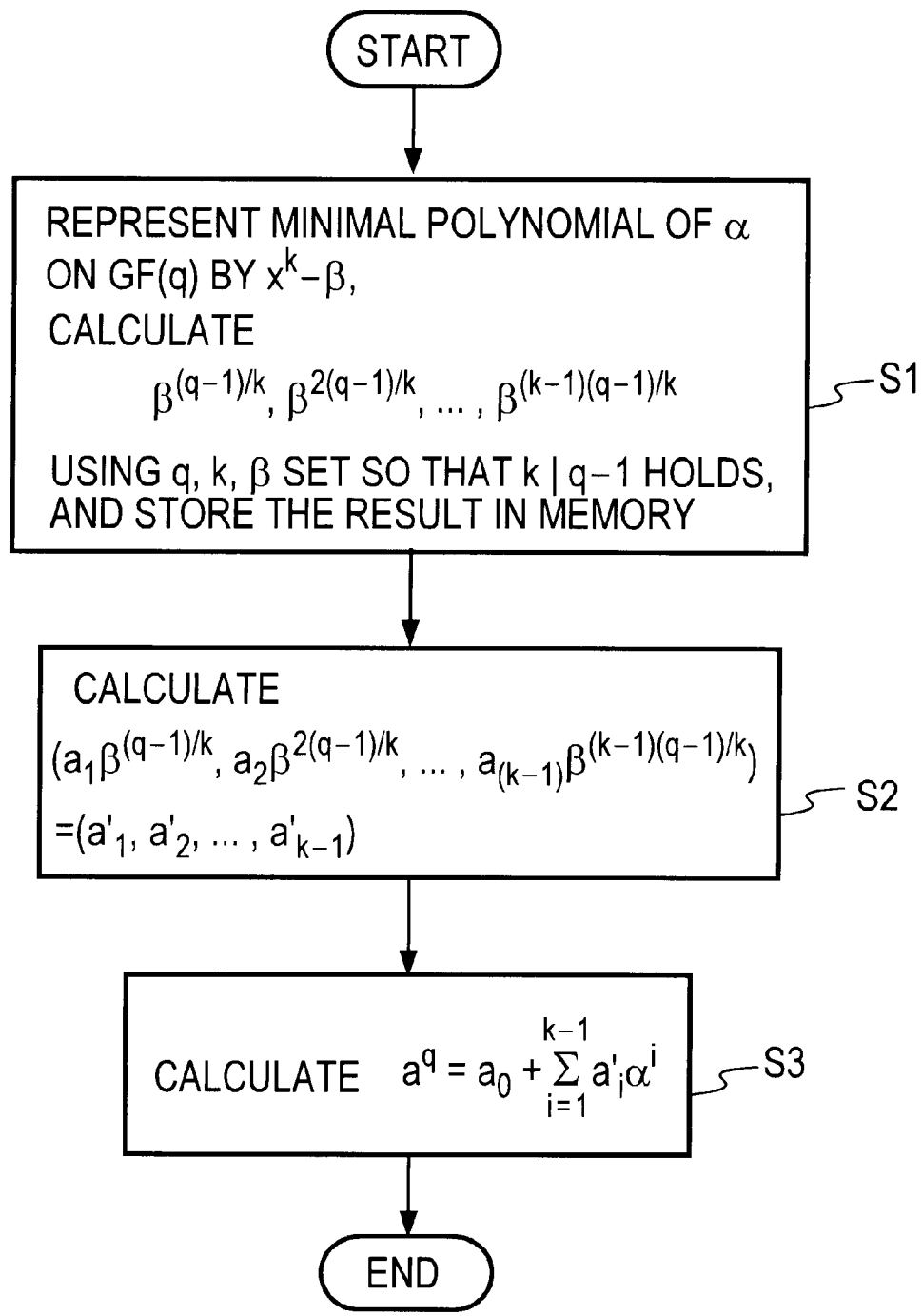
FIG. 48 is a flowchart for explaining the operation of the Frobenius map multiplication apparatus of FIG. 47.

FIG. 48 is a flowchart for explaining the operation of the Frobenius map calculation apparatus. To clarify the technical idea of this embodiment, FIG. 47 depicts an example in which the multiplier 48B multiplies 1 read out of the memory 48A and $a_0$ from the external circuit to generate $a'_0 = a_0$; in practice, however, 1 is not stored in the memory 48A but $a_0$ is passed through the multiplier 48B to thereby reduce the number of operations. Accordingly, the flowchart of FIG. 48 describes the operation in the case where 1 is not stored in the memory 48A and $a_0$ is passed through the multiplier 48B.

Step S1: To begin with, the minimal polynomial of α over GF(q) is represented by $x^k - \beta$, then q, k and β preset so that $k|(q-1)$ holds are used to calculate $\beta^{[(q-1)/k]}, \beta^{2[(q-1)/k]}, \ldots, \beta^{i[(q-1)/k]}, \beta^{(k-1)[(q-1)/k]}$, and the calculated results are stored in the memory 48A.

Step S2: Then, the multiplier 48B inputs thereinto $a_0, a_2, \ldots, a_1, \ldots, a_{k-1}$ from an external circuit and $$\beta^{[(q-1)/k]}, \beta^{2[(q-1)/k]}, \ldots, \beta^{i[(q-1)/k]}, \ldots, \beta^{(k-1)[(q-1)/k]}$$

from the memory 48A and generates $$(a_0, a_1\beta^{[(q-1)/k]}, a_2\beta^{2[(q-1)/k]}, \ldots, a_i\beta^{i[(q-1)/k]}, \ldots, a_{k-1}\beta^{(k-1)[(q-1)/k]}) = (a'_0, a'_1, a'_2, \ldots, a'_i, \ldots, a'_{k-1}) \tag{64}$$

Step S3: Then, the output $(a'_0, a'_1, a'_2, \ldots, a'_i, \ldots, a'_{k-1})$ from the multiplier 48B and the polynomial bases $(1, \alpha, \alpha^2, \ldots, \alpha^{k-1})$ are subjected to multiplication-addition by the multiplication-addition means 48C, and the calculated result is output therefrom as a polynomial of $a^q$.

The above operation is performed under the control of an information processor not shown in FIG. 47. In practice, the information processor and the Frobenius map calculation apparatus of FIG. 47 are implemented by one computer, and the abovementioned Frobenius map calculation processing is performed following a procedure described in a control program recorded on a recording medium not shown.

The control program represents the minimal polynomial of a over GF(q) as $x^k - \beta$ ($\beta \in GF(q)$) and uses, as data, the order q of the finite field GF(q), the extension degree k and β preset so that the extension degree k exactly divides q−1, causing the computer to perform the Frobenius map computation.

In the first place, the control program controls the computer to perform processing of calculating $\beta^{i[(q-1)/k]}$ for all integers i that satisfy an inequality $0 < i < k$ and then processing of calculating $a_i\beta^{i[(q-1)/k]}$ for all integers i that satisfy an inequality $0 < i < k$.

Next, the control program controls the computer to calculate $$a_0 + \sum_{i=1}^{k-1} a_i \beta^{iq-\frac{1}{k}} \alpha^i \tag{65}$$

and output the calculated result as a polynomial of $a^q$.

The processing cost of the Frobenius map multiplication apparatus according to this embodiment permits appreciable reduction of the number of operations by storing $\beta^{[(q-1)/k]}, \beta^{2[(q-1)/k]}, \ldots, \beta^{(k-1)[(q-1)/k]}$ in the memory.

EFFECT OF THE INVENTION

The present invention can construct the reference table without any pre-computations, and hence it has a wider range of application (to the signature verification in the elliptic curve DSA signature scheme, for instance) than the conventional apparatus employing the reference table method.

Moreover, the present invention improves the conventional Frobenius-map-based multiplication apparatus applicable only to elliptic curves over GF(q) with small q, thereby making it possible to perform the m-multiplication for elliptic curves over an arbitrary definition field with higher efficiency than the multiplication apparatus which does not use the Frobenius map.

The number of operations of n-bit elliptic-curve additions and elliptic-curve doublings necessary for m-multiplication over the elliptic curve according to the embodiments depicted in FIGS. 1, 23 and 34 were compared with conventional binary and signed binary methods; the results are given in the Table I below. In the case where the table reference addition part used the comb method, $q \approx 2^w$ and $n = yw$. z is a value with 1 added to the number of points over an elliptic curve prepared beforehand. In the elliptic curve cryptography n is usually in the range of 160 to 260. And, w is chosen taking into account the CPU word length. (In many cases, w=8, 16, 32, 65 or values close to them.)

TABLE I

|  | Elliptic-Curve Addition | | Elliptic-Curve Doubling |
|---|---|---|---|
|  | Max | Average | Max = Av |
| Binary Method | n | n/2 | n |
| Signed Binary Method | n/2 | n/3 | n |

TABLE I-continued

|  | Elliptic-Curve Addition | | Elliptic-Curve Doubing |
|---|---|---|---|
|  | Max | Average | Max = Av |
| FIG. 1 | n | n/2 | y |
| FIG. 23 | n/2 | Aprx n/3 | y |
| FIG. 34 | n/2 | Aprx n/3 | y/z |
|  |  | *y = 3: n/4 |  |
|  |  | y = 7: 11n/32 |  |
|  |  | y = 11: 193n/512 |  |

For example, when q=16 and k=40, the apparatus of the present invention can perform the m-multiplication around 3.9 times faster than in the case of using no Frobenius map.

When the definition field is GF(2), the algorithm is the same as that of the prior art; hence, the present invention constitutes an extension of the conventional apparatus.

What is claimed is:

1. An elliptic curve multiplication apparatus for calculating m-multiplication of $GF(q^k)$-rational point P over an elliptic curve E/GF(q) defined over a finite field, said apparatus comprising:

input means for inputting thereinto said $GF(q^k)$-rational point P, a Frobenius map $\phi$ defined over said elliptic curve E/GF(q), an integer k, and a prime q exceeding 3 or a power of said prime;

base-$\phi$ expansion means for calculating integers r and $c_i$, where $0 \leq i < r$, $0 \leq r \leq k$, $-q \leq c_i \leq q$, which satisfy $$m = \sum_{i=0}^{r-1} c_i \phi^i \quad (1a)$$

using said Frobenius map $\phi$ dependent on said elliptic curve E/GF(q);

$P_i$ generation means supplied with said $GF(q^k)$-rational point P and said integers r and $c_i$, for calculating r points $P_0$ to $P_{r-1}$ such that $P_0 = P$ $P_1 = \phi P$ $P_2 = \phi^2 P$

:

$P_{r-1} = \phi^{r-1} P$;

table reference addition means supplied with said r points $P_0$ to $P_{r-1}$, for obtaining mP by $$mP = \sum_{i=0}^{r-1} c_i \phi^i P \quad (2a)$$

and output means for outputting said mP.

2. The apparatus of claim 1, wherein said table reference addition means comprises means for obtaining a value $S_d$ by adding all $P_i$ for i which correspond to $c_i$ not exceeding d and for obtaining said mP by $$S = \sum_{d=0}^{b} S_d$$

where b is the maximum among $c_i$.

3. The apparatus of claim 1, wherein said table reference addition means comprises:

means for obtaining $c_{ij}$ from $$c_i = \sum_{j=0}^{[\log_2 b]} 2^j c_{ij},$$

where $0 \leq c_{ij} \leq 1$ and b is the maximum among $c_i$;

means for calculating $$S_j = \sum_{i=0}^{k-1} c_{ij} P_i;$$

and means for obtaining said mP by $$S = \sum_{j=0}^{[\log_2 b]-1} 2^j S_j.$$

4. The apparatus of claim 1, wherein said table reference addition means is means for obtaining said mP by calculating:

$$S_j = \sum_{i=0}^{k-1} \delta_{ij} P_i$$

where $\delta_{ij}=1$ for those m=j and $\delta_{ij}=0$ otherwise, and $$S = \sum_{j=0}^{b-1} j S_j$$

where $0 \leq j < b$ and b is the maximum among $c_i$.

5. The apparatus of claim 1, wherein said table reference addition means is means for obtaining $S_0 = mP$ by $S_r = O$ $S_i = c_i P + \phi S_{i+1}, 0 \leq i < r$ \quad (3a)

6. The apparatus of claim 5, wherein:

said $P_i$ generation means comprises means for calculating $P_i = iP$, where $0 < i \leq q$; and said table reference addition means is means for performing the calculation of said Equation (3a) as $S_r = O$ $S_i = P_i + \phi S_{i+1}$, where $0 \leq i < r$, using all or some of said $P_i$.

7. The apparatus of claim 5, wherein said table reference addition means is means which is externally supplied with at least one part of said $P_i$ such that $$P_i = iP,$$

where $0 < i \leq q$, for performing the calculation of said Equation (1a) as $$S_r = O$$

$$S_i = P_i + \phi S_{i+1}, \text{ where } 0 \leq i < r.$$

8. The apparatus of claim 1, which further comprises base-$\phi$ expansion adjustment means which, through utilization of $$\phi^k P = P$$

or $$(\phi^{k-1} + \phi^{k-2} + \ldots + 1)P = 0$$

when it holds for said $GF(q^k)$-rational point P over said elliptic curve, calculates $c'_i$ and $r'$ that satisfy $$\sum_{i=0}^{r-1} c_j \phi^i = \sum_{i=0}^{r'-1} c'_i \phi^i$$

for a $c_i$-sequence obtained by said base-$\phi$ expansion means and for said r and which provides them as said $c_i$ and r to said table reference addition means, and wherein said table reference addition means calculates the right-hand side of said Equation (2a) using said $c_i$ and r provided from said base-$\phi$ expansion adjustment means.

9. The apparatus of claim 8, wherein said base-$\phi$ expansion adjustment means is means which, when r>k, transforms r $c_i$-sequences to k $c'_i$-sequences by performing the transformation $c'_i = c_i + c_{i+k} + c_{i+2k} + \ldots$, $0 \leq i \leq -1$, through utilization of $$\phi^k P = P$$

when it holds for said $GF(q^k)$-rational point P over said elliptic curve, and which inputs said k $c'_i$-sequence into said table reference addition means to perform the calculation of the right-hand side of said Equation (1a).

10. The apparatus of claim 8 or 9, wherein said table reference addition means includes means for obtaining $S_d$ by adding together all $P_i$ for those i which correspond to $c_i$ not exceeding d and calculates said Equation (1a) by $$S = \sum_{d=0}^{r} S_d$$

and said base-$\phi$ expansion adjustment means includes means for transforming $c_i$ to reduce their absolute values through utilization of $$(\phi^{k-1} + \phi^{k-2} + \ldots + 1)P = 0$$

when it holds for said $GF(q^k)$-rational point P over said elliptic curve.

11. The apparatus of claim 8 or 9, wherein:
said table reference addition means determines $c_{ij}$ by $$c_i = \sum_{j=0}^{[\log b]} 2^j c_{ij},$$

where $0 \leq c_{ij} \leq 1$, $[\log b]$ is the maximum integer smaller than b and b is the maximum value of $|c_i|$, and obtains said mP by $$S_j = \sum_{i=0}^{k-1} c_{ij} P_i$$

$$S = \sum_{j=0}^{[\log b]-1} 2^j S_j;$$

and said base-$\phi$ expansion adjustment means includes means for transforming $c_i$ to minimize the Hamming weight represented by the number of values of other digits than those 0 of a binary or signed binary number of said $c_i$, through utilization of $$(\phi^{k-1} + \phi^{k-2} + \ldots + 1)P = 0$$

when it holds for said $GF(q^k)$-rational point P over said elliptic curve.

12. The apparatus of claim 1, 8, or 9, wherein $P_1, P_2, \ldots, P_n$ are input as points P over said elliptic curve, and $m_1, m_2, \ldots, m_n$ are input as said integer m to obtain said mP by $$\sum_{i=0}^{n} m_i P_i$$

13. The apparatus of claim 12, wherein said $P_i$ generation means increases the efficiency of the calculation by said table reference addition means by obtaining at least one part of $S_{i1}, S_{i2}, \ldots, S_{in}$, where $0 \leq i_k \leq 1$, which are obtained from said points $P_1, P_2, \ldots, P_n$ by $$S_{in} = \sum_{k=1}^{n} i_k P_k$$

14. The apparatus of claim 12, wherein the efficiency of the calculation by said table reference addition means is increased by externally inputting at east one part of $S_{i1}, S_{i2}, \ldots, S_{in}$, where $0 \leq i_k \leq 1$, which are obtained from said points $P_1, P_2, \ldots, P_n$ by $$S_{in} = \sum_{k=1}^{n} i_k P_k$$

15. The apparatus of claim 1, wherein:
said base-$\phi$ expansion means calculates r and $c_i$, where $0 \leq i < r$, $0 \leq r < k$ and $-q < c_i < q$, which satisfy $$m = \sum_{i=0}^{r-1} c_i \phi^i$$

using said Frobenius map φ which is defined by E/GF(q);
said $P_i$ generation means is means which, for the input thereto of an integer r and s $GF(q^k)$-rational points $Q_t=d^{ta}P$ (0≤t<s) over E/GF(q) pre-computed with P (where, letting $C=1+\max|c_i|$, a, d and s are positive integers that satisfy $a \times s \geq \log_d$), calculates r×s $GF(q^k)$-rational points $R_{t,i}$ (0≤t<s, 0≤i<r) over E/GF(q); and
said table reference addition means is a pre-computed table reference addition part which calculates $c_{j,t,i} \in B$ (where B is assumed to be a finite set of integers and low in order) such that $$c_i = \sum_{j=0}^{a-1} \sum_{t=0}^{s-1} d^{j+ta} c_{j,t,i} \qquad (4a)$$

and obtains said mP by $$mP = \sum_{j=0}^{a-1} \sum_{i=0}^{r-1} \sum_{t=0}^{s-1} d^j c_{j,t,i} R_{t,i}. \qquad (5a)$$

16. The apparatus of claim 15, further comprising:
means for calculating $$T_j = \sum_{j=0}^{r-1} \sum_{t=0}^{s-1} c_{j,t,i} R_{t,i}; \qquad (6a)$$

and means for calculating said mP by $$mP = \sum_{j=0}^{a-1} d^j T_j \qquad (7a)$$

17. The apparatus of claim 16, wherein:
said integer d is 2;
said set B is {0, 1}; and
a $C_{j,t,i}$-multiplication is constructed only by 0-multiplication and 1-multiplication in said equation (6a).

18. The apparatus of claim 16, wherein:
said integer d is 2;
said set B is {−1, 0, 1}; and
a $C_{j,t,i}$-multiplication is constructed only by (−1)-multiplication, 0-multiplication and 1-multiplication in said equation (6a).

19. The apparatus of claim 1, wherein: letting $GF(q^k)$ represent a k-degree extension field of GF(q), letting $GF(q^k)-\{0\}$ represent an algebraic system $GF^*(q^k)$, letting a represent a root of a k-degree irreducible polynomial on GF(q) and letting an element a of $GF(q^k)$ be represented by a polynomial in the form of $a=a_0+a_1\alpha+a_2\alpha^2 \ldots +a_{k-1}\alpha^{k-1}$ using an element $a_i$ (0≤i<k) of GF(q) and an element α of $GF^*(q^k)$, said $P_i$ generation means includes polynomial-basis power operating means for calculating a power of said a, $a^q=a_0+a_1\alpha^q+a_2\alpha^{2q} \ldots +a_{k-1}\alpha^{(k-1)q}$;
said power operating means comprises:
a polynomial basis calculation part into which, the order q of a finite field GF(q) defined such that f(x) is expressed in the form of $x^k-\beta$, where $\beta \in GF(q)$, and the degree k set to be relatively prime to said order q are input, and which calculates iq mod k (1≤i≤k−1), then, letting iq/(k) represent the calculated results, rearranges $\alpha^0=1$ and $\alpha^{iq/(k)}$ (1≤i≤k−1) in ascending order of powers and outputs them as new polynomial bases;

a correcting factor calculation part which inputs thereto said order q, said degree k and said β, then divides iq (1≤i≤k−1) by k to obtain an integer [iq/k] with its fraction portion dropped, and calculating $\beta^{[iq/k]}$ (1≤i≤k−1) as correcting factors of said element $a_i$ of GF(q) (1≤i≤k−1);
a coefficient calculation part which inputs thereinto said element $a_i$ of GF(q) (1≤i≤k−1) and said correcting factors $\beta^{[iq/k]}$ (1≤i≤k−1), then calculates $a_i\beta^{[iq/k]}$ mod q, then, letting $a_i\beta^{[iq/k]}/(q)$, rearranges $a_0$ and $a_i\beta^{[iq/k]}/(q)$ (1≤i≤k−1) in an order of corresponding to said new polynomial bases, and outputs them as coefficients of said new polynomial bases; and
an output part which represents the output from said coefficient calculation part as a vector of $a^q$, and outputs, as a polynomial representation of said $a^q$, the result of addition of the results of multiplication of respective elements of said polynomial bases arranged in ascending order of powers by the corresponding coefficients.

20. The apparatus of claim 19, wherein: said coefficient calculation part comprises memory means, a termwise processing part and a replacement processing part; said memory means stores pre-computed correcting factors $\beta^{[iq/k]}$ (1≤i≤k−1); said termwise processing part inputs thereto said element $a_i$ of GF(q) (1≤i≤k−1) and said $\beta^{[iq/k]}$ (1≤i≤k−1) read out of said memory means, and calculates $a_i\beta^{[iq/k]}$ mod q; and said replacement processing part rearranges $a_0$ and $a_i\beta^{[iq/k]}/(q)$ (1≤i≤k−1) in anew order corresponding to said new polynomial bases $\{1=\alpha^0, \alpha^{iq/(k)}$ (1≤i≤k−1)$\}$ arranged in ascending order of powers, and outputs them as coefficients of the corresponding bases.

21. The apparatus of claim 19, which further comprises multiplying means which inputs thereto $\beta^{i[(q-1)/k]}$ pre-computed for all integers i that satisfy an inequality 0<i<k using the order q of said finite field GF(q), an extension degree k set to exactly divide q−1 and β and inputs said $a_1$, $a_2, \ldots, a_i, \ldots, a_{k-1}$, then calculates $a_i\beta^{i[(q-1)/k]}$ for said all integers i that satisfy said inequality 0<i<k, and outputs each $a_i\beta^{i[(q-1)/k]}$ (0<i<k) as an element $a'_i$ of said vector representation of $a^q$ corresponding to a basis $\alpha^i$.

22. The apparatus of claim 21, further comprising memory means for storing said pre-computed $\beta^{i[(q-1)/k]}$ (0<i<k) and for outputting it to said multiplying means.

23. The apparatus of claim 21, further comprising multiplication-addition means which inputs thereto said $a_0$ and $a'_i$ (0<i<k) from said multiplying means, then calculates a multiplication-addition $$a_0 + \sum_{i=1}^{k-1} a_i \beta^{i\frac{q-1}{k}} \alpha^i$$

and outputs it as a polynomial representation of said $a^q$.

24. An elliptic curve multiplication method for an apparatus which calculates m-multiplication of $GF(q^k)$-rational point P over an elliptic curve E/GF(q) defined over a finite field, said method comprising the steps of:

(A) inputting said $GF(q^k)$-rational point P, a Frobenius map φ defined over said elliptic curve E/GF(q), an integer k, and a prime q exceeding 3 or a power of said prime;

(B) calculating integers r and $c_i$, where 0≤i<r, 0≤r≤k, −q≤$c_i$≤q, which satisfy $$m = \sum_{i=0}^{r-1} c_i \phi^i \quad (1b)$$

using said Frobenius map φ dependent on said elliptic curve E/GF(q);

(C) generating, by the use of said GF($q^k$)-rational point P and said integers r and $c_i$, r points $P_0$ to $P_{r-1}$ such that $P_0 = P$ $P_1 = \phi P$ $P_2 = \phi^2 P$

:

$P_{r-1} = \phi^{r-1} P$;

(D) calculating $$mP = \sum_{i=0}^{r-1} c_i \phi^i P \quad (2b)$$

for said r points $P_0$ to $P_{r-1}$; and (E) outputting said mP.

25. The method of claim 24, wherein said step (D) comprises the steps of:

(D-1) obtaining a value $S_d$ by adding all $P_i$ for i which correspond to $c_i$ not exceeding d; and (D-2) obtaining said mP by $$S = \sum_{d=0}^{b} S_d$$

where b is the maximum among $c_i$.

26. The method of claim 24, wherein said step (D) comprises the steps of:

(D-1) obtaining $c_{ij}$ from the following equation:

$$c_i = \sum_{j=0}^{[\log_2 b]} 2^j c_{ij},$$

where $0 \leq c_{ij} \leq 1$ and b is the maximum among ci;

(D-2) calculating $S_j$ from the following equation:

$$S_j = \sum_{i=0}^{k-1} c_{ij} P_i; \text{ and}$$

(D-3) obtaining said mP by calculating the following equation:

$$S = \sum_{j=0}^{[\log_2 b]-1} 2^j S_j$$

27. The method of claim 24, wherein said step (D) comprises the steps of:

(D-1) calculating $S_j$ from the following equation:

$$S_j = \sum_{i=0}^{k-1} \delta_{ij} P_i,$$

where $\delta_{ij} = 1$ for those m=j and $\delta_{ij} = 0$ otherwise;

where $0 \leq j < b$ and b is the maximum among $c_i$; and (D-2) calculating S as mP from the following equation:

$$S = \sum_{j=0}^{b-1} j S_j$$

28. The method of claim 24, wherein said step (D) is a step of obtaining $S_0$ as said mP by calculating $S_r = 0$ $S_i = c_i P + \phi S_{i+1}, \ 0 \leq i < r \quad (3b)$

29. The method of claim 28, wherein:

said step (C) includes a step of calculating $P_i = iP,$ where $0 < i \leq q$; and said step (D) is a step of performing the calculation of said Equation (3b) as $S_r = 0$ $S_i = P_i + \phi S_{i+1}$, where $0 < i \leq r$, using all or some of said $P_i$.

30. The method of claim 28, wherein; at least one part of said $P_i$ is externally input which is such that $P_i = iP,$ where $0 < i \leq q$; and said step (D) is a step of calculating said Equation (1b) as $S_r = 0$ $S_i = P_i + \phi S_{i+1}$ where $0 \leq i < r$.

31. The method of claim 24, which further comprises a base-φ expansion adjustment step of calculating, through utilization of $\phi^k P = P$ or $(\phi^{k-1} + \phi^{k-2} + \ldots + 1)P = 0$ when it holds for said GF($q^k$)-rational point P over said elliptic curve, $c'_i$ and r' that satisfy $$\sum_{i=0}^{r-1} c_i \phi^i = \sum_{i=0}^{r'-1} c'_i \phi^i$$

for a $c_i$-sequence obtained by said step (B) and for said r and providing them as said $c_i$ and r to said step (D), and wherein said step (D) calculates the right-hand side of said Equation (2b) using said $c_i$ and r generated in said base-φ expansion adjustment step.

32. The method of claim 31, wherein said base-φ expansion adjustment step is a step of transforming, when r>k, r $c_i$-sequences to k $c'_i$-sequences by performing the transformation $c'_i = c_i + c_{i+k} + c_{i+2k} + \ldots$, where $0 \leq i \leq k-1$, through utilization of $$\phi^k P = P$$

when it holds for said $GF(q^k)$-rational point P over said elliptic curve.

33. The method of claim 31 or 32, wherein:

said step (D) includes a step of obtaining $S_d$ by adding together all $P_i$ for those i which correspond to $c_i$ not exceeding d and calculating said Equation 2-B by $$S = \sum_{d=0}^{r} S_d;$$

and said base-φ expansion adjustment step includes a step of transforming $c_i$ to reduce their absolute values through utilization of $$(\phi^{k-1} + \phi^{k-2} + \ldots + 1)P = 0$$

when it holds for said $GF(q^k)$-rational point P over said elliptic curve.

34. The method of claim 31 or 32, wherein:

said step (D) is a step of determining $c_{ij}$ by $$c_i = \sum_{j=0}^{[\log b]} 2^j c_{ij},$$

where $0 \leq c_{ij} \leq 1$, [log b] is the maximum integer smaller than b and b is the maximum value of $|c_i|$, and obtaining said mP by $$S_j = \sum_{i=0}^{k-1} c_{ij} P_i$$

$$S = \sum_{j=0}^{[\log b]-1} 2^j S_j;$$

and said base-φ expansion adjustment step includes a step of transforming $c_i$ to minimize the Hamming weight represented by the number of values of other digits than those 0 of a binary or signed binary number of said $c_i$, through utilization of $$(\phi^{k-1} + \phi^{k-2} + \ldots + 1)P = 0$$

when it holds for said $GF(q^k)$-rational point P over said elliptic curve.

35. The method of claim 24, 31, or 32, wherein said step (4) is a step of inputting $P_1, P_2, \ldots, P_n$ as points P over said elliptic curve, and $m_1, m_2, \ldots, m_n$ as said integer m to obtain said mP by $$\sum_{i=0}^{n} m_i P_i$$

36. The method of claim 35, wherein said step (C) is a step of increasing the efficiency of the calculation by obtaining at least one part of $S_{i1}, S_{i2}, \ldots, S_{in}$, where $0 \leq ik \leq 1$, which are obtained from said points $P_1, P_2, \ldots, P_n$ by $$S_{in} = \sum_{k=1}^{n} i_k P_k$$

37. The method of claim 35, wherein the efficiency of the calculation by said step (D) is increased by externally inputting at east one it part of $S_{i1}, S_{i2}, \ldots, S_{in}$, where $0 < i_k < 1$, which are obtained from said points $P_1, P_2, \ldots, P_n$ by $$S_{in} = \sum_{k=1}^{n} i_k P_k$$

38. The method of claim 24, wherein:

said step (B) includes a step for calculating r and $c_i$, where $0 \leq i < r$, $0 \leq r < k$ and $-q < c_i < q$, which satisfy $$m = \sum_{i=0}^{r-1} c_i \phi^i$$

using said Frobenius map φ which is defined by E/GF(q);

said step (C) includes a step for calculating r×s $GF(q^k)$-rational points $R_{t,i}$ ($0 \leq t < s$, $0 \leq i < r$) over E/GF(q) for the input thereto of an integer r and s $GF(q^k)$-rational points $Q_t = d^{ta} P$ ($0 \leq t < s$) over E/GF(q) pre-computed with P where, letting $C = 1 + \max|c_i|$, a, d and s are positive integers that satisfy $a \times s \geq \log_d$, calculates; and said step (D) is a pre-computed table reference addition step for calculating $c_{j,t,i} \in B$ such that $$c_i = \sum_{j=0}^{a-1} \sum_{t=0}^{s-1} d^{j+ta} c_{j,t,i} \quad (4b)$$

where B is assumed to be a finite set of integers and low in order, and for obtaining said mP by $$mP = \sum_{j=0}^{a-1} \sum_{i=0}^{r-1} \sum_{t=0}^{s-1} d^j c_{j,t,i} R_{t,i}. \quad (5b)$$

39. The method of claim 38, further comprising steps of:

(F) calculating $$T_j = \sum_{j=0}^{r-1} \sum_{t=0}^{s-1} c_{j,t,i} R_{t,i}; \text{ and} \quad (6b)$$

(G) calculating said mP by $$mP = \sum_{j=0}^{a-1} d^j T_j. \quad (7b)$$

40. The method of claim 39, wherein:
said integer d is 2;
said set B is {0, 1}; and
wherein, in said step (F), a $C_{j,t,i}$-multiplication is performed only by 0-multiplication and 1-multiplication in said equation (6b).

41. The method of claim 39, wherein:
said integer d is 2;
said set B is {−1, 0, 1}; and
wherein, in said step (F), a $C_{j,t,i}$-multiplication is performed only by (−1)-multiplication, 0-multiplication and 1-multiplication in said equation (6b).

42. The method of claim 24, wherein: letting $GF(q^k)$ represent a k-degree extension field of GF(q), letting $GF(q^k)-\{0\}$ represent an algebraic system $GF^*(q^k)$, letting $\alpha$ represent a root of a k-degree irreducible polynomial on GF(q) and letting an element a of $GF(q^k)$ be represented by a polynomial in the form of $a=a_0+a_1\alpha+a_2\alpha^2 \ldots +a_{k-1}\alpha^{k-1}$ using an element $a_i$ ($0\leq i<k$) of GF(q) and an element $\alpha$ of $GF^*(q^k)$, said step (C) includes polynomial-basis power operating step of calculating a power of said a, $a^q=a_0+a_1\alpha^q+a_2\alpha^{2q} \ldots +a_{k-1}\alpha^{(k-1)q}$;

said power operating step comprises:
a polynomial basis calculation step inputting, of the order q of a finite field GF(q) defined such that f(x) is expressed in the form of $x^k-\beta$, where $\beta \in GF(q)$, and the degree k set to be relatively prime to said order q, and calculating iq mod k ($1\leq i\leq k-1$), then, letting iq/(k) represent the calculated results, rearranging $a^0=1$ and $\alpha^{iq/(k)}$ ($1\leq i\leq k-1$) in ascending order of powers and outputting them as new polynomial bases;
a correcting factor calculation step of inputting said order q, said degree k and said β, then dividing iq ($1\leq i\leq k-1$) by k to obtain an integer [iq/k] with its fraction portion dropped, and calculating $\beta^{[iq/k]}$ ($1\leq i\leq k-1$) as correcting factors of said element $a_i$ of GF(q) ($1\leq i\leq k-1$);
a coefficient calculation step of inputting said element $a_i$ of GF(q) ($1\leq i\leq k-1$) and said correcting factors $\beta^{[iq/k]}$ ($1\leq i\leq k-1$), then calculating $a_i\beta^{[iq/k]}$ mod q, then, letting $a_i\beta^{[iq/k]}/(q)$, rearranging $a_0$ and $a_i\beta^{[iq/k]}/(q)$ ($1\leq i \leq k-1$) in an order of corresponding to said new polynomial bases, and outputting them as coefficients of said new polynomial bases; and
an output step of representing the output from said coefficient calculation part as a vector of $a^q$, and outputting, as a polynomial representation of said $a^q$, the result of addition of the results of multiplication of respective elements of said polynomial bases arranged in ascending order of powers by the corresponding coefficients.

43. The method of claim 42, wherein said coefficient calculation step comprises:
storing step of pre-computed correcting factors $\beta^{[iq/k]}$ ($1\leq i\leq k-1$) in memory means;
termwise processing step of calculating $a_i\beta^{[iq/k]}$ mod q based on said element $a_i$ of GF(q) ($1\leq i\leq k-1$) and said $\beta^{[iq/k]}$ ($1\leq i\leq k-1$) read out of said memory means; and
replacement processing step of rearranging $a_0$ and $a_i\beta^{[iq/k]}/(q)$ ($1\leq i\leq k-1$) in a new order corresponding to a new polynomial bases $\{1=\alpha^0, \alpha^{iq/(k)} (1\leq i\leq k-1)\}$ arranged in ascending order of powers, and outputting them as coefficients of the corresponding bases.

44. The method of claim 42, which further comprises: an inputting step of inputting $\beta^{i[(q-1)/k]}$ pre-computed for all integers i that satisfy an inequality 0<i<k using the order q of said finite field GF(q), an extension degree k set to exactly divide q−1 and β; and
multiplying step of inputting said $a_1, a_2, \ldots, a_i, \ldots, a_{k-1}$, then calculating $a_i\beta^{i[(q-1)/k]}$ for said all integers i that satisfy said inequality 0<i<k, and outputting each $a_i\beta^{i[(q-1)/k]}$ (0<i<k) as an element $a'_i$ of said vector representation of $a^q$ corresponding to a basis $\alpha^j$.

45. The method of claim 44, wherein said inputting step reads out pre-computed $\beta^{i[(q-1)/k]}$ (0<i<k) from memory means for use in said multiplying step.

46. The method of claim 44, further comprising a multiplication-addition step of inputting said $a_0$ and $a'_i$ (0<i<k) from said multiplying step, then calculating a multiplication-addition $$a_0 + \sum_{i=1}^{k-1} a_i \beta^{i\frac{q-1}{k}} \alpha^i$$

and outputting it as a polynomial representation of said $a^q$.

47. A recording medium on which there is recorded a program for implementing by a computer an elliptic curve multiplication method for use in an apparatus which calculates m-multiplication of $GF(q^k)$-rational point P over an elliptic curve E/GF(q) defined over a finite field, said program comprising the steps of:
(A) inputting said $GF(q^k)$-rational point P, a Frobenius map φ defined over said elliptic curve E/GF(q), an integer k, and a prime q exceeding 3 or a power of said prime;
(B) calculating integers r and $c_i$, where $0\leq i<r$, $0\leq r\leq k$, $-q\leq c_i\leq q$, which satisfy $$m = \sum_{i=0}^{r-1} c_i \phi^i \quad (1c)$$

using said Frobenius map φ dependent on said elliptic curve E/GF(q);
(C) generating, by the use of said $GF(q^k)$-rational point P and said integers r and $c_i$, r points $P_0$ to $P_{r-1}$ such that $P_0=P$ $P_1=\phi P$ $P_2=\phi^2 P$

:

$P_{r-1}=\phi^{r-1}P$;

(D) calculating $$mP = \sum_{i=0}^{r-1} c_i \phi^i P \quad (2c)$$

for said r points $P_0$ to $P_{r-1}$; and
(E) outputting said mP.

48. The recording medium of claim 47, wherein said step (D) comprises the steps of:

(D-1) obtaining a value $S_d$ by adding all $P_i$ for i which correspond to $c_i$ not exceeding d; and
(D-2) obtaining said mP by $$S = \sum_{d=0}^{b} S_d$$

where b is the maximum among $c_i$.

49. The recording medium of claim 47, wherein said step (D) comprises the steps of:
(D-1) obtaining $c_{ij}$ from the following equation:

$$c_i = \sum_{j=0}^{[\log_2 b]} 2^j c_{ij},$$

where $0 \leq c_{ij} \leq 1$ and b is the maximum among $c_i$;
(D-2) calculating $S_j$ from the following equation:

$$S_j = \sum_{i=0}^{k-1} C_{ij} P_i;$$

and
(D-3)-obtaining said mP by calculating the following equation:

$$S = \sum_{j=0}^{[\log_2 b]-1} 2^j S_j$$

50. The recording medium of claim 47, wherein said step (D) comprises the steps of:
(D-1) calculating $S_j$ from the following equation:

$$S_j = \sum_{i=0}^{k-1} \delta_{ij} P_i,$$

where $\delta_{ij}=1$ for those m=j and $\delta_{ij}=0$ otherwise; and
(D-2) calculating S as mP from the following equation:

$$S = \sum_{j=0}^{b-1} j S_j$$

where $0 \leq j < b$ and b is the maximum among $c_i$.

51. The recording medium of claim 47, wherein said step (D) is a step of obtaining $S_0$ as said mP by calculating $S_r = O$ $S_i = c_i P + \phi S_{i+1}$, $0 \leq i < r$     (3c).

52. The recording medium of claim 51, wherein:
said step (C) includes a step of calculating $P_i = iP,$ where $0 < i \leq q$; and
said step (D) is a step of performing the calculation of said Equation (3c) as $S_r = O$ $S_i = P_i + \phi S_{i+1}$, where $0 \leq i < r$, using all or some of said $P_i$.

53. The recording medium of claim 51, wherein; at least one part of said $P_i$ is externally input which is such that $P_i = iP,$ where $0 \leq i < q$; and
said step (D) is a step of calculating said Equation (1c) as $S_r = O$ $S_i = P_i + \phi S_{i+1}$ where $0 \leq i < r$.

54. The recording medium of claim 47, which further comprises a base-$\phi$ expansion adjustment step of calculating, through utilization of $\phi^k P = P$ or $(\phi^{k-1} + \phi^{k-2} + \ldots + 1)P = 0$ when it holds for said $GF(q^k)$-rational point P over said elliptic curve, $c'_i$ and r' that satisfy $$\sum_{i=0}^{r-1} c_j \phi^i = \sum_{i=0}^{r'-1} c'_i \phi^i$$

for a $c_i$-sequence obtained by said step (B) and for said r and providing them as said $c_i$ and r to said step (D), and wherein said step (D) calculates the right-hand side of said Equation (2c) using said $c_i$ and r generated in said base-$\phi$ expansion adjustment step.

55. The recording medium of claim 54, wherein said base-$\phi$ expansion adjustment step is a step of transforming, when r>k, r $c_i$-sequences to k $c'_i$-sequences by performing the transformation $c'_i = c_i + c_{i+k} + c_{i+2k} + \ldots$, where $0 \leq i \leq k-1$, through utilization of $\phi^k P = P$ when it holds for said $GF(q^k)$-rational point P over said elliptic curve.

56. The method of claim 54 or 55, wherein:
said step (D) includes a step of obtaining $S_d$ by adding together all $P_i$ for those i which correspond to $c_j$ not exceeding d and calculating said Equation (1c) by $$S = \sum_{d=0}^{r} S_d;$$

and
said base-$\phi$ expansion adjustment step includes a step of transforming $c_i$ to reduce their absolute values through utilization of $(\phi^{k-1} + \phi^{k-2} + \ldots + 1)P = 0$ when it holds for said $GF(q^k)$-rational point P over said elliptic curve.

57. The recording medium of claim 54 or 55, wherein: said step (D) is a step of determining $c_{ij}$ by $$c_i = \sum_{j=0}^{[\log b]} 2^j c_{ij},$$

where $0 \leq c_{ij} \leq 1$, [log b] is the maximum integer smaller than b and b is the maximum value of $|c_i|$, and obtaining said mP by $$S_j = \sum_{i=0}^{k-1} c_{ij} P_i$$

$$S = \sum_{j=0}^{[\log b]-1} 2^j S_j;$$

and
said base-ϕ expansion adjustment step includes a step of transforming $c_i$ to minimize the Hamming weight represented by the number of values of other digits than those 0 of a binary or signed binary number of said $c_i$, through utilization of $$(\phi^{k-1} + \phi^{k-2} + \ldots + 1)P = 0$$

when it holds for said $GF(q^k)$-rational point P over said elliptic curve.

58. The recording medium of claim 47, 54, or 55, wherein said step (D) is a step of inputting $P_1, P_2, \ldots, P_n$ as points P over said elliptic curve, and $m_1, m_2, \ldots, m_n$ as said integer m to obtain said mP by $$\sum_{i=0}^{n} m_i P_i.$$

59. The recording medium of claim 58, wherein said step (C) is a step of increasing the efficiency of the calculation by obtaining at least one part of $S_{i1}, S_{i2}, \ldots, S_{in}$, where $0 \leq i_k \leq 1$, which are obtained from said points $P_1, P_2, \ldots, P_n$ by $$S_{in} = \sum_{k=1}^{n} i_k P_k.$$

60. The recording medium of claim 58, wherein the efficiency of the calculation by said step (D) is increased by externally inputting at east one part of $S_{i1}, S_{i2}, \ldots, S_{in}$, where $0 < i_k < 1$, which are obtained from said points $P_1, P_2, \ldots, P_n$ by $$S_{in} = \sum_{k=1}^{n} i_k P_k.$$

61. The recording medium of claim 47, wherein: said step (B) includes a step for calculating r and $c_i$, where $0 \leq i \leq r$, $0 \leq r < k$ and $-q < c_i < q$, which satisfy $$m = \sum_{i=0}^{r-1} c_i \phi^i$$

using said Frobenius map ϕ which is defined by E/GF(q);
said step (C) includes a step for calculating r×s $GF(q^k)$-rational points $R_{t,i}$ ($0 \leq t < s$, $0 \leq i < r$) over E/GF(q) for the input thereto of an integer r and s $GF(q^k)$-rational points $Q_t = d^{ta} P$ ($0 \leq t < s$) over E/GF(q) pre-computed with P where, letting $C = 1 + \max|c_i|$, a, d and s are positive integers that satisfy $axs \geq \log_d$, calculates; and
said step (D) is a pre-computed table reference addition step for calculating $c_{j,t,i} \in B$ such that $$c_i = \sum_{j=0}^{a-1} \sum_{t=0}^{s-1} d^{j+ta} c_{j,t,i} \qquad (4c)$$

where B is assumed to be a finite set of integers and low in order, and for obtaining said mP by $$mP = \sum_{j=0}^{a-1} \sum_{i=0}^{r-1} \sum_{t=0}^{s-1} d^j c_{j,t,i} R_{t,i}. \qquad (5c)$$

62. The recording medium of claim 61, wherein said program further comprises steps of:
(F) calculating $$T_j = \sum_{j=0}^{r-1} \sum_{t=0}^{s-1} c_{j,t,i} R_{t,i} \text{ and} \qquad (6c)$$

(G) calculating said mP by $$mP = \sum_{j=0}^{a-1} d^j T_j. \qquad (7c)$$

63. The recording medium of claim 62, wherein:
said integer d is 2;
said set B is {0, 1}; and
wherein, in said step (F), a $C_{j,t,i}$-multiplication is performed only by 0-multiplication and 1-multiplication in said equation (6c).

64. The recording medium of claim 62, wherein:
said integer d is 2;
said set B is {−1, 0, 1}; and wherein, in said step (F), a $C_{j,t,i}$-multiplication is performed only by (−1)-multiplication, 0-multiplication and 1-multiplication in said equation (6c).

65. The recording medium of claim 47, wherein: letting $GF(q^k)$ represent a k-degree extension field of GF(q), letting $GF(q^k) - \{0\}$ represent an algebraic system $GF^*(q^k)$, letting a represent a root of a k-degree irreducible polynomial on GF(q) and letting an element a of $GF(q^k)$ be represented by a polynomial in the form of $a = a_0 + a_1 \alpha + a_2 \alpha^2 \ldots + a_{k-1} \alpha^{k-1}$ using an element $a_i$ ($0 \leq i < k$) of GF(q) and an element a of $GF^*(q^k)$, said step (C) includes polynomial-basis power operating step of calculating a power of said a, $a^q = a_0 + a_1 \alpha^q + a_2 \alpha^{2q} \ldots + a_{k-1} \alpha^{(k-1)q}$;
said power operating step comprises:
a polynomial basis calculation step inputting, of the order q of a finite field GF(q) defined such that f(x) is expressed in the form of $x^k - \beta$, where $\beta \in GF(q)$, and the degree k set to be relatively prime to said order q, and calculating iq mod k ($1 \leq i \leq k-1$), then, letting iq/(k) represent the calculated results, rearranging $\alpha^0 = 1$ and $\alpha^{iq/(k)}$ ($1 \leq i \leq k-1$) in ascending order of powers and outputting them as new polynomial bases;

a correcting factor calculation step of inputting said order q, said degree k and said $\beta$, then dividing iq ($1<i\leq k-1$) by k to obtain an integer [iq/k] with its fraction portion dropped, and calculating $\beta^{[iq/k]}$ ($1\leq i\leq k-1$) as correcting factors of said element $a_i$ of GF(q) ($1\leq i\leq k-1$);

a coefficient calculation step of inputting said element $a_i$ of GF(q) ($1\leq i\leq k-1$) and said correcting factors $\beta^{[iq/k]}$ ($1<i\leq k-1$), then calculating $a_i\beta^{[iq/k]}$mod q, then, letting $a_i\beta^{[iq/k]}/(q)$, rearranging $a_0$ and $a_i\beta^{[iq/k]}/(q)$ ($1\leq i\leq k-1$) in an order of corresponding to said new polynomial bases, and outputting them as coefficients of said new polynomial bases; and an output step of representing the output from said coefficient calculation part as a vector of $a^q$, and outputting, as a polynomial representation of said $a^q$, the result of addition of the results of multiplication of respective elements of said polynomial bases arranged in ascending order of powers by the corresponding coefficients.

66. The recording medium of claim 65, wherein said coefficient calculation step comprises:

storing step of pre-computed correcting factors $\beta^{[iq/k]}$ ($1\leq i\leq k-1$) in memory means;

termwise processing step of calculating $a_i\beta^{[iq/k]}$mod q based on said element $a_i$ of GF(q) ($1\leq i\leq k-1$) and said $\beta^{[iq/k]}$ ($1\leq i\leq k-1$) read out of said memory means; and replacement processing step of rearranging $a_0$ and $a_i\beta^{[iq/k]}/(q)$ ($1\leq i\leq k-1$) in a new order corresponding to a new polynomial bases $\{1=\alpha^0, \alpha^{iq/(k)}$ ($1\leq i\leq k-1$)$\}$ arranged in ascending order of powers, and outputting them as coefficients of the corresponding bases.

67. The recording medium of claim 65, which further comprises: an inputting step of inputting $\beta^{i(q-1)/k]}$ pre-computed for all integers i that satisfy an inequality $0<i<k$ using the order q of said finite field GF(q), an extension degree k set to exactly divide q−1 and $\beta$; and multiplying step of inputting said $a_1, a_2, \ldots, a_i, \ldots, a_{k-1}$, then calculating $a_i\beta^{i(q-1)/k]}$ for said all integers i that satisfy said inequality $0<i<k$, and outputting each $a_i\beta^{i(q-1)/k]}$ ($0<i<k$) as an element $a'_i$ of said vector representation of $a^q$ corresponding to a basis $\alpha^i$.

68. The recording medium of claim 67, wherein said inputting step reads out pre-computed $\beta^{i(q-1)/k]}$ ($0<i<k$) from memory means for use in said multiplying step.

69. The method of claim 67, further comprising a multiplication-addition step of inputting said $a_0$ and $a'_i$ ($0<i<k$) from said multiplying step, then calculating a multiplication-addition $$a_0 + \sum_{i=1}^{k-1} a_i \beta^{i\frac{q-1}{k}} \alpha^i$$

and outputting it as a polynomial representation of said $a^q$.

* * * * *